United States Patent
Jung et al.

(10) Patent No.: US 9,826,439 B2
(45) Date of Patent: Nov. 21, 2017

(54) MOBILE DEVICE SHARING FACILITATION METHODS AND SYSTEMS OPERABLE IN NETWORK EQUIPMENT

(71) Applicant: Elwha LLC, Bellevue, WA (US)

(72) Inventors: Edward K. Y. Jung, Bellevue, WA (US); Royce A. Levien, Lexington, MA (US); Richard T. Lord, Gig Harbor, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/200,993

(22) Filed: Mar. 7, 2014

(65) Prior Publication Data
US 2015/0094046 A1    Apr. 2, 2015

Related U.S. Application Data

(63) Continuation-in-part of application No. 14/042,192, filed on Sep. 30, 2013, and a continuation-in-part of application No. 14/150,271, filed on Jan. 8, 2014, and a continuation-in-part of application No. 14/150,386, filed on Jan. 8, 2014, and a continuation-in-part of application No. 14/150,524, filed on Jan. 8, 2014, and a continuation-in-part of application No. 14/175,438, filed on Feb. 7, 2014, and a continuation-in-part of application No. 14/175,511, filed on Feb. 7, 2014, and a continuation-in-part of application No. 14/175,617, filed on Feb. 7, 2014.

(51) Int. Cl.
H04M 3/42    (2006.01)
H04W 36/00   (2009.01)
H04W 8/18    (2009.01)
H04M 1/725   (2006.01)
H04W 88/06   (2009.01)

(52) U.S. Cl.
CPC ......... *H04W 36/0022* (2013.01); *H04W 8/18* (2013.01); *H04M 1/72569* (2013.01); *H04W 88/06* (2013.01)

(58) Field of Classification Search
None
See application file for complete search history.

(56) References Cited

U.S. PATENT DOCUMENTS

| 5,867,788 | A | 2/1999 | Joensuu |
| 6,134,014 | A | 10/2000 | Tzu et al. |
| 6,167,398 | A | 12/2000 | Wyard et al. |

(Continued)

FOREIGN PATENT DOCUMENTS

WO    WO 2014/088529 A1    6/2014

OTHER PUBLICATIONS

PCT International Search Report; International App. No. PCT/US2014/058252; Jan. 8, 2015; pp. 1-4.

(Continued)

*Primary Examiner* — Moustapha Diaby

(57) ABSTRACT

Structures and protocols are presented for using or otherwise relating to a first mobile device (a smartphone or tablet computer or wearable device, e.g.) configured to be shared by two or more parties such that a subset of the parties may be addressed selectively (in content directed to such parties, e.g.) in a cost-effective manner.

28 Claims, 56 Drawing Sheets

(56) References Cited

U.S. PATENT DOCUMENTS

| | | |
|---|---|---|
| 6,424,729 B1 | 7/2002 | Soon |
| 6,788,927 B2 | 9/2004 | Pohutsky et al. |
| 6,978,156 B1 | 12/2005 | Papadopoulos et al. |
| 7,093,145 B2 | 8/2006 | Werner et al. |
| 7,135,889 B2 | 11/2006 | Hairapetian |
| 7,161,513 B2 | 1/2007 | Werner et al. |
| 7,245,913 B1 | 7/2007 | Nguyen et al. |
| 7,254,123 B2 | 8/2007 | Jukarainen |
| 7,260,203 B2 | 8/2007 | Holt et al. |
| 7,305,079 B1 | 12/2007 | Forte |
| 7,321,239 B2 | 1/2008 | Hedberg et al. |
| 7,344,063 B2 | 3/2008 | Wagner et al. |
| 7,353,016 B2 | 4/2008 | Roundtree et al. |
| 7,362,768 B1 * | 4/2008 | Dommety ............... H04L 45/00 370/392 |
| 7,373,384 B2 | 5/2008 | Bragado Carrasco et al. |
| 7,392,017 B2 | 6/2008 | Chu et al. |
| 7,398,524 B2 | 7/2008 | Shapiro |
| 7,421,477 B2 | 9/2008 | Pettinato |
| 7,443,787 B2 | 10/2008 | Karino et al. |
| 7,516,092 B2 | 4/2009 | Upendran et al. |
| 7,519,373 B2 | 4/2009 | Kennedy, Jr. et al. |
| 7,522,992 B2 | 4/2009 | Obradovich et al. |
| 7,535,749 B2 | 5/2009 | Lines |
| 7,567,305 B2 | 7/2009 | Joo |
| 7,593,812 B2 | 9/2009 | Obradovich et al. |
| 7,644,055 B2 | 1/2010 | Furst et al. |
| 7,646,712 B2 | 1/2010 | Cohen et al. |
| 7,650,319 B2 | 1/2010 | Hoffberg et al. |
| 7,664,720 B1 | 2/2010 | Freeman et al. |
| 7,693,137 B2 | 4/2010 | Gardell et al. |
| 7,693,752 B2 | 4/2010 | Jaramillo |
| 7,698,256 B1 | 4/2010 | Wang |
| 7,743,334 B2 | 6/2010 | Rider |
| 7,761,505 B2 | 7/2010 | Krzyzanowski et al. |
| 7,761,591 B2 | 7/2010 | Graham |
| 7,787,693 B2 | 8/2010 | Siegemund |
| 7,787,896 B2 | 8/2010 | Kundu et al. |
| 7,813,716 B2 | 10/2010 | Malackowski et al. |
| 7,831,559 B1 | 11/2010 | Mohan et al. |
| 7,835,314 B2 | 11/2010 | Yee et al. |
| 7,835,751 B2 | 11/2010 | Ibe et al. |
| 7,844,684 B2 | 11/2010 | Pettinato |
| 7,853,268 B2 | 12/2010 | Karaoguz et al. |
| 7,856,137 B2 | 12/2010 | Yonezawa et al. |
| 7,860,648 B2 | 12/2010 | Jung et al. |
| 7,881,992 B1 | 2/2011 | Seaman et al. |
| 7,885,395 B2 | 2/2011 | Cadiz et al. |
| 7,908,518 B2 | 3/2011 | West, Jr. et al. |
| 7,925,250 B2 | 4/2011 | Redpath |
| 7,949,191 B1 | 5/2011 | Ramkumar et al. |
| 7,961,076 B2 | 6/2011 | Kelley et al. |
| 7,965,997 B2 | 6/2011 | Sposato et al. |
| 8,000,455 B1 | 8/2011 | Van Haaften et al. |
| 8,000,528 B2 | 8/2011 | Ming et al. |
| 8,004,083 B2 | 8/2011 | Lin et al. |
| 8,004,556 B2 | 8/2011 | Rodman et al. |
| 8,005,911 B2 | 8/2011 | Jhanji |
| 8,010,230 B2 | 8/2011 | Zini et al. |
| 8,010,663 B2 | 8/2011 | Firminger et al. |
| 8,023,314 B2 | 9/2011 | Lines |
| 8,032,149 B2 | 10/2011 | Kennedy et al. |
| 8,037,126 B2 | 10/2011 | Plamondon |
| 8,045,957 B2 | 10/2011 | Dinh et al. |
| 8,049,664 B2 | 11/2011 | Millard et al. |
| 8,054,856 B2 | 11/2011 | Sala et al. |
| 8,059,011 B2 | 11/2011 | Van Wyk et al. |
| 8,059,788 B2 | 11/2011 | Allen, Jr. et al. |
| 8,060,109 B2 | 11/2011 | Fomukong et al. |
| 8,068,836 B2 | 11/2011 | Voyer et al. |
| 8,086,239 B2 | 12/2011 | Elmaleh |
| 8,098,753 B2 | 1/2012 | Feher |
| 8,108,501 B2 | 1/2012 | Birnie et al. |
| 8,108,903 B2 | 1/2012 | Norefors et al. |
| 8,111,622 B2 | 2/2012 | Cohen et al. |
| 8,125,896 B2 | 2/2012 | Cohen et al. |
| 8,128,501 B2 | 3/2012 | Theimer et al. |
| 8,139,564 B1 | 3/2012 | Weaver et al. |
| 8,145,566 B1 | 3/2012 | Ahuja et al. |
| 8,145,975 B2 | 3/2012 | Lin et al. |
| 8,160,304 B2 | 4/2012 | Rhoads et al. |
| 8,165,091 B2 | 4/2012 | Nix |
| 8,166,524 B2 | 4/2012 | Sentinelli |
| 8,169,311 B1 | 5/2012 | Breed |
| 8,170,549 B1 | 5/2012 | McCorkendale et al. |
| 8,184,580 B2 | 5/2012 | Wilhelmsson et al. |
| 8,184,656 B2 | 5/2012 | Chandra et al. |
| 8,195,198 B1 | 6/2012 | Shaw et al. |
| 8,195,478 B2 | 6/2012 | Petersen et al. |
| 8,200,243 B1 | 6/2012 | Feher |
| 8,208,489 B2 | 6/2012 | Hong et al. |
| 8,219,312 B2 | 7/2012 | Davidson et al. |
| 8,223,694 B2 | 7/2012 | Jayapalan et al. |
| 8,224,349 B2 | 7/2012 | Meredith et al. |
| 8,233,471 B2 | 7/2012 | Brownrigg et al. |
| 8,234,523 B2 | 7/2012 | Bharadwaj et al. |
| 8,238,869 B2 | 8/2012 | Brayton |
| 8,243,887 B2 | 8/2012 | Conahan |
| 8,244,228 B1 | 8/2012 | Sutardja |
| 8,248,968 B2 | 8/2012 | Handforth et al. |
| 8,249,256 B2 | 8/2012 | Korus et al. |
| 8,249,616 B2 | 8/2012 | Boejer et al. |
| 8,259,822 B1 | 9/2012 | Feher |
| 8,260,896 B2 | 9/2012 | Trevino et al. |
| 8,261,090 B1 | 9/2012 | Matsuoka |
| 8,264,953 B2 | 9/2012 | Licardie et al. |
| 8,265,655 B2 | 9/2012 | Khushu |
| 8,266,313 B2 | 9/2012 | Pettinato |
| 8,271,626 B2 | 9/2012 | Childers et al. |
| 8,280,913 B2 | 10/2012 | Bergin |
| 8,284,100 B2 | 10/2012 | Vartanian et al. |
| 8,289,210 B2 | 10/2012 | Thomson et al. |
| 8,290,509 B2 | 10/2012 | Jung et al. |
| 8,295,352 B2 | 10/2012 | Leprovost et al. |
| 8,295,395 B2 | 10/2012 | Mueck et al. |
| 8,301,375 B2 | 10/2012 | Chiayee et al. |
| 8,301,564 B2 | 10/2012 | Mon et al. |
| 8,306,005 B1 | 11/2012 | Gurin |
| 8,311,509 B2 | 11/2012 | Feher |
| 8,311,513 B1 | 11/2012 | Nasserbakht et al. |
| 8,311,532 B2 | 11/2012 | Waller |
| 8,311,579 B2 | 11/2012 | Rofougaran et al. |
| 8,315,622 B2 | 11/2012 | Rofougaran |
| 8,316,394 B2 | 11/2012 | Yates |
| 8,320,261 B2 | 11/2012 | Vasamsetti et al. |
| 8,320,494 B2 | 11/2012 | Zerbe et al. |
| 8,321,591 B2 | 11/2012 | Farchmin et al. |
| 8,321,727 B2 | 11/2012 | D'Abreu et al. |
| 8,325,901 B1 | 12/2012 | Dolan et al. |
| 8,341,246 B2 | 12/2012 | LaJoie et al. |
| 8,346,282 B1 | 1/2013 | Dronamraju et al. |
| 8,346,879 B2 | 1/2013 | Meunier et al. |
| 8,352,872 B2 | 1/2013 | Fish |
| 8,358,975 B2 | 1/2013 | Bahl et al. |
| 8,369,311 B1 | 2/2013 | Kirchhoff et al. |
| 8,369,871 B1 | 2/2013 | Izdepski et al. |
| 8,370,349 B2 | 2/2013 | Quoc et al. |
| 8,380,188 B2 | 2/2013 | Ramachandra Rao et al. |
| 8,385,224 B2 | 2/2013 | Pasko |
| 8,391,930 B1 | 3/2013 | Delker et al. |
| 8,395,223 B2 | 3/2013 | Yang |
| 8,406,753 B2 | 3/2013 | Alles et al. |
| 8,410,898 B1 | 4/2013 | Vasquez |
| 8,412,946 B2 | 4/2013 | Savitzky et al. |
| 8,427,910 B2 | 4/2013 | Verbakel et al. |
| 8,428,645 B2 | 4/2013 | Rao |
| 8,433,764 B2 | 4/2013 | Rideout et al. |
| 8,443,420 B2 | 5/2013 | Brown et al. |
| 8,447,352 B2 | 5/2013 | Forte |
| 8,467,354 B1 | 6/2013 | Jerkunica et al. |
| 8,488,596 B2 | 7/2013 | Parlamas et al. |
| 8,498,269 B2 | 7/2013 | Nix |
| 8,526,929 B1 | 9/2013 | Gilbert et al. |
| 8,528,810 B1 | 9/2013 | Rojas et al. |

(56) References Cited

U.S. PATENT DOCUMENTS

| | | |
|---|---|---|
| 8,543,397 B1 | 9/2013 | Nguyen |
| 8,548,151 B1 | 10/2013 | Dianda |
| 8,548,447 B1 | 10/2013 | Kirchhoff et al. |
| 8,583,107 B2 | 11/2013 | Chintada et al. |
| 8,595,108 B2 | 11/2013 | Nuzzi et al. |
| 8,599,873 B2 | 12/2013 | Barzegar et al. |
| 8,606,655 B2 | 12/2013 | Allen et al. |
| 8,610,675 B2 | 12/2013 | Lipman et al. |
| 8,611,209 B2 | 12/2013 | Berg et al. |
| 8,615,008 B2 | 12/2013 | Natarajan et al. |
| 8,618,835 B2 | 12/2013 | Catli et al. |
| 8,619,569 B2 | 12/2013 | Godor et al. |
| 8,693,655 B1 | 4/2014 | Chau et al. |
| 9,088,877 B1* | 7/2015 | Hagendorf .............. H04W 4/14 |
| 2002/0037715 A1* | 3/2002 | Mauney ............ H04M 1/72519 455/421 |
| 2002/0077102 A1* | 6/2002 | Achuthan ............ H04M 1/575 455/567 |
| 2002/0198007 A1 | 12/2002 | Zimmerman |
| 2003/0012345 A1 | 1/2003 | Marsh et al. |
| 2003/0139192 A1* | 7/2003 | Chmaytelli ........... H04M 1/673 455/463 |
| 2003/0179743 A1 | 9/2003 | Bosik et al. |
| 2005/0053241 A1* | 3/2005 | Fan .................... H04L 63/0442 380/270 |
| 2005/0080897 A1 | 4/2005 | Braun et al. |
| 2005/0107121 A1 | 5/2005 | Gamble |
| 2005/0190902 A1 | 9/2005 | Benco et al. |
| 2005/0215241 A1* | 9/2005 | Okada .................. H04W 48/04 455/414.1 |
| 2006/0019630 A1 | 1/2006 | Sposato et al. |
| 2006/0059305 A1 | 3/2006 | Fisher et al. |
| 2006/0078122 A1 | 4/2006 | Dacosta |
| 2006/0121894 A1 | 6/2006 | Ganesan |
| 2006/0140200 A1 | 6/2006 | Black et al. |
| 2006/0264234 A1 | 11/2006 | Akama |
| 2007/0054674 A1 | 3/2007 | Cohen et al. |
| 2007/0082705 A1 | 4/2007 | Jain et al. |
| 2007/0105531 A1* | 5/2007 | Schroeder ......... H04M 3/42008 455/411 |
| 2007/0116016 A1 | 5/2007 | Cohen et al. |
| 2007/0117585 A1 | 5/2007 | Juneja et al. |
| 2007/0133472 A1* | 6/2007 | Kim ..................... H04W 36/30 370/332 |
| 2007/0176742 A1 | 8/2007 | Hofmann et al. |
| 2007/0189496 A1 | 8/2007 | Kahn |
| 2007/0202883 A1* | 8/2007 | Herve ................... H04W 48/10 455/452.2 |
| 2007/0237101 A1 | 10/2007 | Cohen et al. |
| 2007/0259678 A1* | 11/2007 | Kuk .................. H04M 1/72525 455/466 |
| 2007/0264981 A1 | 11/2007 | Miller |
| 2007/0270122 A1 | 11/2007 | Ewell, Jr. |
| 2008/0102843 A1 | 5/2008 | Todd et al. |
| 2008/0113687 A1 | 5/2008 | Prendergast et al. |
| 2008/0115225 A1 | 5/2008 | Jogand-Coulomb et al. |
| 2008/0132201 A1 | 6/2008 | Karlberg |
| 2008/0167045 A1 | 7/2008 | Lee et al. |
| 2008/0175223 A1* | 7/2008 | Croak ............... H04M 3/42042 370/352 |
| 2008/0280589 A1 | 11/2008 | Cowper et al. |
| 2009/0028318 A1* | 1/2009 | Bhogal ............. H04M 3/42263 379/211.02 |
| 2009/0061932 A1 | 3/2009 | Nagarajan |
| 2009/0064346 A1 | 3/2009 | Larsson et al. |
| 2009/0068980 A1 | 3/2009 | Creswell et al. |
| 2009/0089055 A1 | 4/2009 | Caspi et al. |
| 2009/0154674 A1 | 6/2009 | Chu |
| 2009/0212908 A1 | 8/2009 | Lin et al. |
| 2009/0227229 A1* | 9/2009 | Waller ................. H04L 12/14 455/406 |
| 2009/0239555 A1* | 9/2009 | Sim ..................... H04W 8/186 455/458 |
| 2010/0023519 A1* | 1/2010 | Kailash .................. H04L 63/10 707/E17.007 |
| 2010/0046459 A1 | 2/2010 | Nishio et al. |
| 2010/0128857 A1 | 5/2010 | Logan |
| 2010/0205667 A1 | 8/2010 | Anderson et al. |
| 2010/0210304 A1 | 8/2010 | Huslak |
| 2010/0330987 A1 | 12/2010 | Lee |
| 2011/0053574 A1 | 3/2011 | Rice |
| 2011/0055255 A1 | 3/2011 | Shaw et al. |
| 2011/0086670 A1 | 4/2011 | Shin |
| 2011/0106857 A1 | 5/2011 | Besombe et al. |
| 2011/0130168 A1 | 6/2011 | Vendrow et al. |
| 2011/0191205 A1 | 8/2011 | Enmei |
| 2011/0222395 A1 | 9/2011 | Ham et al. |
| 2011/0258303 A1 | 10/2011 | Nath et al. |
| 2011/0292923 A1 | 12/2011 | Noldus |
| 2011/0316671 A1 | 12/2011 | Yaguchi et al. |
| 2012/0076137 A1 | 3/2012 | Weaver et al. |
| 2012/0077467 A1 | 3/2012 | Fan et al. |
| 2012/0115493 A1 | 5/2012 | Matada et al. |
| 2012/0115546 A1 | 5/2012 | Lin et al. |
| 2012/0135715 A1 | 5/2012 | Kang et al. |
| 2012/0149435 A1 | 6/2012 | Jang et al. |
| 2012/0157040 A1 | 6/2012 | Naito et al. |
| 2012/0163566 A1 | 6/2012 | Gravino et al. |
| 2012/0178500 A1 | 7/2012 | Hwang |
| 2012/0202454 A1 | 8/2012 | Smith et al. |
| 2012/0250586 A1 | 10/2012 | Ahmavaara |
| 2012/0254983 A1 | 10/2012 | Levien et al. |
| 2012/0282903 A1 | 11/2012 | Rabra et al. |
| 2012/0314860 A1 | 12/2012 | Liu et al. |
| 2012/0317261 A1 | 12/2012 | Ahmavaara |
| 2013/0053010 A1 | 2/2013 | Kim |
| 2013/0065526 A1 | 3/2013 | Pottier et al. |
| 2013/0065570 A1 | 3/2013 | Jung et al. |
| 2013/0080560 A1 | 3/2013 | Sayankar et al. |
| 2013/0091564 A1 | 4/2013 | Fitzgerald et al. |
| 2013/0094452 A1 | 4/2013 | Pavlovski et al. |
| 2013/0095784 A1 | 4/2013 | Jerath et al. |
| 2013/0106682 A1 | 5/2013 | Davis et al. |
| 2013/0117214 A1 | 5/2013 | Davis et al. |
| 2013/0122862 A1* | 5/2013 | Horn ..................... H04W 8/20 455/411 |
| 2013/0124619 A1 | 5/2013 | Steakley |
| 2013/0132854 A1 | 5/2013 | Raleigh et al. |
| 2013/0150111 A1 | 6/2013 | Su et al. |
| 2013/0151385 A1 | 6/2013 | McGuire |
| 2013/0151728 A1 | 6/2013 | Currier |
| 2013/0159499 A1 | 6/2013 | Besehanic |
| 2013/0160141 A1 | 6/2013 | Tseng et al. |
| 2013/0174223 A1 | 7/2013 | Dykeman et al. |
| 2013/0278622 A1 | 10/2013 | Sun et al. |
| 2013/0281054 A1 | 10/2013 | Ye et al. |
| 2013/0288747 A1 | 10/2013 | Shu |
| 2013/0294443 A1 | 11/2013 | Kahn |
| 2013/0304850 A1 | 11/2013 | Mahaffey et al. |
| 2013/0305163 A1 | 11/2013 | Farmer et al. |
| 2013/0305359 A1 | 11/2013 | Gathala et al. |
| 2013/0344855 A1 | 12/2013 | Li et al. |
| 2014/0007187 A1 | 1/2014 | Harrison |
| 2014/0024353 A1 | 1/2014 | Baek et al. |
| 2014/0024361 A1 | 1/2014 | Poon et al. |
| 2014/0057597 A1 | 2/2014 | Velusamy et al. |
| 2014/0064467 A1 | 3/2014 | Lawson et al. |
| 2014/0065997 A1 | 3/2014 | Walker et al. |
| 2014/0106710 A1 | 4/2014 | Rodriguez |
| 2014/0115492 A1 | 4/2014 | Tehranchi et al. |
| 2014/0123228 A1 | 5/2014 | Brill et al. |
| 2014/0126532 A1 | 5/2014 | Bapat et al. |
| 2014/0155118 A1 | 6/2014 | Tsuda |
| 2014/0156545 A1 | 6/2014 | Clapham et al. |
| 2014/0250505 A1 | 9/2014 | Kim et al. |
| 2014/0274047 A1 | 9/2014 | Dhanda et al. |
| 2014/0295831 A1 | 10/2014 | Karra et al. |
| 2015/0018040 A1 | 1/2015 | He et al. |
| 2015/0079965 A1 | 3/2015 | Mullins |
| 2015/0281926 A1 | 10/2015 | Liu et al. |

(56) References Cited

U.S. PATENT DOCUMENTS

2015/0312876 A1   10/2015   Syrjärinne et al.
2016/0021248 A1   1/2016   Backhaus et al.

OTHER PUBLICATIONS

PCT International Search Report; International App. No. PCT/US2014/058248; Jan. 9, 2015; pp. 1-4.
U.S. Appl. No. 13/954,756, Hyde et al.
Evans, Keith; "How to Spoof a Caller ID"; eHow; Printed on Jan. 7, 2014; pp. 1-4; Demand Media, Inc.; located at http://www.ehow.com/how_5128156_spoof-carter-id.html.
Google; "About Google Voice"; Google Voice Help; 2014; Printed on Jan. 7, 2014; pp. 1-3; located at https://support.google.com/voice/answer/115061.
Google; "About the Google Voice Account types"; Google Voice Help; 2014; Printed on Jan. 7, 2014; pp. 1-4; located at https://support.google.com/voice/answer/115073.
Google; "Call forwarding with your Google number"; Google Voice Help; 2014; Printed on Jan. 7, 2014; pp. 1-2; located at https://support.google.com/voice/answer/165221.
Google; "Configure Google Voice"; Google Voice Help; 2014; Printed on Jan. 7, 2014; pp. 1-2; located at https://support.google.com/voice/answer/168519.
Google; "Customize voicemail greetings and settings"; Google Voice Help; 2014; Printed on Jan. 7, 2014; pp. 1-3; located at https://support.google.com/voice/answer/115069.
Google; "Make a call"; Google Voice Help; 2014; Printed on Jan. 7, 2014; pp. 1-3; located at https://support.google.com/voice/answer/173154.
Google; "Send text messages"; Google Voice Help; 2014; Printed on Jan. 7, 2014; pp. 1-2; located at https://support.google.com/voice/answer/173156.
Google; "Settings"; Google Voice Help; 2014; Printed on Jan. 7, 2014; pp. 1-2; located at https://support.google.com/voice/answer/168521.
Google; "Settings"; Google Voice Help; 2014; Printed on Jan. 7, 2014; pp. 1-2; located at https://support.google.com/voice/answer/173160.
Google; "Sharing a forwarding phone number"; Google Voice Help; 2014; Printed on Jan. 7, 2014; pp. 1-2; located at https://support.google.com/voice/answer/115105.
Google; "Temporary call forwarding"; Google Voice Help; 2014; Printed on Jan. 7, 2014; pp. 1-2; located at https://support.google.com/voice/answer/115084.
Google; "What's new in Google Voice"; Google Voice; 2011; Printed on Aug. 29, 2013; pp. 1-5; located at www.google.com/googlevoice/whatsnew.html.
Kozierok, Charles M.; "IP Datagram General Format"; The TCP/IP Guide; Version date Sep. 20, 2005; Printed on Sep. 5, 2013; pp. 1-5; located at www.tcpipguide.com/free/t_IPDatagramGeneralFormat.htm.
Truecaller; "How it works"; Printed on Jan. 7, 2014; pp. 1-6; True Software Scandinavia AB; located at http://www.truecaller.com/how-it-works.
"Learn English Online"; English Grammar—Clauses—Learn English; bearing a date of Sep. 12, 2016; pp. 1-4; Copyright 1999-2016 Learn English Network; located at: http://www.learingenglish.de/grammar/clausetext.html as provided by examiner.
"Learner's Dictionary mobile search"; Merriam-Webster; bearing a date of Sep. 12, 2016; 1 page; located at: http://www.learnersdictionary.com/ (as provided by examiner).

\* cited by examiner

| Fig. 3-A | Fig. 3-B | Fig. 3-C |
| --- | --- | --- |
| Fig. 3-D | Fig. 3-E | Fig. 3-F |
| Fig. 3-G | Fig. 3-H | Fig. 3-I |
| Fig. 3-J | Fig. 3-K | Fig. 3-L |
| Fig. 3-M | Fig. 3-N | Fig. 3-O |
| Fig. 3-P | Fig. 3-Q | Fig. 3-R |

Fig. 3-A

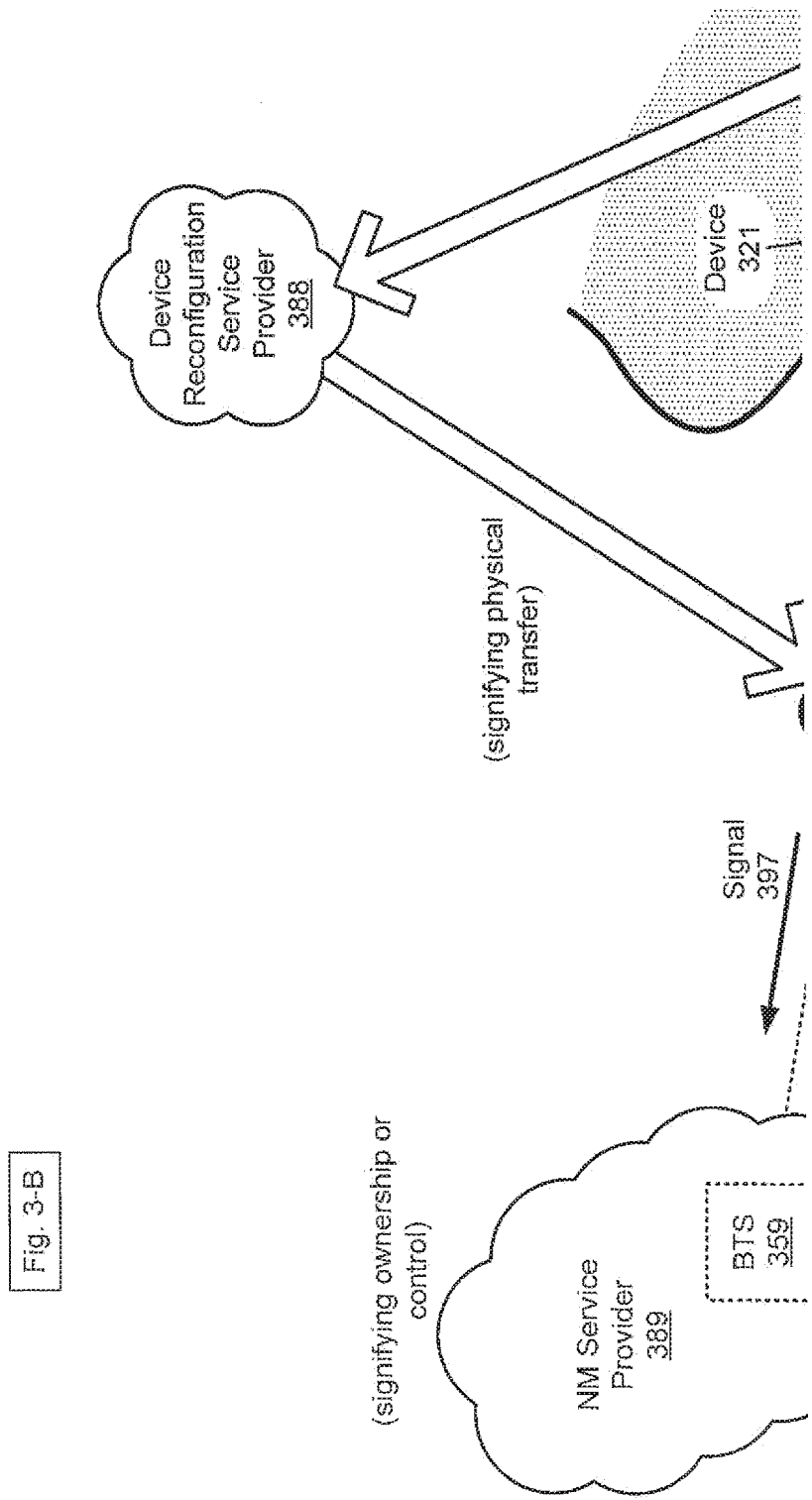

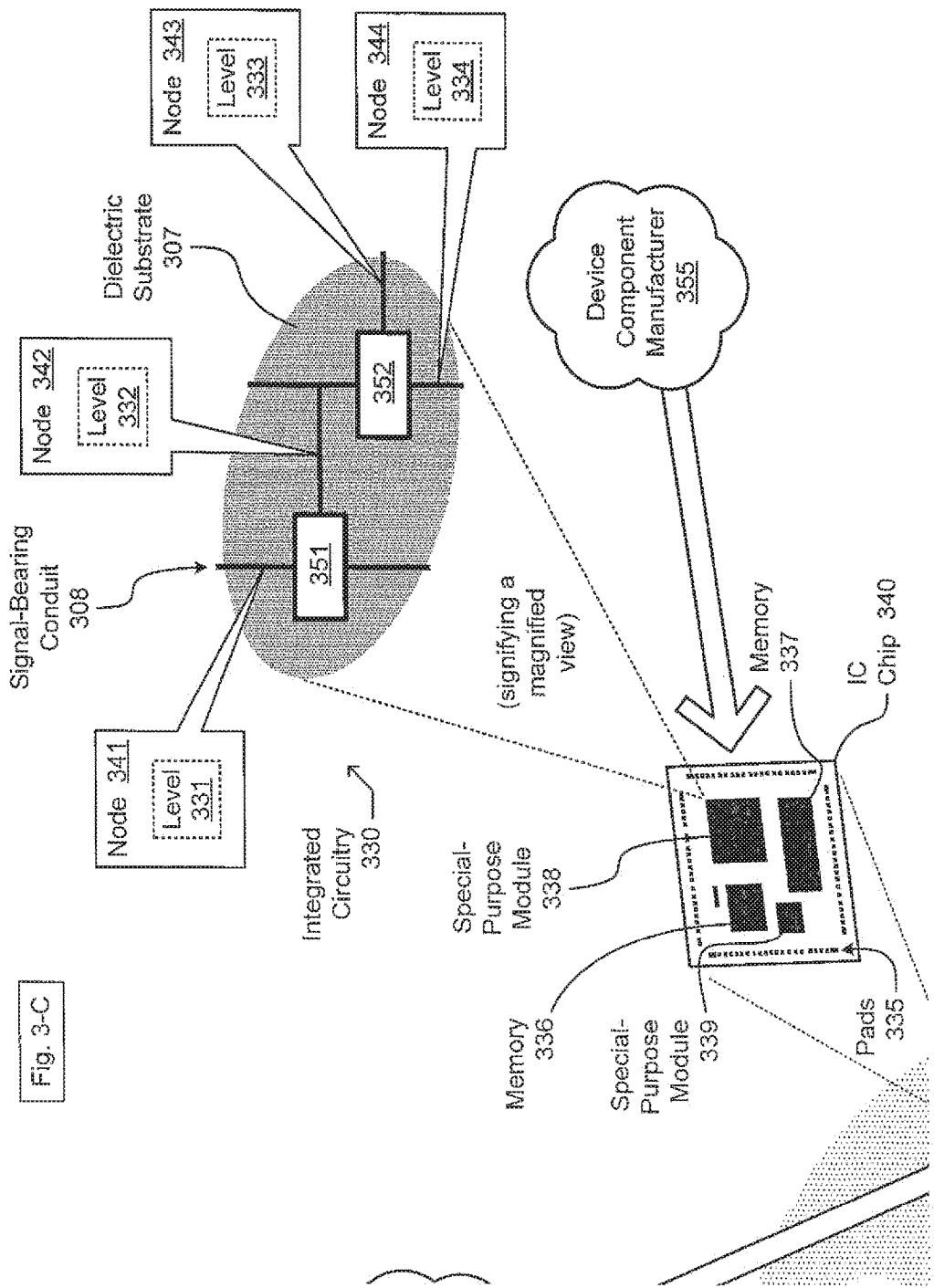

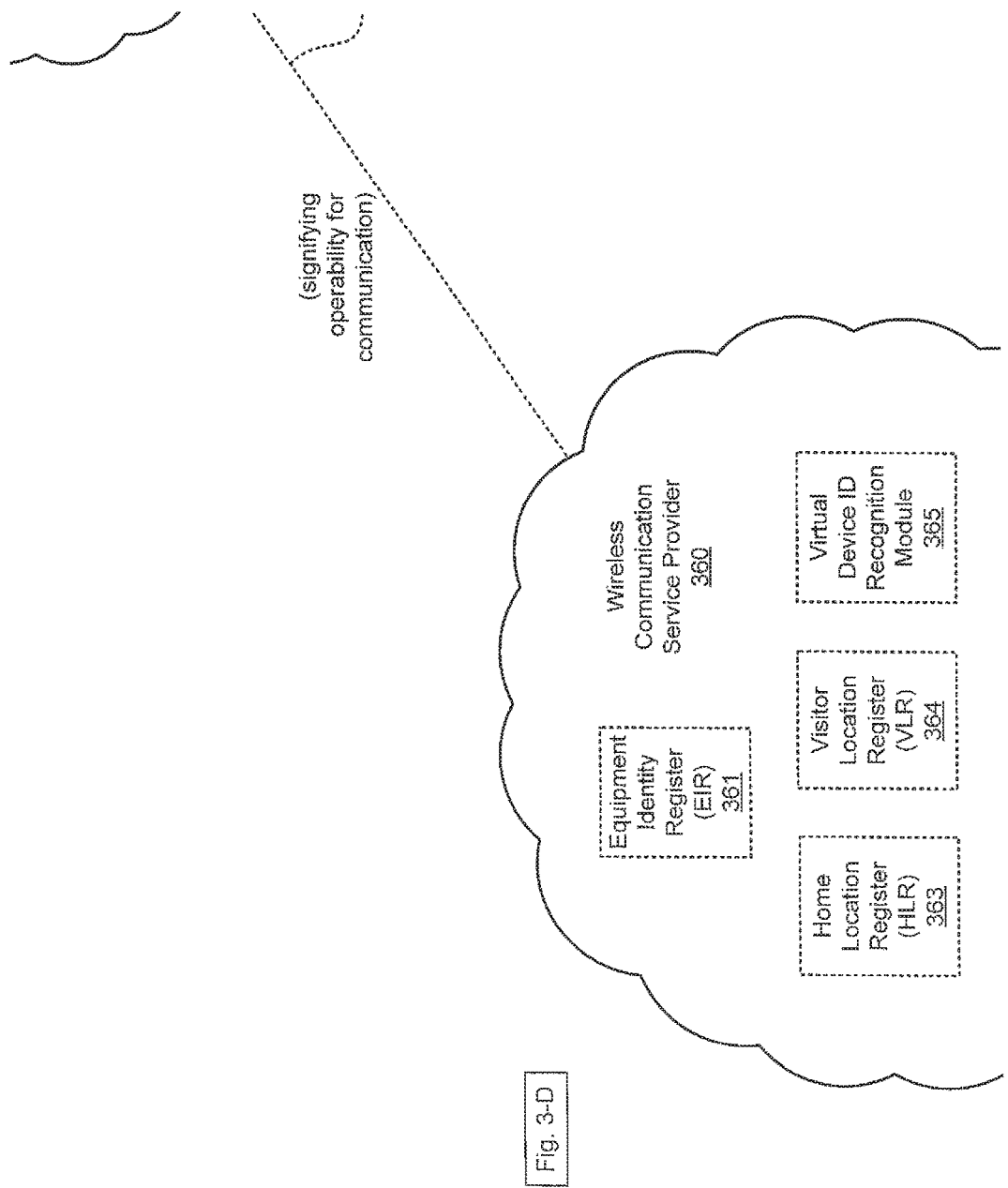

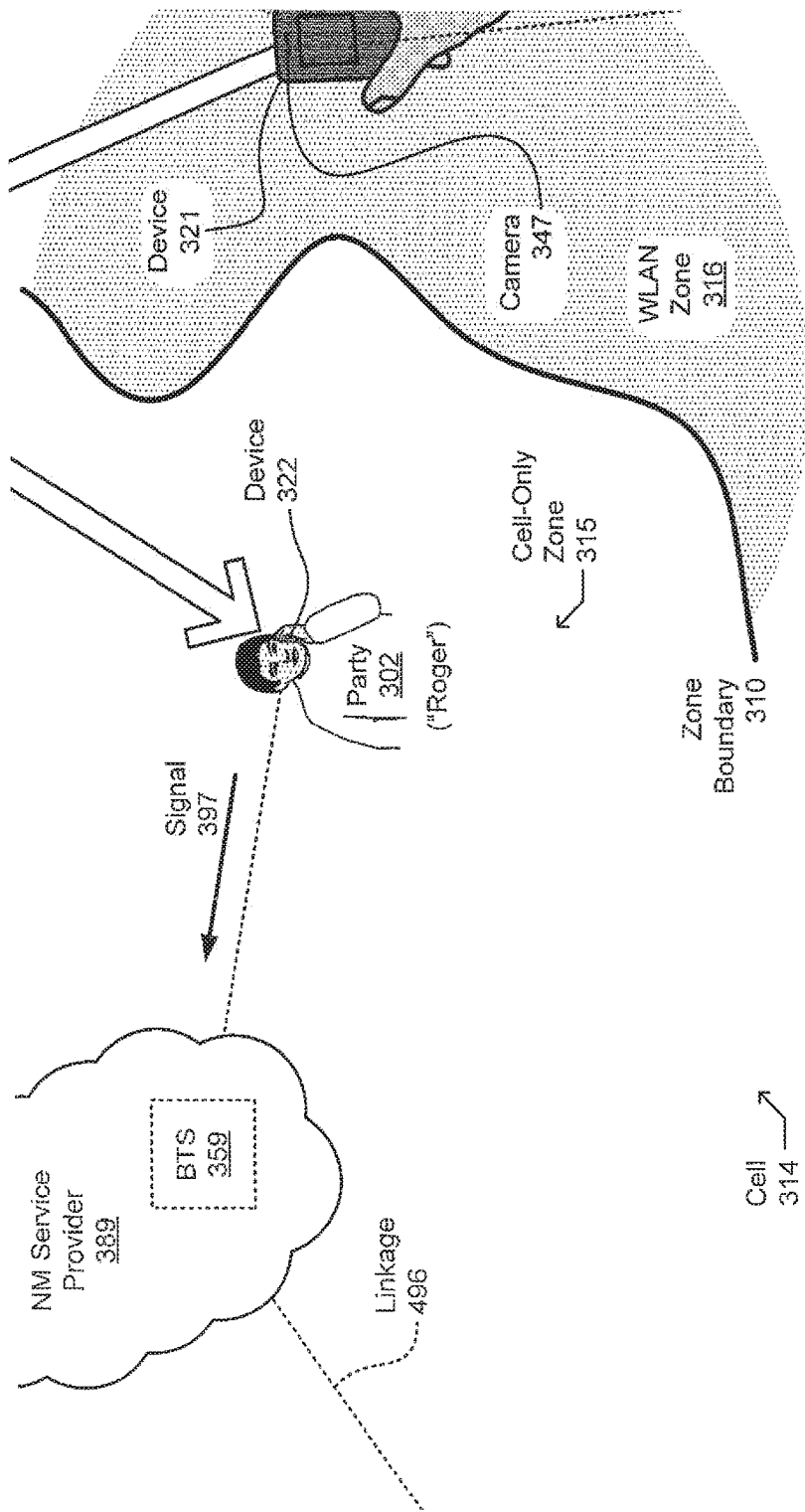

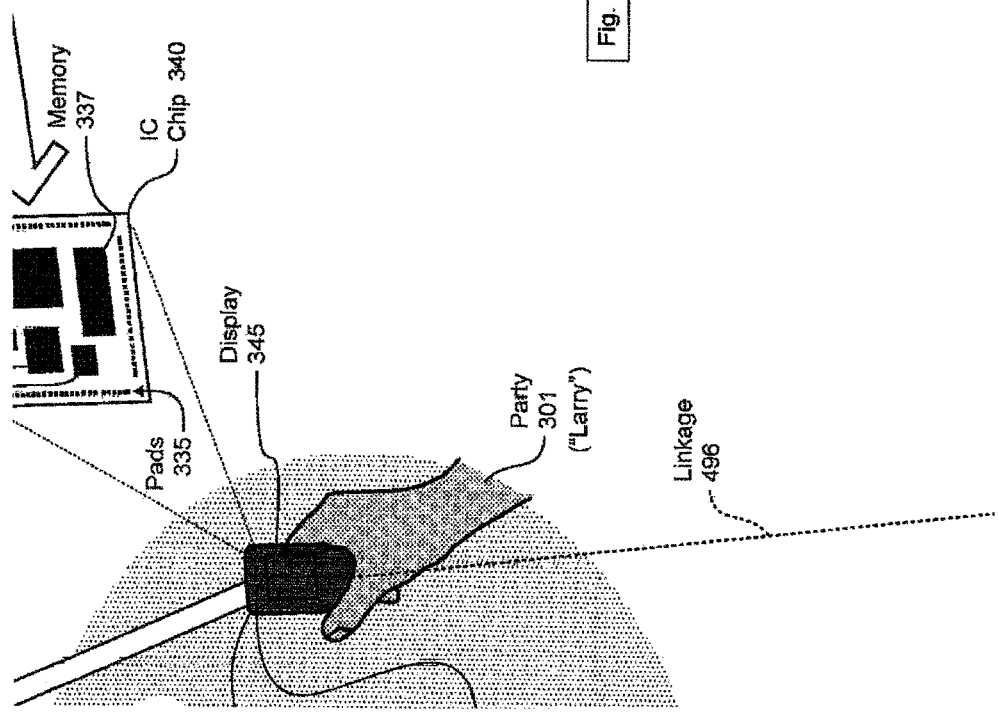

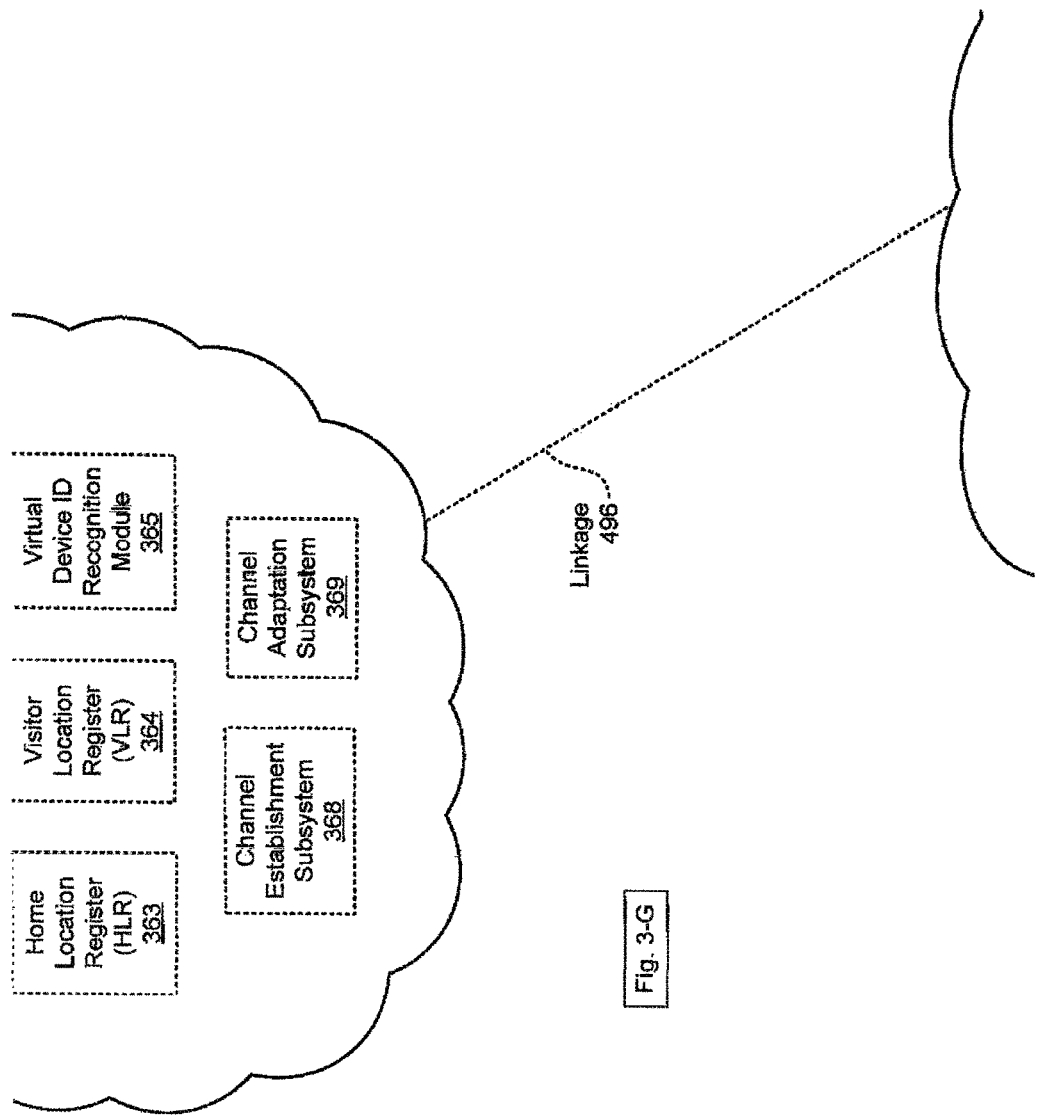
Fig. 3-G

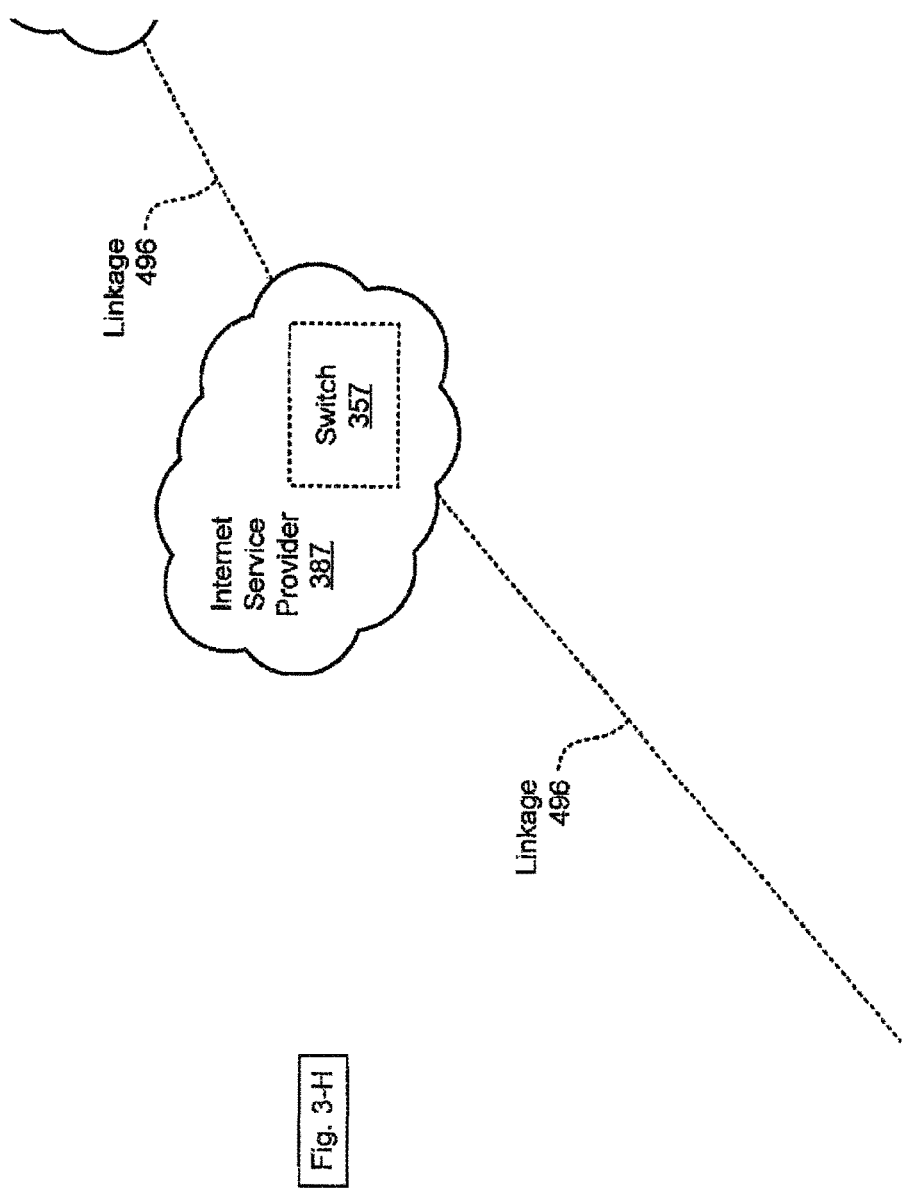

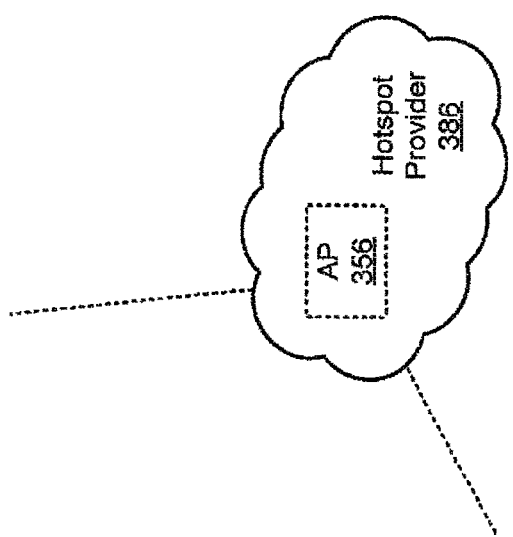

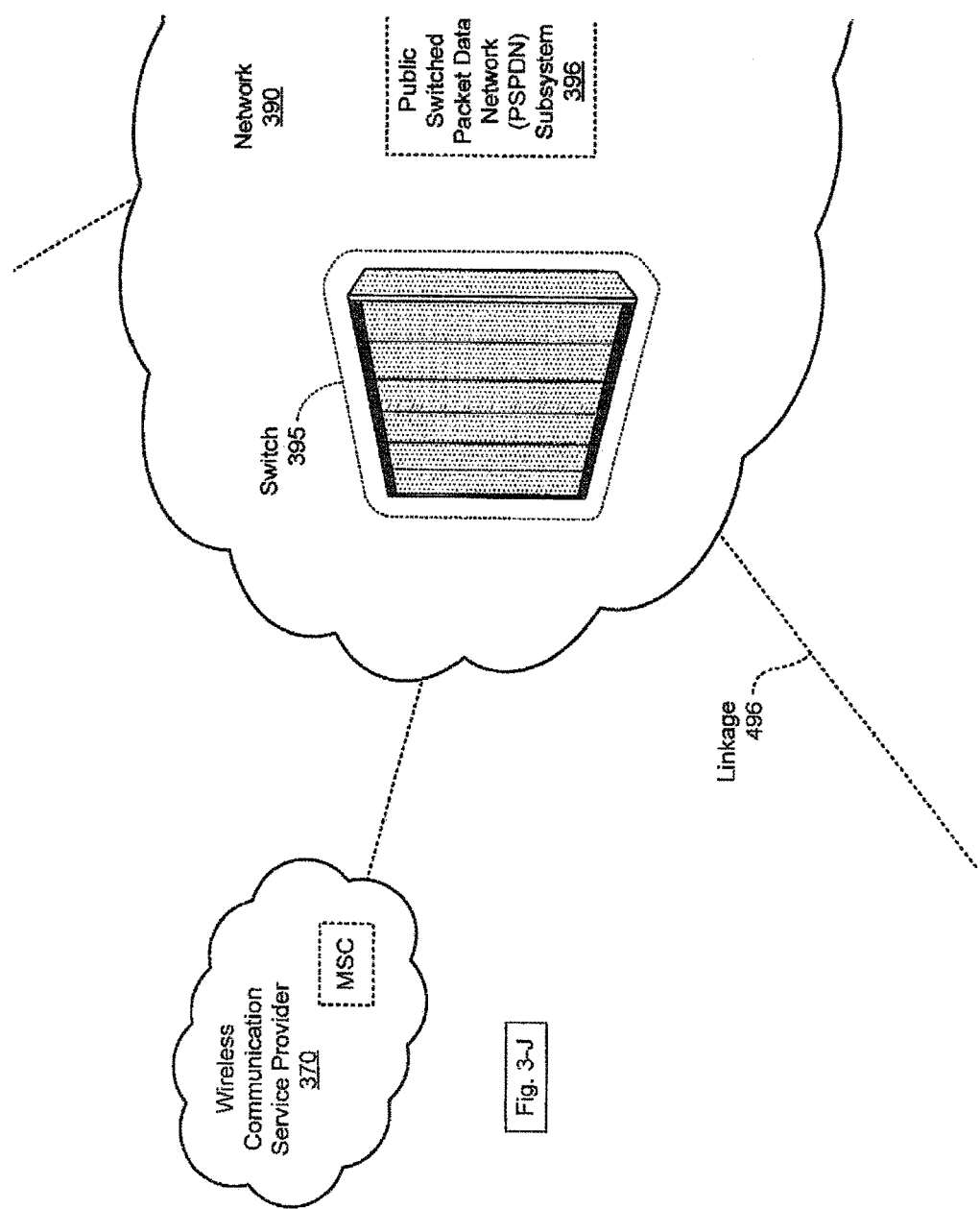

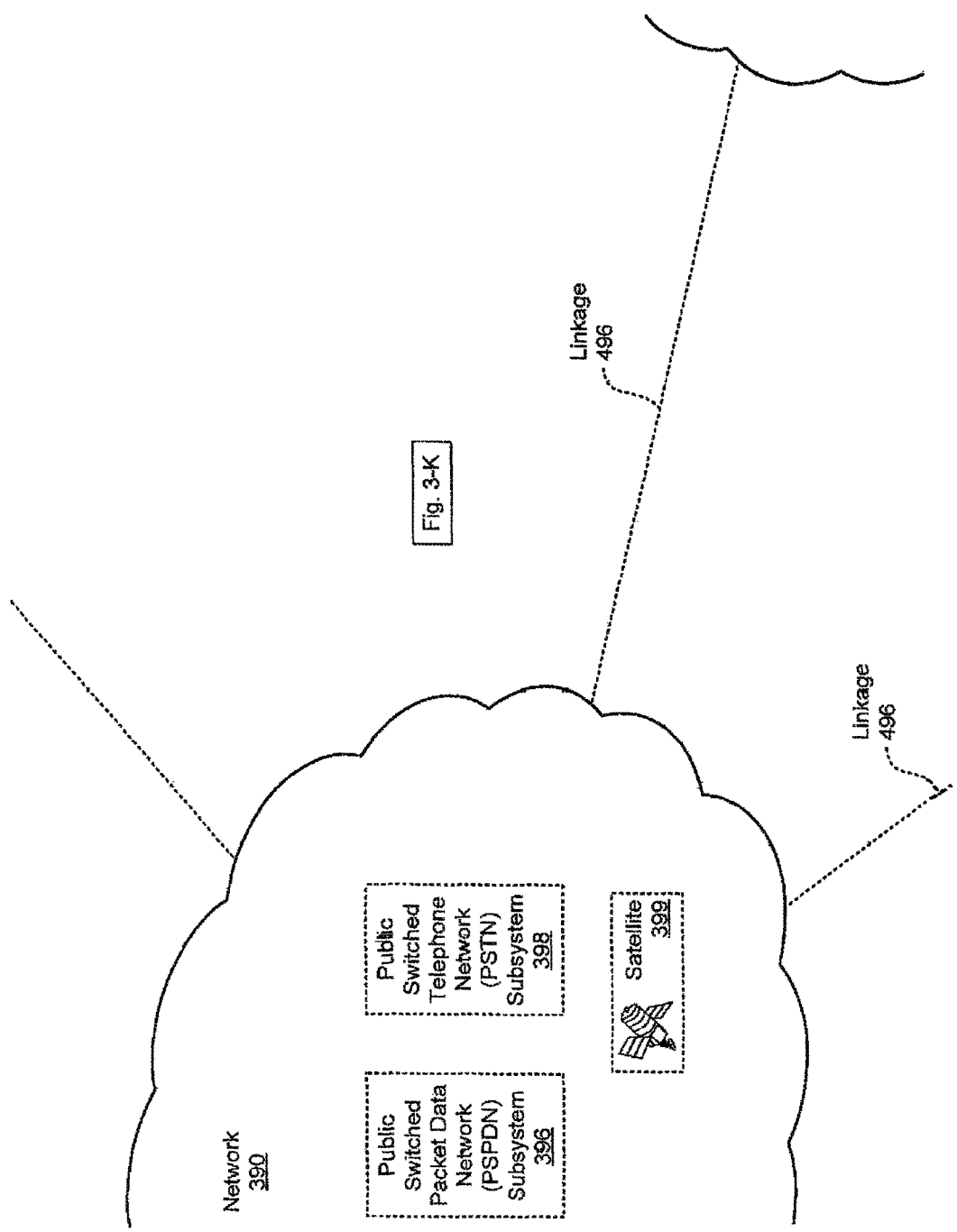

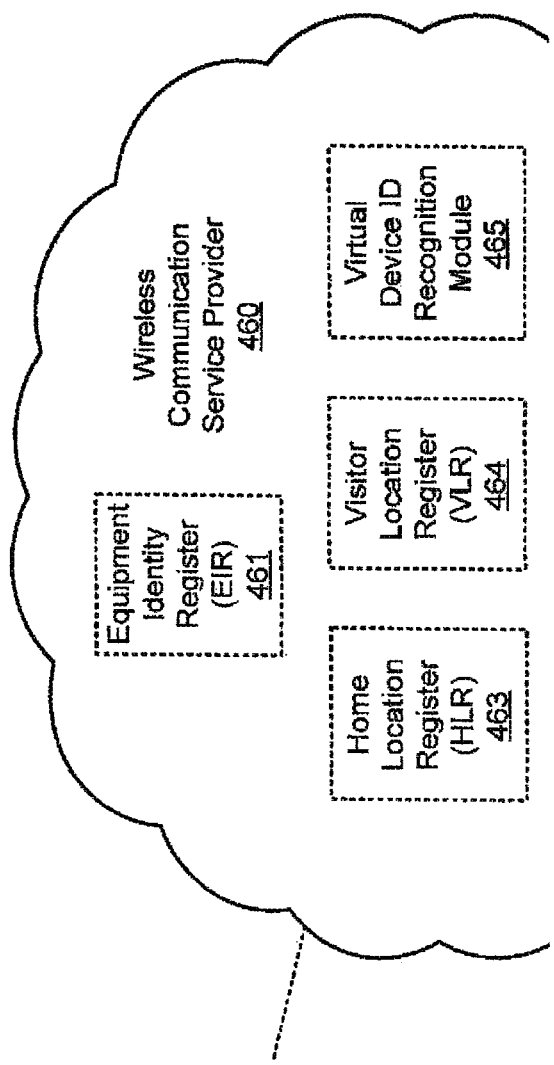

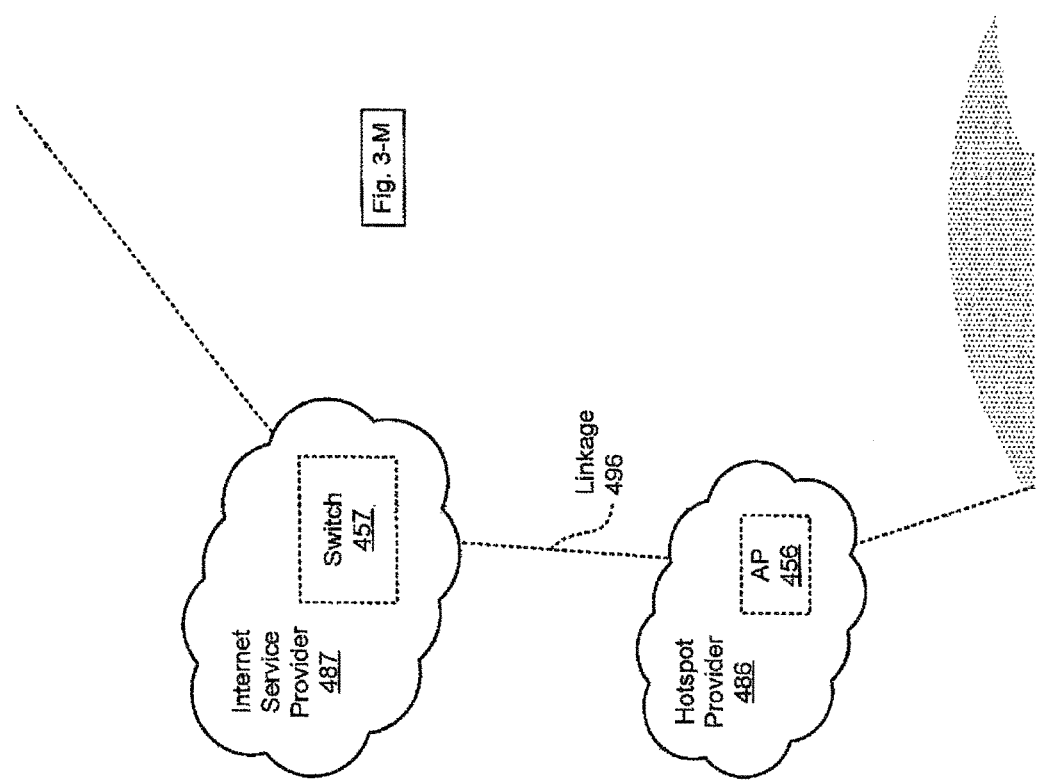

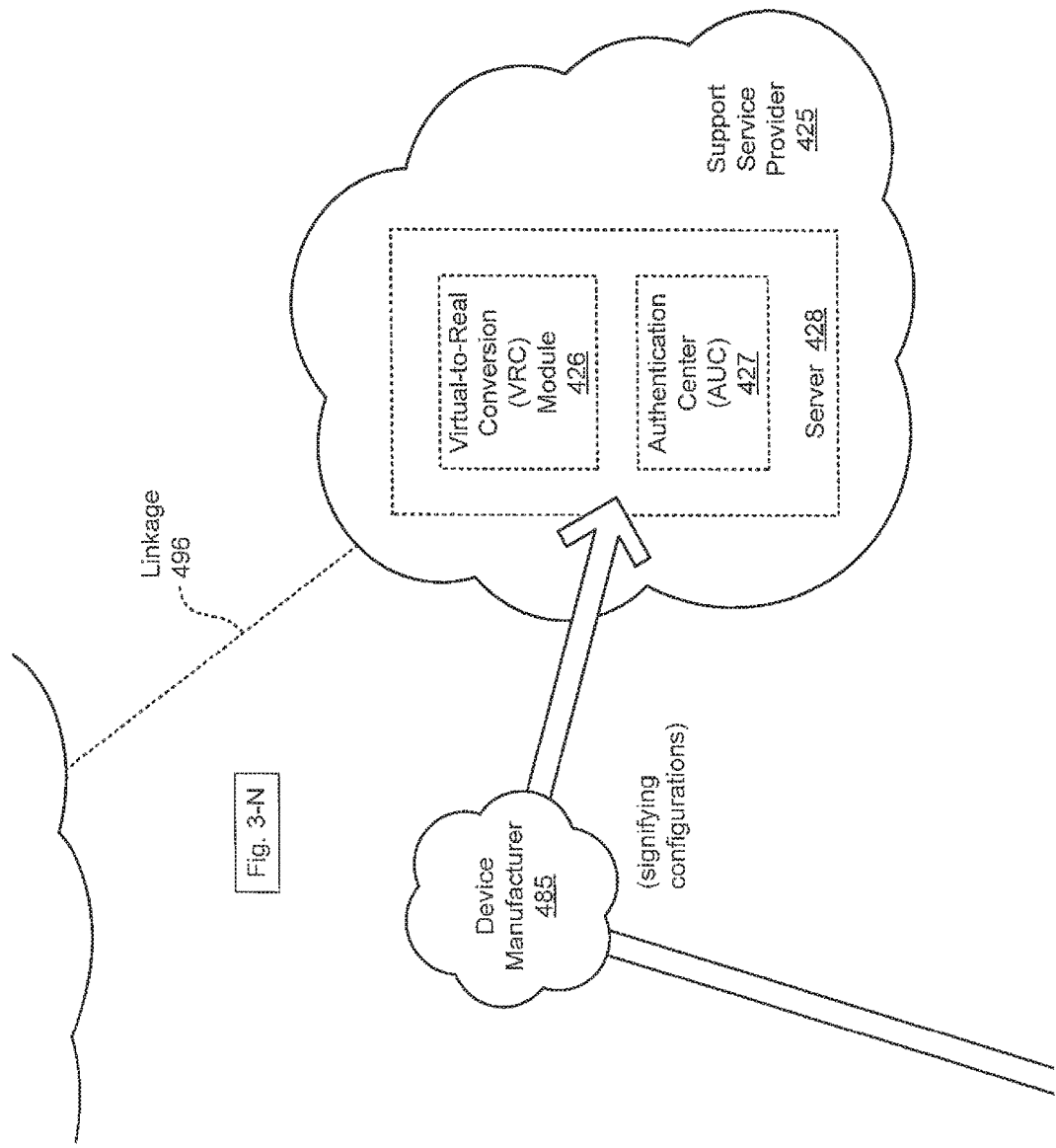

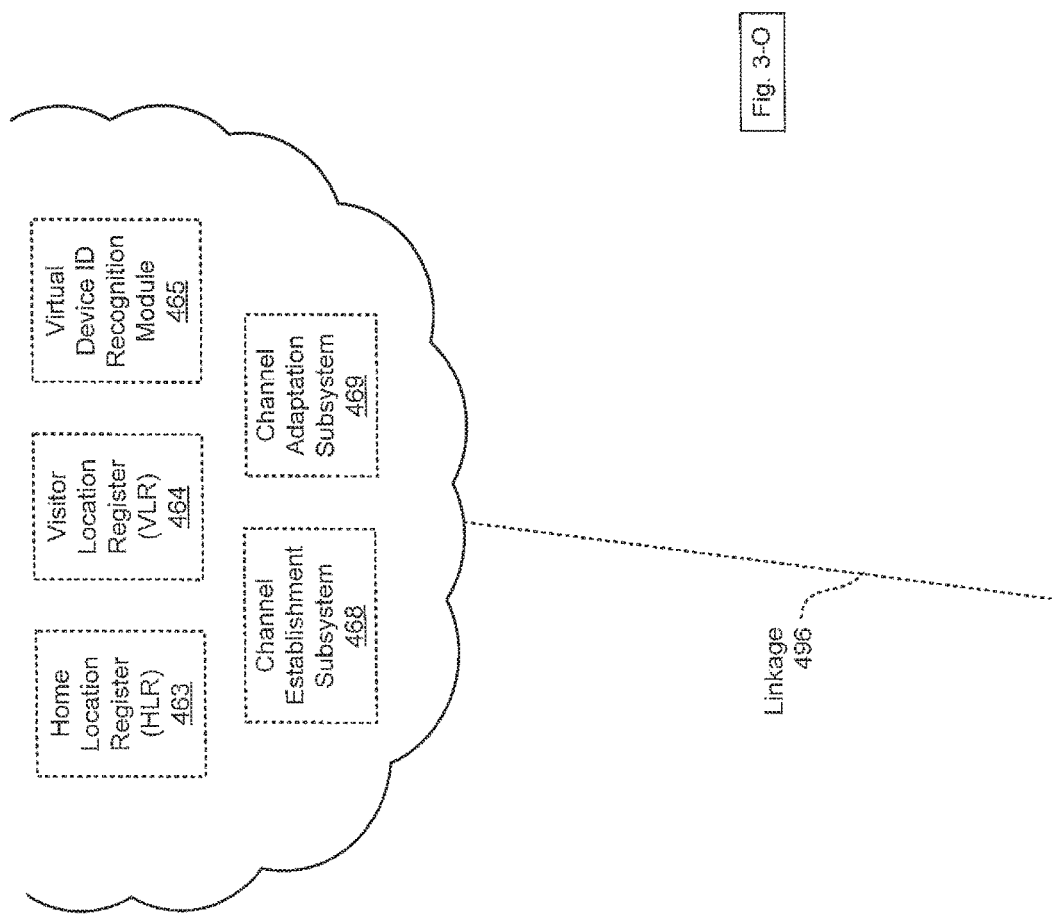

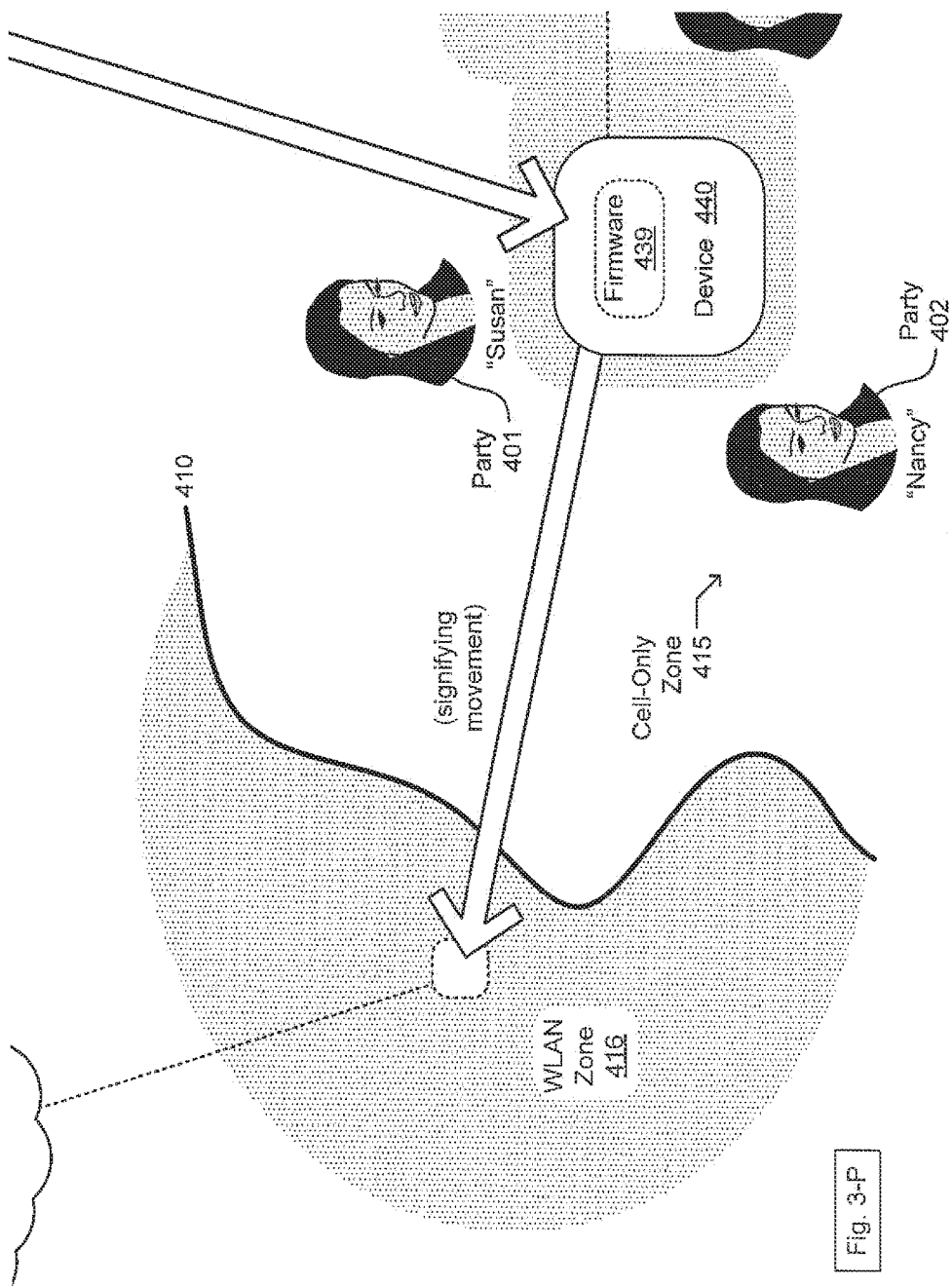

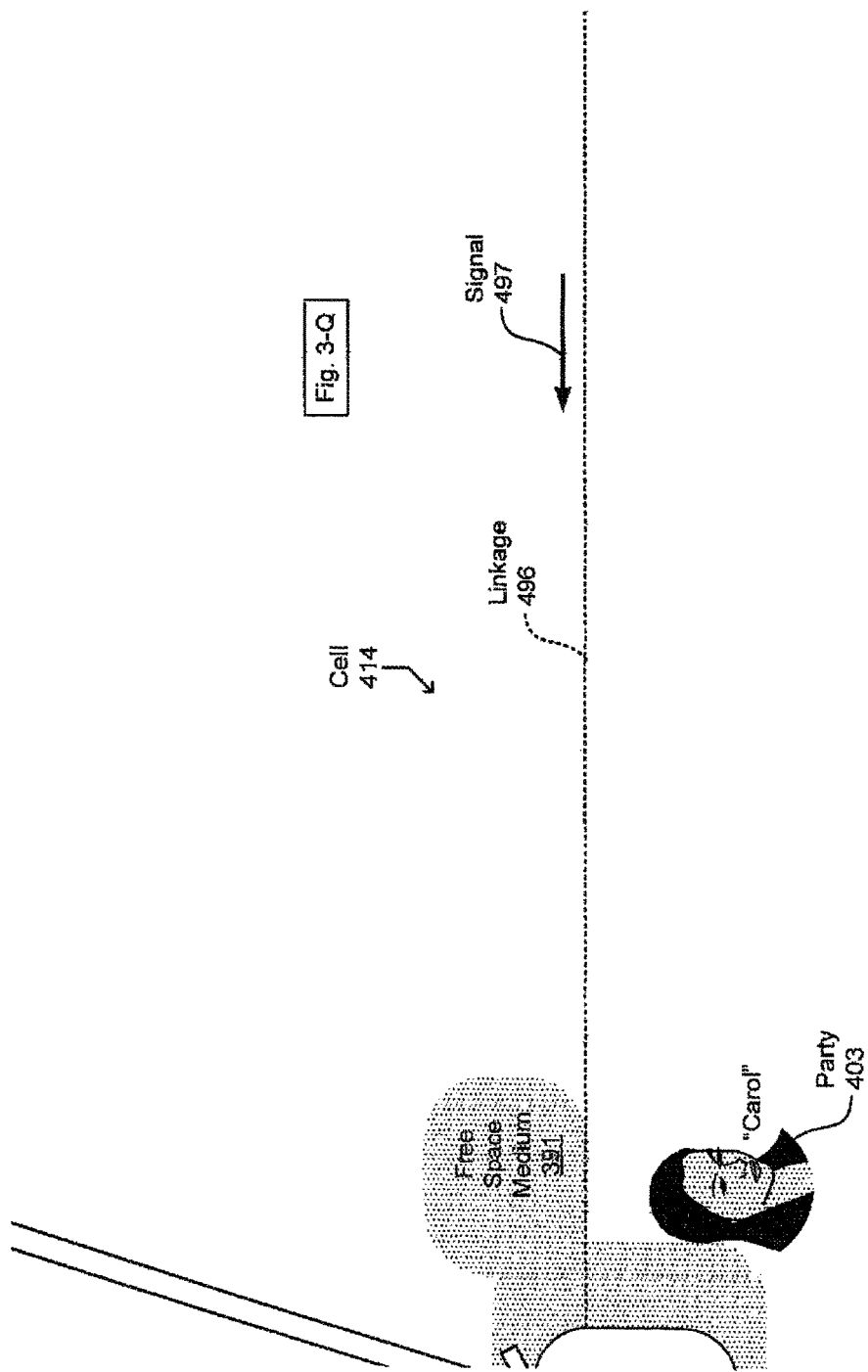

Fig. 3-R
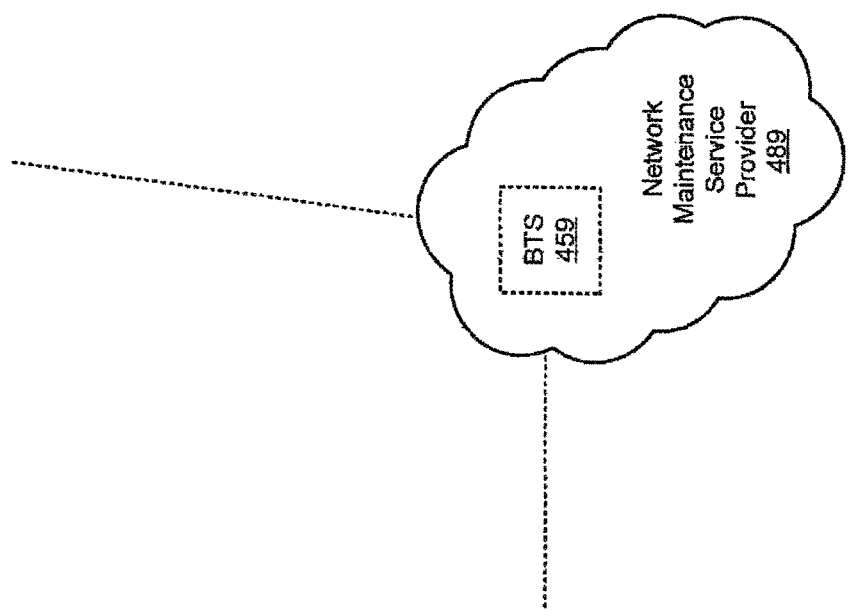

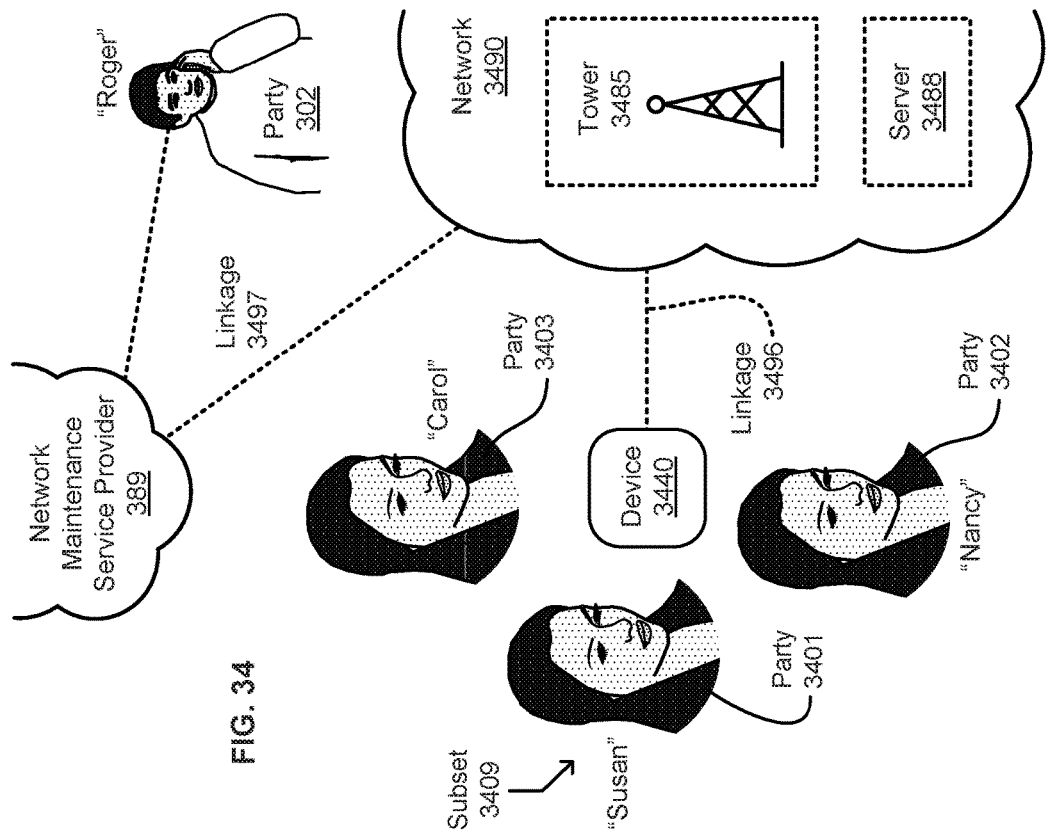
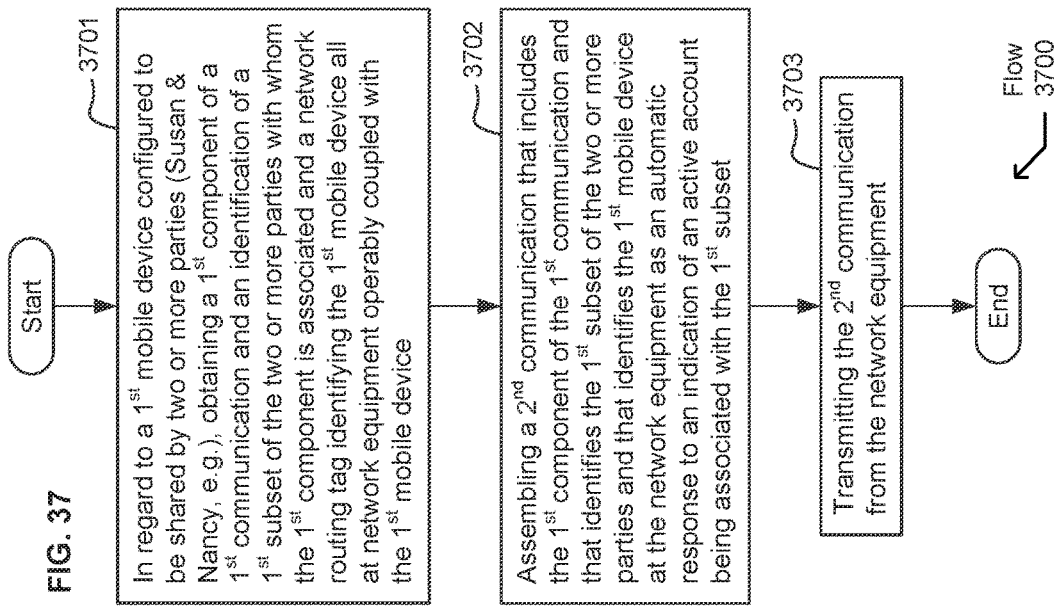

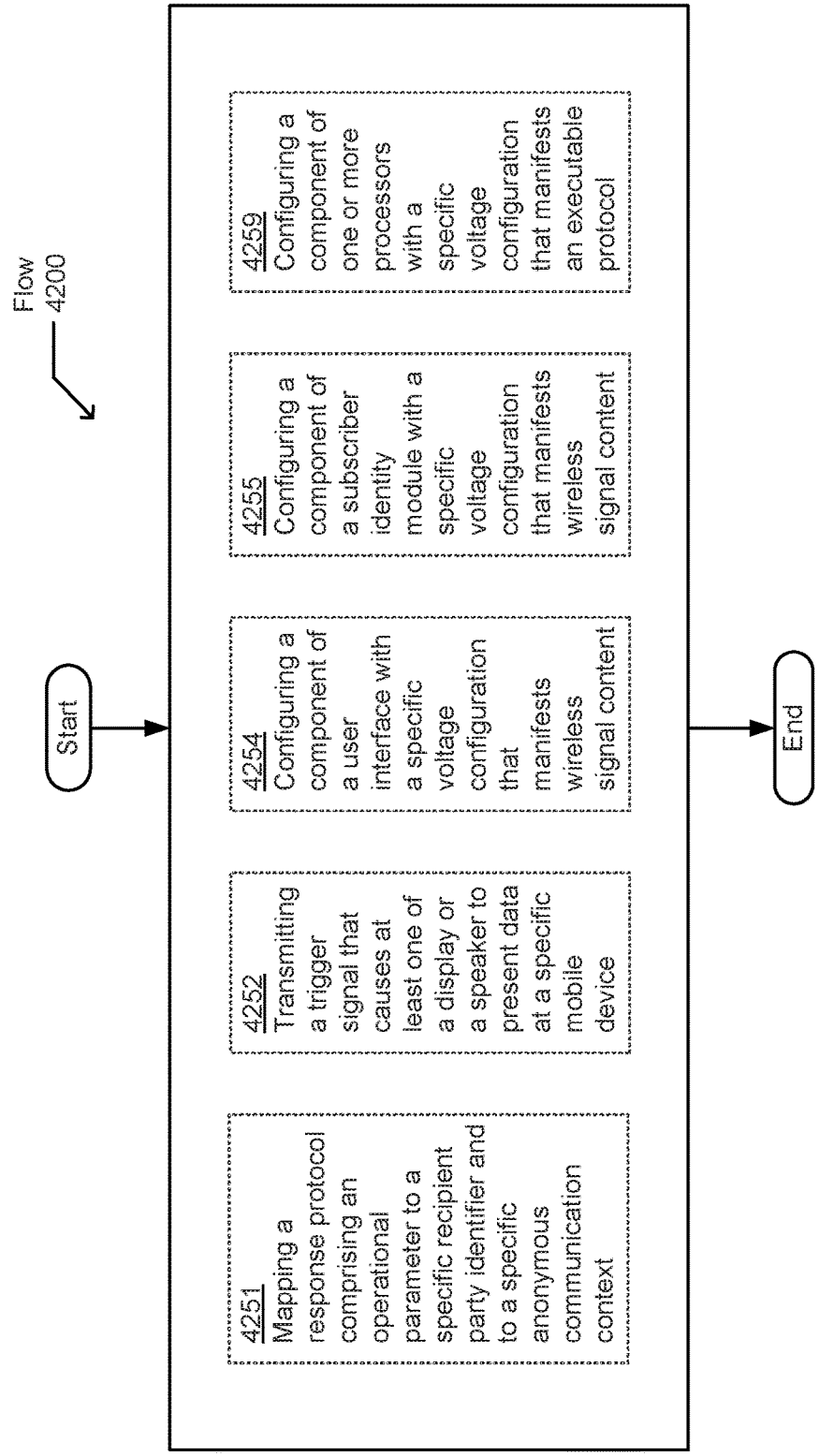

MOBILE DEVICE SHARING FACILITATION METHODS AND SYSTEMS OPERABLE IN NETWORK EQUIPMENT

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

For purposes of the USPTO extra-statutory requirements, the present application constitutes a continuation-in-part of U.S. patent application Ser. No. 14/042,192 entitled MOBILE DEVICE SHARING FACILITATION METHODS AND SYSTEMS, naming Edward K. Y. Jung; Royce A. Levien; Richard T. Lord; Robert W. Lord; and Mark A. Malamud as inventors, filed 30 Sep. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/150,271 entitled MOBILE DEVICE SHARING FACILITATION METHODS AND SYSTEMS, naming Edward K. Y. Jung; Royce A. Levien; Richard T. Lord; Robert W. Lord; and Mark A. Malamud as inventors, filed 8 Jan. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/150,386 entitled MOBILE DEVICE SHARING FACILITATION METHODS AND SYSTEMS, naming Edward K. Y. Jung; Royce A. Levien; Richard T. Lord; Robert W. Lord; and Mark A. Malamud as inventors, filed 8 Jan. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/150,524 entitled MOBILE DEVICE SHARING FACILITATION METHODS AND SYSTEMS, naming Edward K. Y. Jung; Royce A. Levien; Richard T. Lord; Robert W. Lord; and Mark A. Malamud as inventors, filed 8 Jan. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/175,438 entitled MOBILE DEVICE SHARING FACILITATION METHODS AND SYSTEMS, naming Edward K. Y. Jung; Royce A. Levien; Richard T. Lord; Robert W. Lord; and Mark A. Malamud as inventors, filed 7 Feb. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/175,511 entitled MOBILE DEVICE SHARING FACILITATION METHODS AND SYSTEMS, naming Edward K. Y. Jung; Royce A. Levien; Richard T. Lord; Robert W. Lord; and Mark A. Malamud as inventors, filed 7 Feb. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/175,617 entitled MOBILE DEVICE SHARING FACILITATION METHODS AND SYSTEMS, naming Edward K. Y. Jung; Royce A. Levien; Richard T. Lord; Robert W. Lord; and Mark A. Malamud as inventors, filed 7 Feb. 2014, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and of any and all parent, grandparent, great-grandparent, etc. applications of the Priority Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

Under the auspices of various alleged "rules" implementing the America Invents Act (AIA), the United States Patent and Trademark Office (USPTO) is purporting to require that an Attorney for a Client make various legal and/or factual statements/commentaries/admissions (e.g. Concerning any "Statement under 37 CFR 1.55 or 1.78 for AIA (First Inventor to File) Transition Application") related to written description/new matter, and/or advise his Client to make such legal and/or factual statements/commentaries/admissions. Attorney expressly points out that the burden of both alleging that an application contains new matter with respect to its parent(s) and establishing a prima facie case of lack of written description under 35 U.S.C. §112, first paragraph lies firmly on the USPTO. Accordingly, and expressly in view of duties owed his client, Attorney further points out that the AIA legislation, while referencing the first to file, does not appear to constitute enabling legislation that would empower the USPTO to compel an Attorney to either make/advise such legal and/or factual statements/commentaries/admissions. Notwithstanding the foregoing, Attorney/Applicant understand that the USPTO's computer programs/personnel have certain data entry requirements, and hence Attorney/Applicant have provided a designation(s) of a relationship between the present application and its parent application(s) as set forth herein and in any ADS filed in this application, but expressly points out that such designation(s) are not to be construed in any way as any type of commentary and/or admission as to whether or not a claim in the present application is supported by a parent application, or whether or not the present application contains any new matter in addition to the matter of its parent application(s) in general and/or especially as such might relate to an effective filing date before, on, or after 16 Mar. 2013.

Insofar that the Attorney/Applicant may have made certain statements in view of practical data entry requirements of the USPTO should NOT be taken as an admission of any sort. Attorney/Applicant hereby reserves any and all rights to contest/contradict/confirm such statements at a later time. Furthermore, no waiver (legal, factual, or otherwise), implicit or explicit, is hereby intended (e.g., with respect to any statements/admissions made by the Attorney/Applicant in response to the purported requirements of the USPTO related to the relationship between the present application and parent application[s], and/or regarding new matter or alleged new matter relative to the parent application[s]). For example, although not expressly stated and possibly despite a designation of the present application as a continuation-in-part of a parent application, Attorney/Applicant may later assert that the present application or one or more of its claims do not contain any new matter in addition to the matter of its parent application[s], or vice versa.

TECHNICAL FIELD

This disclosure relates to facilitating connectivity in wireless communications.

SUMMARY

Various embodiments and contexts are presented, many of which concern a mobile device "configured to be shared by two or more parties" (that include a first party and a second party, e.g.). As used herein, that term does not generally include a conventional telephone that has only been assigned a single phone number (that users of the device all give out as a "house phone #" shared by roommates, e.g.). Neither does it include a speakerphone that merely causes a remote party's voice uttering names of local parties to be presented at a local interface (e.g. "hey, are Capulet or Juliet available?"). Likewise a mobile device "configured to be shared" may comprise a device with special-purpose circuitry by which a selected subset of users of the device can be remotely addressed (one or more individuals authorized to receive an incoming call or message without initiating any message retrieval, e.g.) as described below, but does not include a conventional mobile device by which several parties simultaneously use a single microphone positioned among them (to sing in unison, e.g.). Neither does it describe a mobile device by which users merely take turns retrieving their respective messages from a cloud server in a conventional manner. The mere use of a conventional mobile device by more than one party does not render the device "configured to be shared" as that term is used herein.

An embodiment provides a method concerning a mobile device configured to be shared by two or more parties. In one implementation, the method includes but is not limited to determining that a first portion of a first communication signifies a first subset of the two or more parties to whom a second portion of the first communication is directed and configuring a second communication to include an identifier of the first mobile device as a first component and to include an identifier of the first subset of the two or more parties as a second component and to include the second portion of the first communication directed to the first subset of the two or more parties as a third component and transmitting the second communication. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry configured to determine that a first portion of a first communication signifies a first subset of the two or more parties to whom a second portion of the first communication is directed and circuitry configured to cause a second communication to include an identifier of the first mobile device as a first component and to include an identifier of the first subset of the two or more parties as a second component and to include the second portion of the first communication directed to the first subset of the two or more parties as a third component and circuitry configured to transmit the second communication. In addition to the foregoing, other system aspects are described in the claims, drawings, and text forming a part of the present disclosure.

An embodiment provides an article of manufacture including a computer program product. In one implementation, the article of manufacture includes but is not limited to a tangible medium configured bear a device-detectable implementation or output manifesting an occurrence of a method related to determining that a first portion of a first communication signifies a first subset of the two or more parties to whom a second portion of the first communication is directed and configuring a second communication to include an identifier of the first mobile device as a first component and to include an identifier of the first subset of the two or more parties as a second component and to include the second portion of the first communication directed to the first subset of the two or more parties as a third component and transmitting the second communication. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for determining that a first portion of a first communication signifies a first subset of the two or more parties to whom a second portion of the first communication is directed and causing a second communication to include an identifier of the first mobile device as a first component and to include an identifier of the first subset of the two or more parties as a second component and to include the second portion of the first communication directed to the first subset of the two or more parties as a third component and transmitting the second communication. In addition to the foregoing, other system aspects are described in the claims, drawings, and text forming a part of the present disclosure.

An embodiment provides a method. In one implementation, the method includes but is not limited to obtaining a first communication having both a first routing tag and first user content and causing both a selective identification of a first subset of the two or more parties derived from the first routing tag and the first user content to be transmitted in a second communication having a second routing tag also derived from the first routing tag. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry configured to obtain a first communication having both a first routing tag and first user content and circuitry configured to cause both a selective identification of a first subset of the two or more parties derived from the first routing tag and the first user content to be transmitted in a second communication having a second routing tag also derived from the first routing tag. In addition to the foregoing, other system aspects are described in the claims, drawings, and text forming a part of the present disclosure.

An embodiment provides an article of manufacture including a computer program product. In one implementation, the article of manufacture includes but is not limited to a tangible medium configured bear a device-detectable implementation or output manifesting an occurrence of a method related to obtaining a first communication having both a first routing tag and first user content and causing both a selective identification of a first subset of the two or more parties derived from the first routing tag and the first user content to be transmitted in a second communication having a second routing tag also derived from the first routing tag. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining a first communication having both a first routing tag and first user content and causing both a selective identification of a first subset of the two or more parties derived from the first routing tag and the first user content to be transmitted in a second communication having a second routing tag also derived from the first routing tag. In addition to the foregoing, other system aspects are described in the claims, drawings, and text forming a part of the present disclosure.

An embodiment provides a method. In one implementation, the method includes but is not limited to obtaining a first component of a first communication and an identification of a first subset of the two or more parties with whom the first component is associated and a network routing tag identifying the first mobile device all at network equipment operably coupled with the first mobile device and assembling a second communication that includes the first component of the first communication and identifies the first subset of the two or more parties and identifies the first mobile device at the network equipment as an automatic response to an indication of an active account being associated with the first subset and transmitting the second communication from the network equipment. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry configured to obtain a first component of a first communication and an identification of a first subset of the two or more parties with whom the first component is associated and a network routing tag identifying the first mobile device all at network equipment operably coupled with the first mobile device and circuitry configured to assemble a second communication that includes the first component of the first communication and identifies the first subset of the two or more parties and identifies the first mobile device at the network equipment as an automatic response to an indication of an active account being associated with the first subset and circuitry configured to transmit the second communication from the network equipment. In addition to the foregoing, other system aspects are described in the claims, drawings, and text forming a part of the present disclosure.

An embodiment provides an article of manufacture including a computer program product. In one implementation, the article of manufacture includes but is not limited to a tangible medium configured bear a device-detectable implementation or output manifesting an occurrence of a method related to obtaining a first component of a first communication and an identification of a first subset of the two or more parties with whom the first component is associated and a network routing tag identifying the first mobile device all at network equipment operably coupled with the first mobile device and assembling a second communication that includes the first component of the first communication and identifies the first subset of the two or more parties and identifies the first mobile device at the network equipment as an automatic response to an indication of an active account being associated with the first subset and transmitting the second communication from the network equipment. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining a first component of a first communication and an identification of a first subset of the two or more parties with whom the first component is associated and a network routing tag identifying the first mobile device all at network equipment operably coupled with the first mobile device and assembling a second communication that includes the first component of the first communication and identifies the first subset of the two or more parties and identifies the first mobile device at the network equipment as an automatic response to an indication of an active account being associated with the first subset and transmitting the second communication from the network equipment. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth below.

BRIEF DESCRIPTION OF SEVERAL VIEWS OF THE DRAWING

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3-A depicts a 3×6 grid of view identifiers of the 18 respective component views of FIG. 3.

FIG. 3-B comprises a portion of FIG. 3 that depicts a device reconfiguration service provider.

FIG. 3-C comprises a portion of FIG. 3 that depicts in integrated circuit chip and a device component manufacturer.

FIG. 3-D comprises a portion of FIG. 3 that depicts a first wireless communication service provider.

FIG. 3-E comprises a portion of FIG. 3 that depicts a party using a first mobile device after it is reconfigured (to facilitate device sharing via one or more dependent identifiers, e.g.).

FIG. 3-F comprises a portion of FIG. 3 that depicts another party using the first mobile device before it is reconfigured.

FIG. 3-G comprises a portion of FIG. 3 that depicts additional network subsystems.

FIG. 3-H comprises a portion of FIG. 3 that depicts an internet service provider (ISP).

FIG. 3-I comprises a portion of FIG. 3 that depicts a hotspot provider.

FIG. 3-J comprises a portion of FIG. 3 that depicts a switch.

FIG. 3-K comprises a portion of FIG. 3 that depicts additional network subsystems.

FIG. 3-L comprises a portion of FIG. 3 that depicts first resources of a second wireless communication service provider.

FIG. 3-M comprises a portion of FIG. 3 that depicts a second internet service provider.

FIG. 3-N comprises a portion of FIG. 3 that depicts a support service provider and a device manufacturer.

FIG. 3-O comprises a portion of FIG. 3 that depicts second resources of the second wireless communication service provider.

FIG. 3-P comprises a portion of FIG. 3 that depicts a wireless local area network (WLAN) zone and parties who can use a second mobile device.

FIG. 3-Q comprises a portion of FIG. 3 that depicts another party who can use the second mobile device.

FIG. 3-R comprises a portion of FIG. 3 that depicts a network maintenance service provider that can facilitate cellular service to the second mobile device.

FIG. 34 depicts an exemplary environment in which one or more technologies may be implemented between respective parties.

FIG. 37 depicts a high-level logic flow of an operational process (described with reference to FIG. 32, e.g.).

FIG. 42 likewise depicts variants of earlier-presented flows.

DETAILED DESCRIPTION

Figure 1:
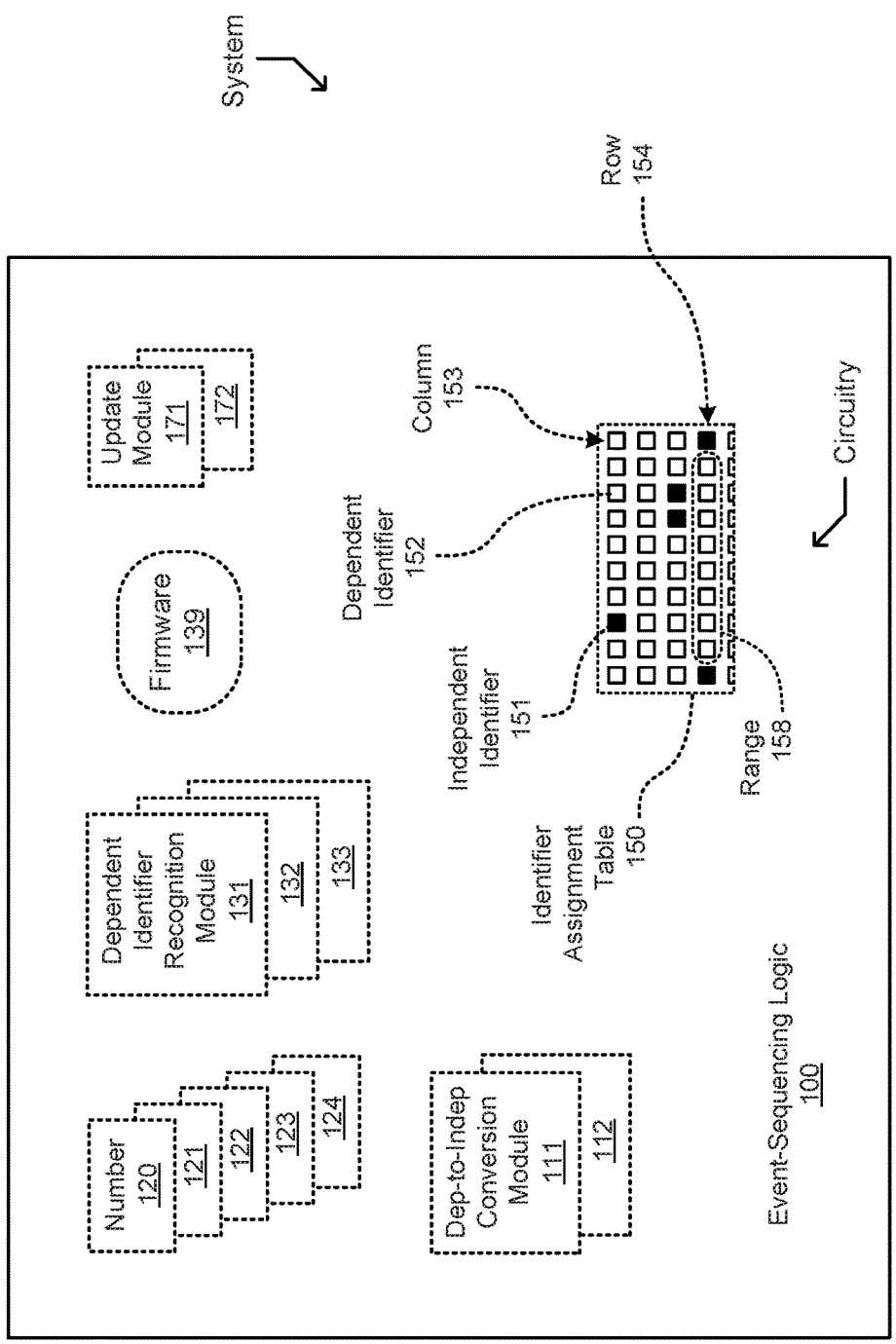
FIG. 1 depicts an exemplary environment in which one or more technologies may be implemented, including event-sequencing logic (a schematic depiction of an electronic or electromechanical apparatus implemented as circuitry, e.g.).

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies.

See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 4128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines which allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient work flows. Such systems and machines may be trained to operate with particular users, either through explicit training or through repeated interactions. Nevertheless, when that system is upgraded or replaced, e.g., a new television is purchased, that training may be lost with the device. Thus, in some embodiments described herein, adaptation data for speech recognition systems may be separated from the device which recognizes the speech, and may be more closely associated with a user, e.g., through a device carried by the user, or through a network location associated with the user.

Further, in some environments, there may be more than one device that transmits and receives data within a range of interacting with a user. For example, merely sitting on a couch watching television may involve five or more devices, e.g., a television, a cable box, an audio/visual receiver, a remote control, and a smartphone device. Some of these devices may transmit or receive speech data. Some of these devices may transmit, receive, or store adaptation data, as will be described in more detail herein. Thus, in some embodiments, which will be described in more detail herein, there may be methods, systems, and devices for determining which devices in a system should perform actions that allow a user to efficiently interact with an intended device through that user's speech.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

There are circumstances in which a person who uses mobile communication or computing devices (smartphones or tablet computers, e.g.) might benefit from sharing the devices for a period (of an hour or more, e.g.) with one or more other people. Likewise there are circumstances in which such devices may be used more effectively by operating them as virtual mobile devices (as guests on a physical device or in a cloud service implementation, e.g.) or by using virtual identifiers (phone numbers, e.g.) that effectively correspond to a virtual party (of one or more human beings, e.g.) for an extended period (of up to a few years, e.g.). Although services like call forwarding or Google Voice provide device users with various capabilities in conjunction with mobile phones, such capabilities do not adequately take into account the unique characteristics of mobile devices or the needs and preferences of users with only a limited access to them. Various device configurations and protocols described herein address these shortcomings. In the interest of concision and according to standard usage in communication technologies, such features are set forth in natural language expressions. It will be understood by those skilled in the art that such expressions (functions or acts recited in English, e.g.) adequately describe structures identified below so that no undue experimentation will be required for their implementation.

With reference now to FIG. 1, a system is shown in schematic form comprising event-sequencing logic 100 (transistor-based circuitry including electrical node sets each having a voltage configuration that manifests an informational structure, e.g.). Event-sequencing logic 100 includes one or more instances of dependent-to-independent conversion modules 111, 112; of mobile numbers 120, 121, 122, 123, 124; of dependent identifier recognition modules 131, 132, 133; of update modules 171, 172; of identifier assignment tables 150; or of other such entities. In some variants, as described below, some or all of these may (optionally) reside in firmware 139. Alternatively or additionally, each such instance of identifier assignment tables 150 may include several instances of columns 153, rows 154, ranges 158, or other groupings each configured to map or otherwise associate zero or more dependent identifiers 152 (each depicted as a white square and representing a user or party identifier, e.g.) with each independent identifier 151 (depicted as a black square and representing a device identifier, e.g.). Various configurations of dependent identifier recognition module (DIRM) 131-133 permit dependent identifiers 152 to be identified as such by an intrinsic property of the identifier. DIRM 131 determines that an identifier (mobile number, e.g.) is independent only if its last three digits form an integer evenly divisible by X, in which 1<X<10 (with X=2, deeming an identifier dependent if it is odd and independent if it is even, e.g.). DIRM 132 determines that an identifier is independent if it contains a digit equal to Y and otherwise determines that it is dependent (with Y being any digit 0 to 9). In some contexts, an intrinsic recognition protocol can comprise invoking two or more such modules, as further described below.

Figure 2:
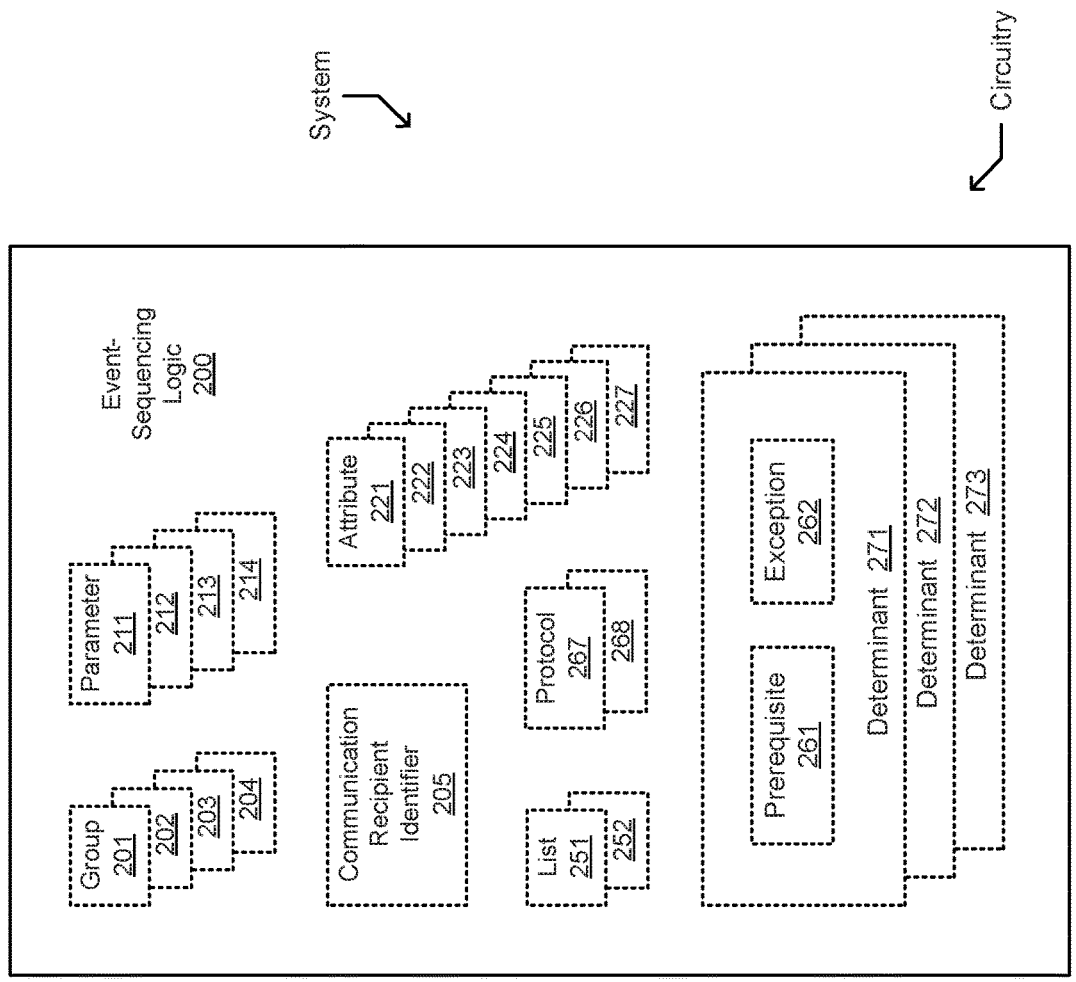
FIG. 2 depicts an exemplary environment in which one or more technologies may be implemented, including event-sequencing logic.

With reference now to FIG. 2, a system is shown in schematic form comprising event-sequencing logic 200 (transistor-based circuitry including electrical node sets each having a voltage configuration that manifests an informational structure, e.g.). Event-sequencing logic 200 includes one or more instances of groups 201, 202, 203, 204; of communication recipient identifiers 205; of parameters 211, 212, 213, 214; of alphanumeric attributes 221, 222, 223, 224, 225, 226, 227; of lists 251, 252; of protocols 267, 268; or of determinants 271, 272, 273 (a prerequisite 261 or exception 262, e.g.) as described below.

Figure 3:
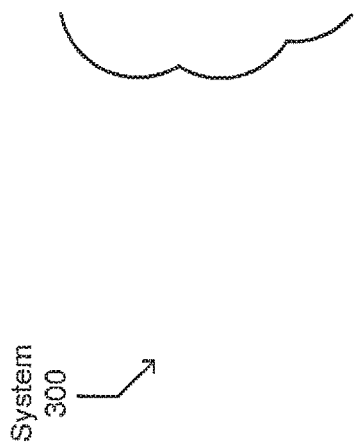
FIG. 3 comprises an 18-sheet depiction of an environment in which several entities may interact via various networks and in which several component views are labeled as FIGS. 3-A through 3-R.

With reference now to FIG. 3, there is shown a high-level environment diagram depicting a system 300 in or across which one or more instances of event-sequencing logic 100, 200 or components thereof may be instantiated (in subsystems or mobile devices described below, e.g.) and in which one or more technologies may be implemented. In accordance with 37 CFR 1.84(h)(2), FIG. 3 shows "a view of a large machine or device in its entirety . . . broken into partial views . . . extended over several sheets" labeled FIGS. 3-A through 3-R (Sheets 3-20). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 CFR 1.84(h)(2), and (ii) the partial-view FIGS. 3-A to 3-R are ordered alphabetically, by increasing column from left to right, as shown here:

| FIG. 3-A | FIG. 3-B | FIG. 3-C |
| FIG. 3-D | FIG. 3-E | FIG. 3-F |
| FIG. 3-G | FIG. 3-H | FIG. 3-I |
| FIG. 3-J | FIG. 3-K | FIG. 3-L |
| FIG. 3-M | FIG. 3-N | FIG. 3-O |
| FIG. 3-P | FIG. 3-Q | FIG. 3-R |

Because FIG. 3 is a high-level environment diagram, some elements of system 300 are expressed through the function they carry out. In such circumstances, these elements should be considered to include any combination of one or more program, microprocessor configuration, state machine, transistor-based event sequencing structure, firmware, field-programmable gate array ("FPGA") configuration, application programming interface ("API"), function, class, data structure, dynamically loaded library ("DLL"), database (e.g., SQL database), or other such special-purpose modules implemented in a structure or method eligible for patent protection under 35 U.S.C. §101.

With reference now to FIG. 3-B, there is shown a device reconfiguration service provider 388 and a network maintenance service provider 389.

With reference now to FIG. 3-C, there is shown an integrated circuit (IC) chip 340 provided by a device component manufacturer 355. IC chip 340 includes pads 335 distributed about a periphery of a dielectric substrate 307 upon which many transistors 351, 352 are configured to form several functional blocks (e.g. memories 336, 337 and special-purpose modules 338, 339 such as those described below). Such integrated circuitry 330 primarily comprises transistors 351, 352 operably coupled by electrically conductive signal-bearing conduits 308. Informational data identified herein may easily be represented digitally as a voltage configuration on (a "set" of one or more) electrical nodes 341, 342, 343, 344 (voltage levels 331, 332, 333, 334 on respective conduits or pads 335, e.g.) of an event-sequencing structure (an instance of transistor-based circuitry on integrated circuit 330, e.g.) without any undue experimentation.

With reference now to FIG. 3-D, there is shown a wireless communication service provider 360 including one or more instances mobile switching center (MSC) resources. Such resources include one or more instances of equipment identity registers (EIR) 361; home location registers (HLR) 363; of visitor location registers (VLR) 364; or of virtual device identifier recognition modules (VDIDRM) 365.

With reference now to FIG. 3-E, there is shown a base transceiver station (BTS) 359 of network maintenance service provider 389 configured to receive a wireless signal 397 from a party 302 ("Roger") operating a mobile communication device 322. As shown, party 302 is in a cell-only zone 315 bounded by zone boundary 310. Also BTS 359 is operably coupled (via linkages 496 represented as dashed lines comprising signal paths through fiberoptic or free space or other passive transmission media and optionally through one or more active devices, e.g.) with wireless communication service provider 360 and device 322 as shown.

With reference now to FIG. 3-F, there is shown a mobile device 321 having a camera 347 and display 345 held by another party 301 (prior to being reconfigured by device reconfiguration service provider 388, e.g.). While in wireless local area network (WLAN) zone 316, moreover, device 321 is able to communicate via more than one type of wireless linkage 496. While in cell 314, for example, device 321 may communicate via BTS 359.

With reference now to FIG. 3-G, there is shown that wireless communication service provider 360 may (optionally) include one or more instance of channel establishment subsystems (CES) 368 or of channel adaptation subsystems (CAS) 369.

With reference now to FIG. 3-H, there is shown an instance of a switch 357 operated by an internet service provider 387.

With reference now to FIG. 3-I, an instance of an access point 356 operated by hotspot provider 386 and operably coupled (via respective linkages 496) between device 345 and switch 357. While in WLAN zone 316, device 321 may communicate via an access point 356 operated by hotspot provider 386. Within an overlap of cell 314 and WLAN zone 316, moreover, device 321 may communicate via either or both and may implement a handover in either direction, as further described below.

FIG. 3-J also shows a representation of a network 390 comprising one or more instances of switch 395. Network 390 is operably coupled with wireless communication service providers 360, 370 via one or more linkages 496 as shown.

FIG. 3-K shows a representation of several additional resources of network 390 comprising one or more instances of public switched packet data network (PSPDN) subsystems 396; of public switched telephone network (PSTN) subsystems 398; or of communications satellites 399.

With reference now to FIG. 3-L, there is shown a representation of another wireless communication service provider 460 (having a contractual and operational relationship with provider 360 of FIG. 3-D, e.g.) including one or more instances mobile switching center (MSC) resources. Such resources include (one or more instances of) equipment identity registers (EIR) 461.

FIG. 3-M also shows an instance of a switch 457 maintained by an internet service provider 487 and operably coupled via one or more communication linkages 496 (each comprising one or more fiberoptic conduits or free space media, e.g.) with network 390 and an access point 456 of hotspot provider 486 as shown.

FIG. 3-N shows a support service provider 425 operating one or more instances of virtual-to-real conversion modules 426 or authentication centers (AUC) 427 residing on one or more servers 428 (to which device manufacturer 485 may communicate attributes, apps, or other digital components as described herein, e.g.).

With reference now to FIG. 3-O, there is shown a representation of one or more additional resources of provider 460: one or more instances of home location registers (HLR) 463; of visitor location registers (VLR) 464; of virtual device identifier recognition modules (VDIDRM) 465; of channel establishment subsystems (CES) 468; or of channel adaptation subsystems (CAS) 469.

With reference now to FIG. 3-P, there is shown a linkage 496 via which access point 456 providing wireless service (Wi-Fi, e.g.) to a WLAN zone 416 within cell 414. Hotspot provider 486 (a retailer, e.g.) may be operably coupled with switch 457 and wirelessly operably coupled with a device that has entered WLAN zone 416 (by crossing zone boundary 410 from cell-only zone 415, e.g.) via linkages 496 as shown.

With reference now to FIG. 3-Q, there is shown a mobile communication device 440 (smartphone or tablet computer, e.g.) having firmware 439 and initially associated with an independent identifier 151 (e.g. a "real" mobile number of "206-555-2460"). As described below, device 440 is later configured to be shared among a plurality of parties 401, 402, 403 ("Susan" and "Nancy" and "Carol") by respectively assigning dependent identifiers 152 (e.g. "virtual" mobile numbers of "206-555-2461" and "206-555-2462" and "206-555-2463"). As described below, each such identifier has one or more recognizable intrinsic attributes 221-227 so that a dependent identifier 152 (recognizable as such by a virtual device identifier recognition module 365, e.g.) need not be listed in a home location register 363 or visitor location register 364. In lieu of such listings, an identifier (provided in a phone call initiated from device 321, e.g.) that is "likely enough" to be virtual (about 5% likely or more, e.g.) may (optionally) be configured to trigger VDIDR module 365 to initiate an investigation protocol (by invoking one or more instances of virtual-to-real conversion modules 426 or authentication centers 427 or similar resources, e.g.) effective to determine whether a corresponding physical destination (server 428 or device 440, e.g.) can be found (e.g. before reporting back to device 321 a mere fact that the identifier is "unlisted"). In some contexts, for example, such implementations may be facilitated by firmware 439 of device 440 and a software configuration of server 428 (both having been provided by device manufacturer 485, e.g.).

With reference now to FIG. 3-R, there is shown a base transceiver station (BTS) 459 of network service provider 489 configured to transmit a wireless signal 497 to device 440 or to one or more parties 401, 402, 403 as described below.

Figure 4:
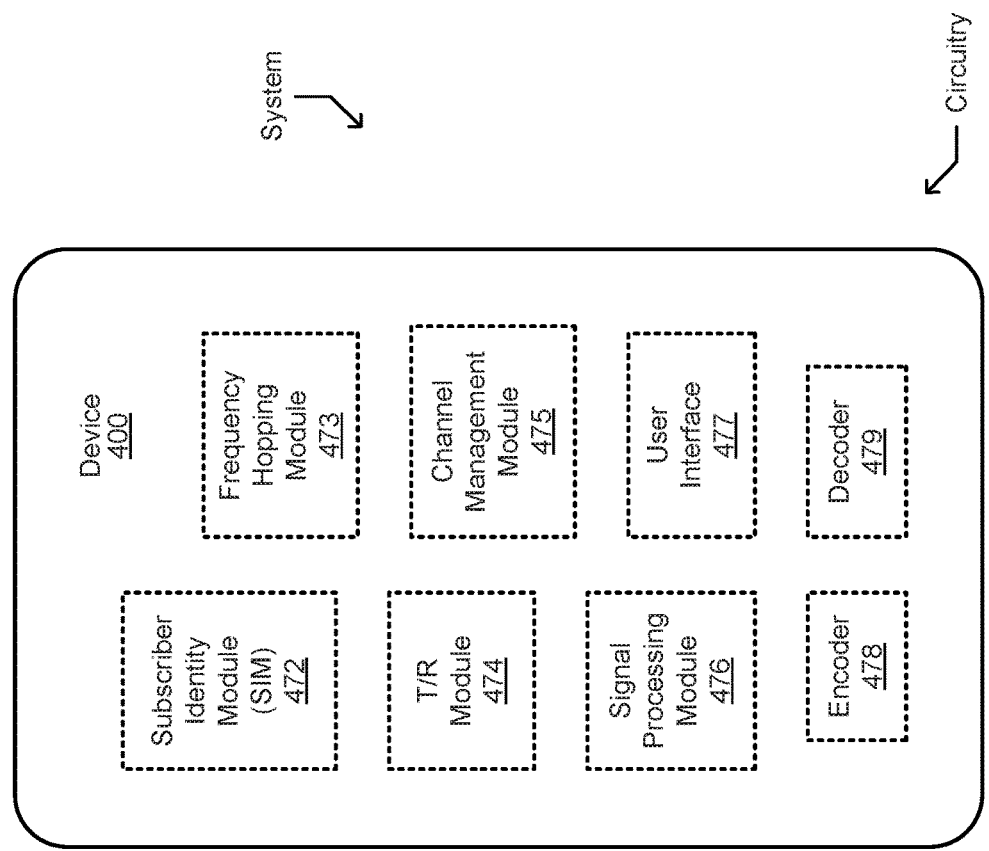
FIG. 4 depicts an exemplary environment in which one or more technologies may be implemented, including a schematic depiction of a device.

With reference now to FIG. 4, a system is shown in schematic form comprising a handheld or other device 400 instantiated as one or more mobile devices 321, 440 depicted in FIG. 3. Event-sequencing logic (transistor-based circuitry including electrical node sets each having a voltage configuration that manifests an informational structure, e.g.) therein may include one or more instances of subscriber identity modules 472, frequency hopping modules 473, transmit/receive modules 474, channel management modules 475, signal processing modules 476, user interfaces 477, encoders 478, or decoders 479.

Figure 5:
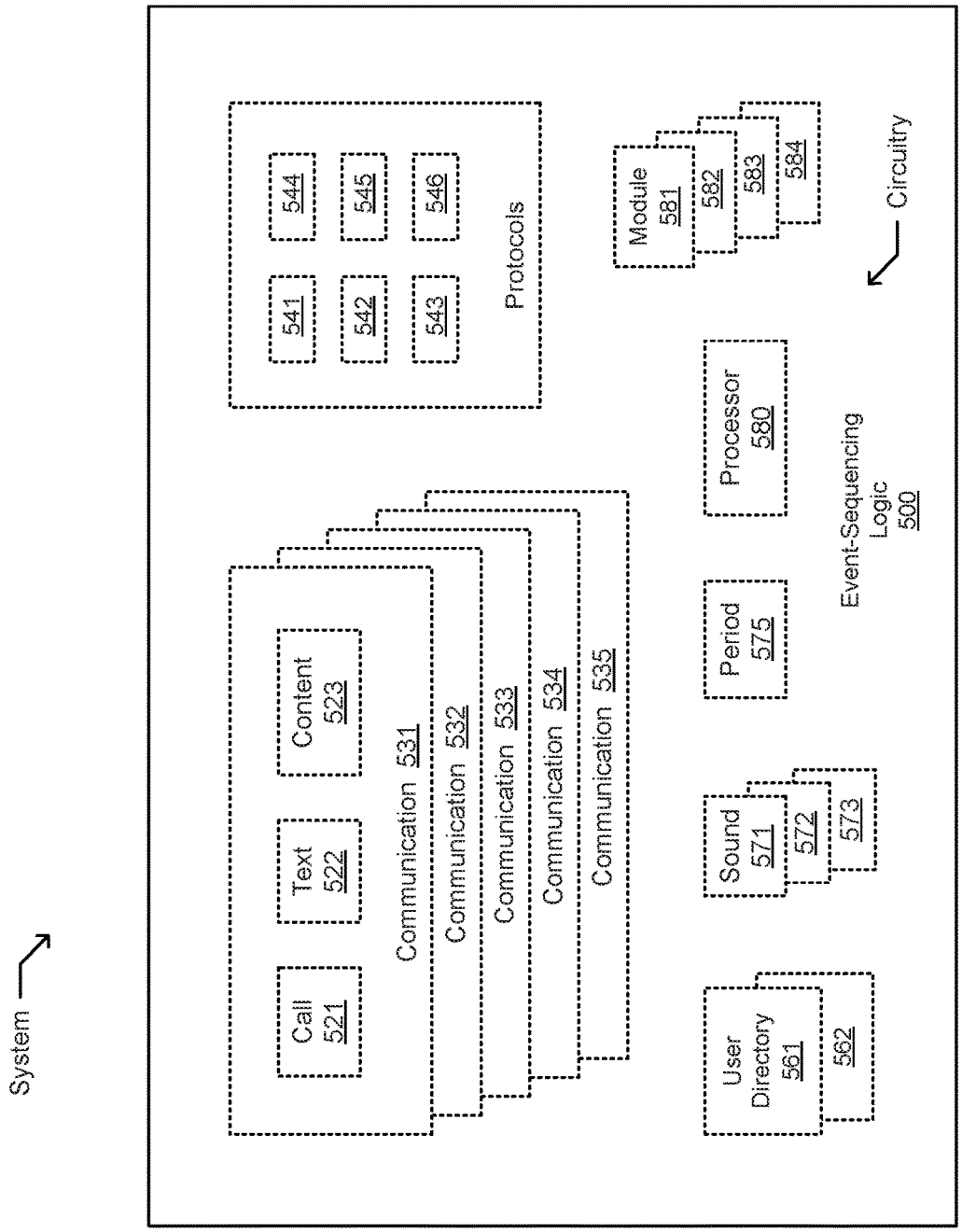
FIG. 5 depicts an exemplary environment in which one or more technologies may be implemented, including a schematic depiction of event-sequencing logic (a schematic depiction of an electronic or electromechanical apparatus implemented as circuitry, e.g.).

With reference now to FIG. 5, a system is shown in schematic form comprising event-sequencing logic 500 (transistor-based circuitry including electrical node sets each having a voltage configuration that manifests an informational structure, e.g.). Event-sequencing logic 500 may include one or more instances of communications 531, 532, 533, 534, 535; of protocols 541, 542, 543, 544, 545, 546; of user directories 561, 562; of digitally encoded sounds 571, 572, 573; of time periods 575; of transistor-based processors 580; or of modules 581, 582, 583, 584. Each such communication may include, for example, one or more instances of calls 521, of texts 522, or of other content 523 comprising a unidirectional communication (a broadcast, e.g.) or bidirectional communication (a teleconference among two or more instances of device 400, e.g.). One or more instances of event-sequencing logic 500 may be implemented, for example, in network 390 or in device 440.

Figure 6:
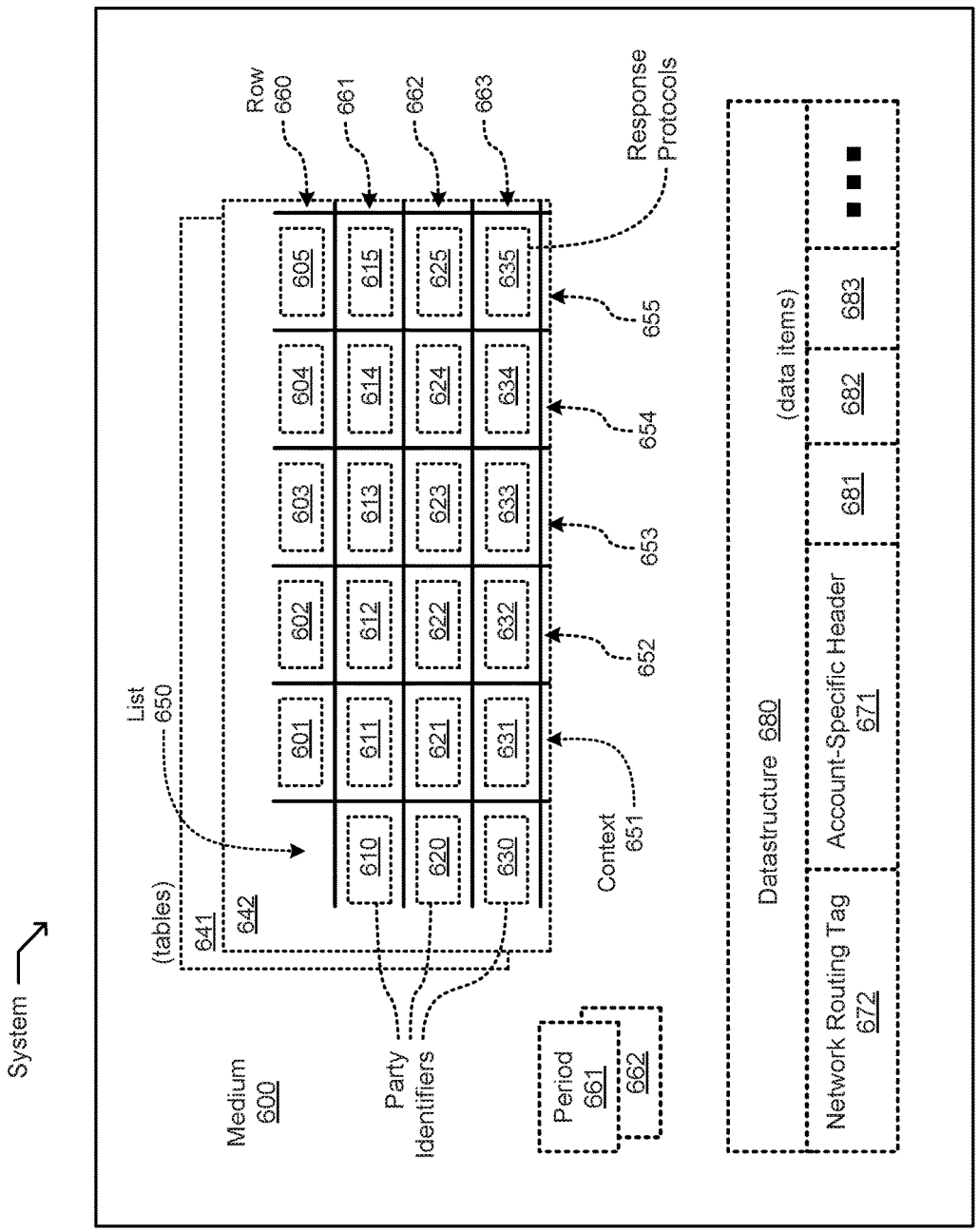
FIG. 6 depicts an exemplary environment in which one or more technologies may be implemented, including a schematic depiction of a data handling medium.

With reference now to FIG. 6, a system is shown in schematic form comprising one or more tangible data-handling media 600 (node sets each having a magnetic or voltage configuration that manifests an informational structure, e.g.). Medium 600 (comprising a memory or storage medium, e.g.) may include one or more instances of tables 641, 642 that each map one or more rows 660 of response protocols 635 (each comprising a pointer or other operational parameter relating to software executable by one or more processors 580, e.g.) to two or more context-dependent default response protocols 601, 602, 603, 604, 605 and (optionally) to two or more context-dependent response protocols 611, 612, 613, 614, 615 associated with a single party identifier 610 (in a many-to-one association by virtue of being in the same row 661 or other record, e.g.). Likewise as shown in row 662, party identifier 620 corresponds to one or more response protocols 621, 622, 623, 624, 625 (e.g. suitable in one or more respective contexts 651, 652, 653, 654, 655) and party identifier 630 corresponds to one or more response protocols 631, 632, 633, 634, 635 depending upon context as described below. Medium 600 may likewise include one or more instances of digitally expressed periods 661, 662. Medium 600 may likewise include one or more instances of datastructures 680 (content suitable for routing as a wireless signal 497, e.g.) that map zero or more account-specific headers 671 (identifying a single party 403, e.g.) to a network routing tag 672 (e.g. an independent identifier 151 listed in visitor location register 364 or home location register 463, e.g.) associated with a series of data items 681, 682, 683 (e.g. user data). One or more instances of such media 600 may be implemented, for example, in mobile device 440 or in a server 428 accessible to device 440.

Figure 7:
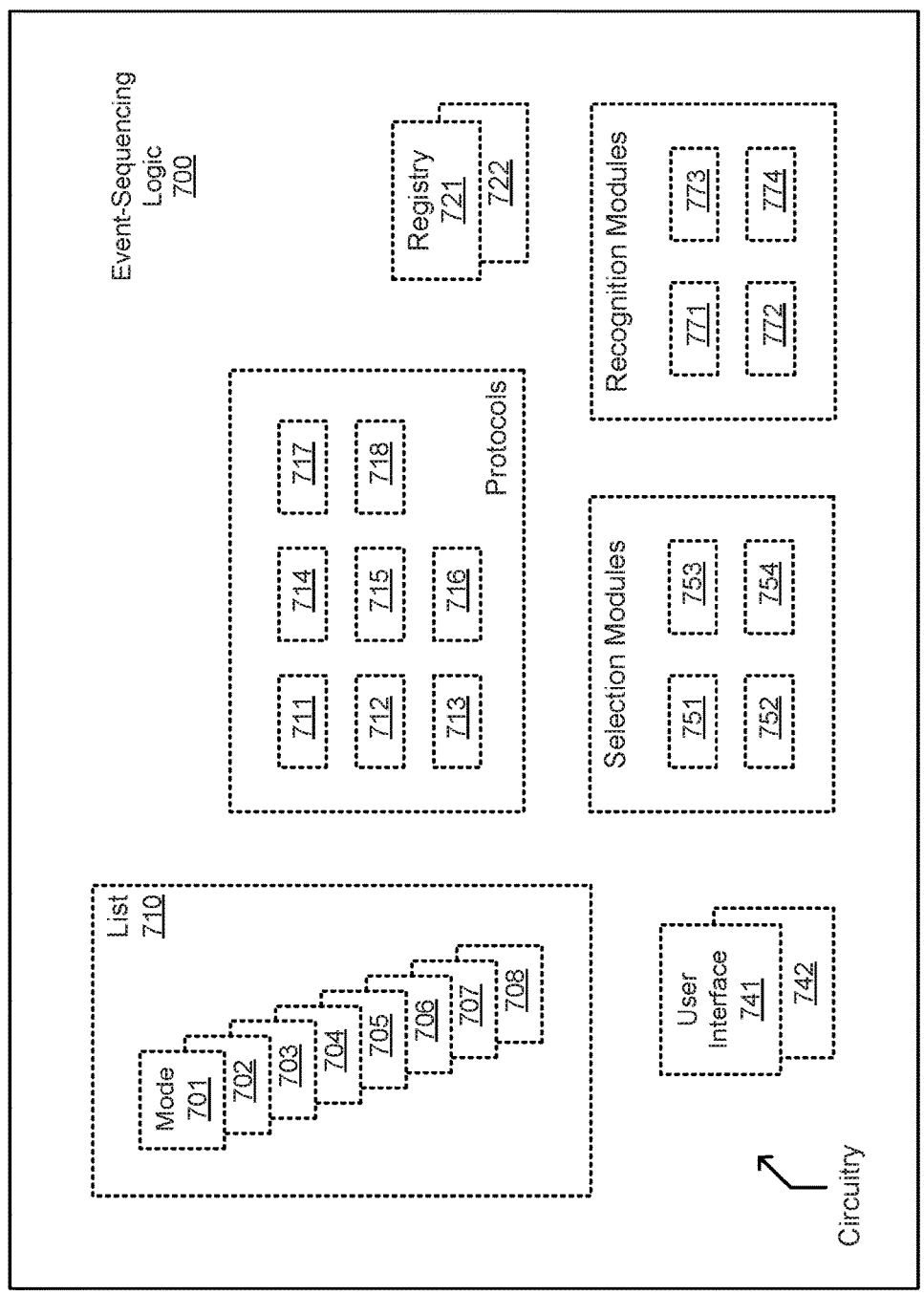
FIG. 7 depicts an exemplary environment in which one or more technologies may be implemented, including a schematic depiction of event-sequencing logic.

With reference now to FIG. 7, a system is shown in schematic form comprising event-sequencing logic 700 (transistor-based circuitry including electrical node sets each having a voltage configuration that manifests an informational structure, e.g.). Event-sequencing logic 700 may include one or more instances of modes 701, 702, 703, 704, 705, 706, 707, 708 (arranged in a list 710, e.g.); of protocols 711, 712, 713, 714, 715, 716, 717, 718; of registries 721, 722; of user interfaces 741, 742; of selection modules 751, 752, 753, 754; or of recognition modules 771, 772, 773, 774. For example, such components of event-sequencing logic 700 may each comprise a pointer or other operational parameter providing access to or otherwise triggering a selective execution of software executable by one or more processors 580, e.g.). One or more instances of event-sequencing logic 700 may be implemented, for example, in a mobile device 322, 440 configured to receive or responsively participate in one or more communications 531-535 as described below.

In some contexts, as further described below, one or more such modes may comprise conditional response protocols like those of FIG. 6. When an incoming signal (comprising one or more communications 531-535, e.g.) has a signal source identification tag (a caller identification field defining which of two or more contexts 651-654 will apply, e.g.) and a signal target identification tag (account-specific header 671 defining one or more party identifiers 610, 620, 630 specify a suitable recipient, e.g.) at mobile device 440, for example, one or more recognition protocols 772 may use both of these tags as co-determinants for selecting among several response protocols 611-613, 631-633. In some contexts, for example, only some of the contingently-invoked response protocols include an audible component (sound 573, e.g.).

Figure 8:
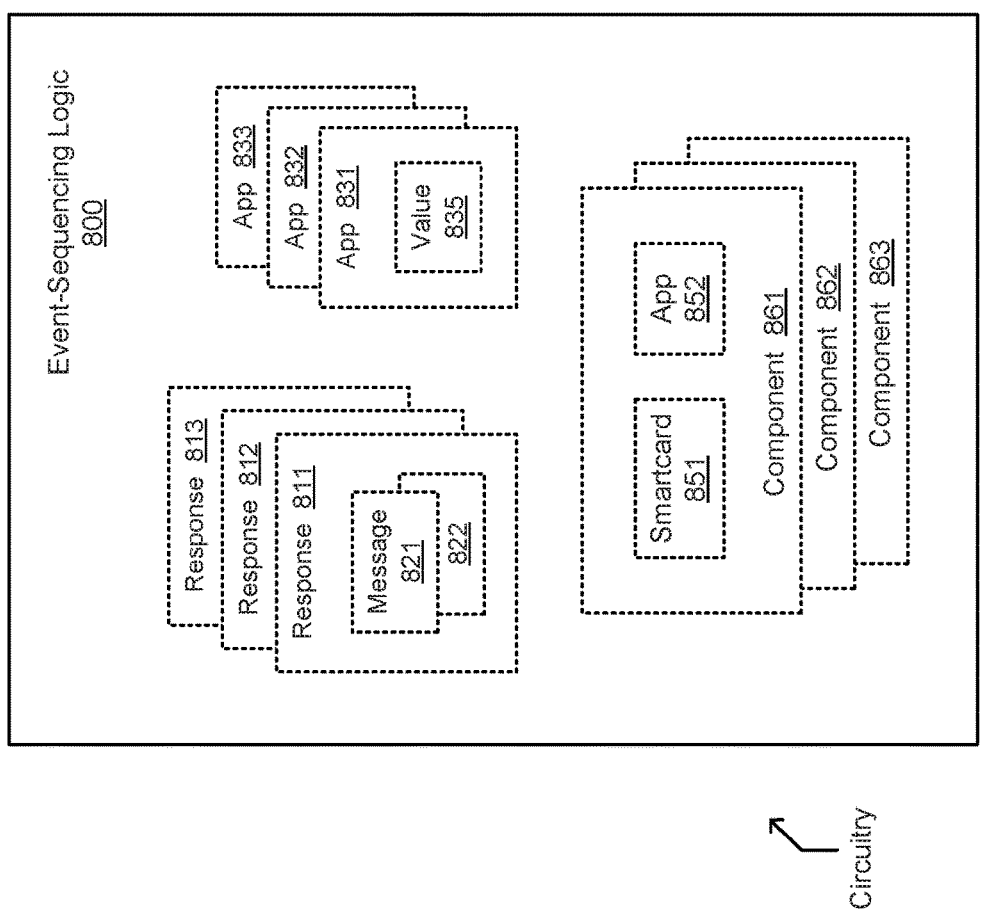
FIG. 8 depicts an exemplary environment in which one or more technologies may be implemented, including a schematic depiction of event-sequencing logic (a schematic depiction of an electronic or electromechanical apparatus implemented as circuitry, e.g.).

With reference now to FIG. 8, a system is shown in schematic form comprising event-sequencing logic 800 (transistor-based circuitry including electrical node sets each having a voltage configuration that manifests an informational structure, e.g.). Event-sequencing logic 800 may include one or more instances of messages 821, 822 or other automatic and conditional responses 811, 812, 813; of values 835 or other features of apps 831, 832, 833; or of installable device components 861, 862, 863 (a smartcard 851 or downloadable app 852, e.g.). One or more instances of event-sequencing logic 800 may be implemented, for example, in a mobile device 322, 440 configured to receive or responsively participate in one or more communications 531-535 as described below.

Figure 9:
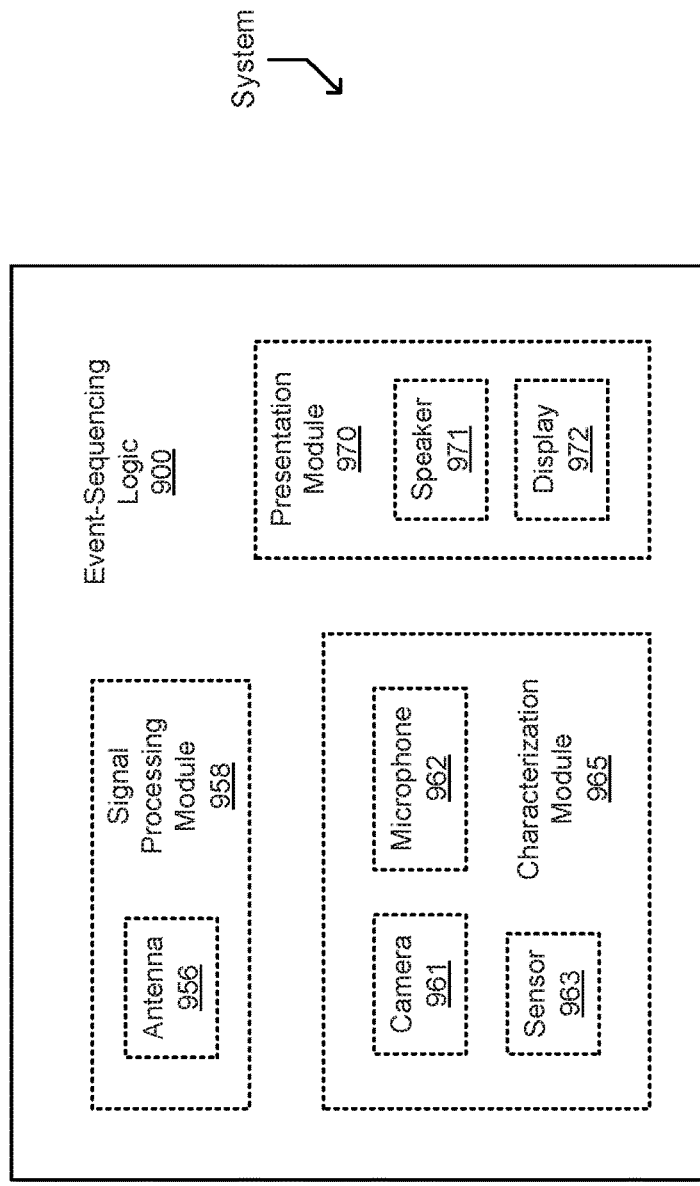
FIG. 9 depicts an exemplary environment in which one or more technologies may be implemented, including a schematic depiction of event-sequencing logic.

With reference now to FIG. 9, a system is shown in schematic form comprising event-sequencing logic 900 (transistor-based or other integrated circuitry 330 including electrical node sets each having a voltage configuration that manifests an informational structure, e.g.). Event-sequencing logic 900 may include one or more instances of signal processing modules 958 (including one or more instances of an antenna 956 configured to receive a wireless signal 397, 497, e.g.); of characterization modules 965 (including one or more cameras 961, microphones 962, or other sensors 963, e.g.); or of presentation modules 970 (including one or more speakers 971 or displays 972, e.g.). One or more instances of event-sequencing logic 900 may be configured to interact with one or more parties 401, 402 in a vicinity (of effective optical or auditory detection, e.g.) of device 440.

Figure 10:
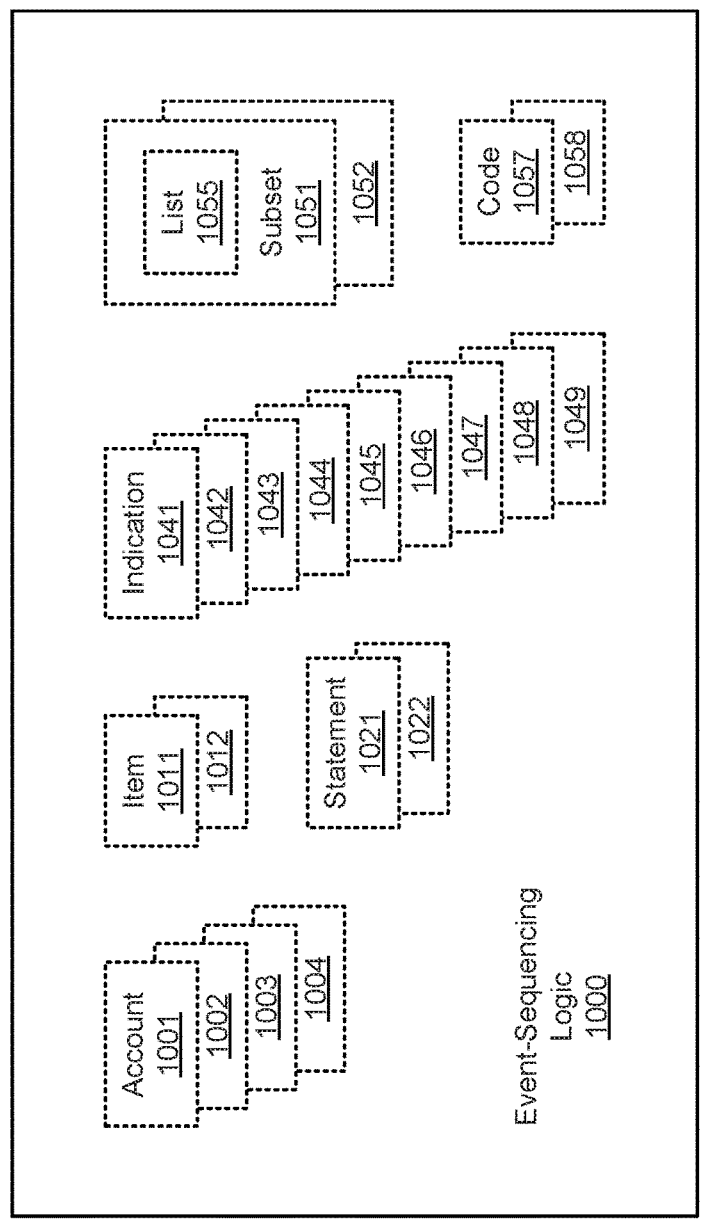
FIG. 10 depicts an exemplary environment in which one or more technologies may be implemented, including a schematic depiction of event-sequencing logic (a schematic depiction of an electronic or electromechanical apparatus implemented as circuitry, e.g.).

With reference now to FIG. 10, a system is shown in schematic form comprising event-sequencing logic 1000 (transistor-based circuitry including electrical node sets each having a voltage configuration that manifests an informational structure, e.g.). Event-sequencing logic 1000 may include one or more instances of accounts 1001, 1002, 1003, 1004; of media items 1011, 1012; of statements 1021, 1022; of indications 1041, 1042, 1043, 1044, 1045, 1046, 1047, 1048, 1049; of subsets 1051, 1052 (comprising a list 1055, e.g.) or of authorization codes 1057, 1058. One or more instances of event-sequencing logic 1000 may be implemented, for example, in network 390 or in device 440.

One or more dependent-to-independent conversion modules (DICM) 111, 112 may be applied for identifying a single independent identifier 151 corresponding to any given dependent identifier 152. In some contexts this can be implemented without any expansion of existing equipment identity registers 361, 461; home location registers 363, 463; or visitor location registers 364, 464. In some variants, for example, DICM 111 may implement such conversion simply by rounding down or by selecting the next-lower network routing tag (comprises a real mobile number 120 or similar independent identifier 151, e.g.) listed in HLR 363 or VLR 364 (e.g. by selecting "206-555-2460" as the highest listed value not exceeding "206-555-2461"). This can occur, for example, in a context in which support service provider 425 assigns a block of virtual numbers (a range 158 of several, e.g.) in association with a given independent identifier 151 (in the same row 154, e.g.).

In association with a network 390 that facilitates wireless and other interpersonal communications, support service provider 425 establishes multiple dependent identifiers 152 (hundreds or thousands, e.g.) into one or more groups 201, 202, 203. The identifiers within each group (range 158, e.g.) have one or more shared intrinsic attributes 221, 222, 223, 224, 225, 226. (Each such attribute is "shared" in that it describes a group of two or more such identifiers and "intrinsic" in that determining whether an identifier has the attribute does not require access to any central directory or other extrinsic source.) Each such dependent identifier corresponds to a virtual entity (device or party, e.g.) suitable for receiving or responding to communications. Support service provider 425 broadcasts one or more such attributes 221-226 (whichever ones are in effect, e.g.) so that other communication service or product providers can distinguish identifiers (of a communication initiator or recipient, e.g.) that satisfy an attribute from those that do not. One or more dependent identifiers 152 (alphanumeric sequences or other digital values in a dependent identifier range 158 of several consecutive values, e.g.) have attribute 221 if and only if the last five digits of each form a number that falls between 24400 and 25999. Likewise one or more dependent identifiers 152 have attribute 222 if and only if none of the characters thereof (letters or digits, e.g.) is in a predefined "disqualifying expression" list 251 (e.g. a "5" or "9"). Likewise one or more dependent identifiers 152 have attribute 223 if and only if the last three digits form a number not evenly divisible by N (with N being an integer greater than 1 and less than 9 and the 3-digit number having a nonzero remainder when divided by N, e.g.). Likewise one or more dependent identifiers 152 have attribute 224 if and only if the last two digit-pairs in a numerical portion of the identifier can be multiplied together to form a product between A and B (with 44<A<444 and 444<B<4444, e.g.). This can occur, for example, in a context in which one or more such intrinsic attributes 221-226 (or combinations thereof) can be used as determinants 271-273 (each defining a prerequisite 261 or exception 262, e.g.) of a readily disseminated protocol 267 that is effective for determining whether there is any substantial likelihood (a likelihood of about 1% or more, e.g.) that a communication recipient identifier 205 (a mobile number or other unique address, e.g.) is actually a dependent identifier 152 (virtual device identifier, e.g.); in which a negative determination effectively establishes that the communication recipient identifier 205 is actually not a dependent identifier 152; in which such a determination would otherwise require protocol 267 to include consulting an extrinsic source (a central lookup table residing on a server 428 at a central facility maintained by support service provider 425, e.g.) for every communication routed through network 390; and in which a large majority of such communications require no such consultations by virtue of protocol 267 being implemented in a local instance (within a server or mobile device along a primary channel between or among participants to a communication, e.g.). In some contexts, moreover, an app 831 implementing protocol 267 will maintain a local value 835 indicative of when it was installed or first invoked and will automatically reconfigure itself after an expiration of a set period (of X days with 4<X<444, e.g.) by retrieving one or more new parameters 211, 212, 213, 214 (new values for one or more A or B or N or X, e.g.) or a replacement protocol 268 (implemented in an app 832 from server 426, e.g.).

A party 401 ("Susan") buys a new mobile device 440 to share with one or more other parties 402, 403 ("Nancy" and "Carol") who work or live in a common facility (business or residence, e.g.). As configured by an OEM (device manufacturer 485, e.g.), mobile device 440 initially contains a party identifier list 650 and a contingent default protocol 711. Contingent default protocol 611 effectively designates (in row 660, e.g.) two or more response protocols 601, 602 each of which is only invoked for an incoming communication 531 (comprising call 521 or text 522 or other content 523, e.g.) that does not include any particular party identifier 610, 620, 630 (a recognized entity to whom the communication is targeted, e.g.). In that state, device-executable firmware 439 within device 440 responds to incoming communications in a manner that is outwardly conventional (by causing a speaker aboard device 440 to sound a "traditional ring" sound 571 in a context 651 of an incoming phone call 521 or to sound a "simple chime" sound 572 in a context 652 of an incoming text 522, e.g.).

Susan configures shared mobile device 440 for a purpose of having fewer devices than device users in her household. Mobile device 440 is identified by a network routing tag 672 (e.g. a phone number of "206-555-2460") by which Susan may receive a communication 531 (a call 521 or text 522 comprising a wireless signal 497 that includes that network routing tag 672, e.g.) conventionally. Alternatively or additionally, wireless signal 497 may include one or more account-specific headers 371 each associated with one or more user data items 681, 682, 683 as described herein. In a context in which an incoming communication is targeted to less than all users of device 440, for example, account-specific header 371 may be a digital value indicating a particular individual (a virtual cell phone number of "206-555-2461" belonging to Susan, e.g.) or a particular group 204 of individuals (a virtual cell phone number of "206-555-2465" shared among several, e.g.).

Soon after purchase, Susan reconfigures device 440 to identify herself (using party identifier 610, e.g.) in association with several contingent response protocols 611-615 that she prefers, respectively corresponding to a recognized context 651-655 (each symbolized as a column, e.g.). In response to a context 653 of an anonymous incoming communication 531, for example—one that does not identify any initiator/sender—she expresses her selection of a response protocol 613 of passive response—sending a call 521 directly to voice mail or likewise silently receiving other instances of such incoming communications 531. This can occur, for example, in a context in which a range of virtual mobile numbers 121-124 (e.g. "206-555-2461" et seq.) are each used for identifying a respective party 401, 402, 403 and in which such virtual mobile numbers all correspond to a single real mobile number 120 (e.g. "206-555-2460") that uniquely identifies mobile device 440.

In a first network configuration, wireless communication service provider 360 does not include a virtual device identifier recognition module 365. Rather, the "virtual" identifiers associated with mobile device 440 are implemented as real phone lines associated with server 428. When party 302 ("Roger") initiates a communication (via wireless communication service provider 360) by dialing a mobile number of "206-555-2462," that communication is routed to support service provider 425. VRC module 426 completes the call by establishing a new channel (from server 428 and via BTS 459, e.g.) to device 440 and extending the incoming communication from party 302 along that new channel to device 440.

In a second network configuration, wireless communication service provider 360 includes a virtual device identifier recognition module 365. The "virtual" identifiers associated with mobile device 440 are implemented in a lookup table resident in VRC module 426 (resident in server 428 or network 390, e.g.). When party 302 ("Roger") initiates a communication (by dialing a mobile number of "206-555-2462," e.g.) that communication is redirected to the corresponding "real" destination identifier (an independent identifier 151 implemented as a "real" mobile number of "206-555-2460," e.g.).

With either of these network configurations, a wireless signal 497 arriving at mobile device 440 includes information similar to that of datastructure 680, including a network routing tag ("206-555-2460," e.g.) by which device 440 has been identified and either with an account-specific header (e.g. comprising one or more specific party identifiers 610, 620, 630) that identifies a person or as a recipient-nonspecific incoming call (signaling one or more response protocols 601-605 along row 660, e.g.). This provides device 440 with information about which of two or more parties 401, 402, 403 is intended to receive the communication.

Firmware 439 includes one or more features configured to facilitate sharing mobile device 440 among two or more parties 401, 402, 403. Two of the parties 401, 402 who use device 440 may be logged onto device 440 concurrently, even in a context in which only one is actively using device 440. A first communication 531 (content 523 resulting from real-time input from a party 301 using device 321, e.g.) comprises a wireless signal 497 that includes real mobile number 120. A recipient recognition module 771 (within an incoming communication processing module 581 aboard mobile device 440) determines that no party indication tag is present among the components (in datastructure 680, e.g.) of the communication 531 and therefor applies one or more default response protocols 601-605 (effectively routing the communication 531 to a "default" user, e.g.).

Initially a communication that arrives at mobile device 440 without identifying any parties 401, 402 who are currently logged in immediately triggers a response protocol 604 by which module 583 sends a "no recipient available" response message to the device 321 via which the communication originated. As a result of no default user being designated (or of a currently-designated default user being offline), therefore, the first communication 531—having a datastructure lacking any party indication tag—invokes the module 583 that implements response protocol 604.

A second communication 532 later arrives at mobile device 440 with a real mobile number 120 that uniquely identifies mobile device 440, but this time comprising a wireless signal 497 having a party identification tag (e.g. an occurrence of "63") that specifically identifies party 403 ("Carol"), who is still not logged onto mobile device 440. As a result of party 403 still being offline, the second communication 532 invokes a response protocol 542 by which module 582 sends a party-specific response message (e.g. "Carol is not available" sent as a real-time response to party 302) to the device 322 that originated the second communication 532.

At least one independent identifier 151 (e.g. a real mobile number 120) and at least one dependent identifier 152 (e.g. one or more virtual mobile numbers 121-124 corresponding to real mobile number 120) are commonly assigned to mobile device 440 indefinitely or for a fixed period 575 (of a week or more, e.g.) by installing a component 861 (smartcard 851 or app 852, e.g.) associated with at least one virtual mobile number 122, 123 (in a one-to-one or one-to-many association, e.g.) into a mobile device uniquely associated with at least one real identifier (e.g. a real mobile number 120 or other independent identifier 151). Susan configures an on-board user directory 561 so that each of two or more parties 401, 402, 403 who use device 440 corresponds with a single respective one of the available dependent identifiers 152 and with a corresponding list 710 of operating modes (e.g. defined by a corresponding row 661, 662, 663 of response protocols). Each instance of such lists 710 includes one or more selectively configurable operating modes (response protocols 635, e.g.) as described below.

By one or more such techniques, an invocation of firmware 430 causes mobile device 440 to switch between a general purpose operating mode 703 (appropriate when a privileged party 401 is identified as a primary current user, e.g.) and a limited purpose operating mode 707 (appropriate when privileged party 401 is not in possession of mobile device 440, e.g.). Device 440 is configured to be updated by a primary user (party 401) so as to provide a comprehensive registry 721 of current users of device 440. This can occur, for example, in a context in which a virtual mobile number 124 is exclusively associated with a mobile device 440; in which the primary user previously associated the virtual mobile number 124 with a specific party; in which the primary user later configured comprehensive registry 721 to dissociate the virtual mobile number 124 from the specific party; in which such modifications to comprehensive registry 721 are implemented locally (within device 440, e.g.); and in which subsequent communications directed to the virtual mobile number 124 would otherwise be mishandled (handled according to one or more generic response modes 704, 705 not in accord with preferences of the primary user, e.g.).

Initially all charges incurred by mobile device 440 (for usage or otherwise as authorized by Susan, e.g.) are assigned to an account 1001 (expressed in minutes or dollars or other digital units, e.g.) associated with a particular user (Susan, e.g.). Mobile device 440 is configured to limit charges to account 1001 by using WLAN within the facility partly based upon being in operating mode 707 and partly based on being in overlap zone 376.

As a privileged party 401, Susan may selectively disable a particular operating mode 706 (establishing communications from device 440 via access point 350, e.g.) whenever another party 402 (specified by Susan) is using device 440 (to trigger enhanced record-keeping of such communications, e.g.).

One or more incoming communications that include a party identifier 620 (an account-specific header 671 that corresponds specifically to Carol, e.g.) may invoke a special-purpose incoming context differentiation module 584 that operates in one mode 624 (sounding Carol's ring, e.g.) if Carol is apparently present and in another mode 625 (permitting a voice or text message to be passed to Carol silently, e.g.) otherwise. This can occur, for example, in an implementation in which Carol has configured several such response protocols 621-625; in which module 584 includes a camera 961 operably coupled to a face recognition module or a microphone 962 operably coupled to a voice recognition module; and in which Carol has expressed a preference for such contingently-audible notifications. Alternatively or additionally, such conspicuous responses may depend upon one or more of (1) whether another party is apparently present; (2) whether a particular device 321 or other entity (party 301, e.g.) apparently initiated the communication; or (3) other such communication provenance data or other determinants described herein.

A user directory 561 aboard mobile device 440 is configured by a protocol 543 that disassociates a secondary user (party 402, e.g.) from a virtual identifier (mobile number 124, e.g.) with which she was previously associated. Selection module 753 implements a protocol for determining which of the two or more parties 401, 402, 403 are intended to receive an incoming communication (coming into device 440, e.g.). Protocol 543 results in a device-specific party-nonspecific failure message 821 (a notification resident in firmware 439 that "this virtual number is associated with a private entity but is not currently assigned," e.g.) being sent as a real-time response 812 to a subsequent incoming communication 534 unless an additional protocol 544 associating a virtual identifier (e.g. "206-555-2462") with a device-specific party-specific failure message 822 ("Nancy is not currently accepting communications at this number or address," e.g.) has been implemented.

In another scenario, a mobile device 322 (implementing device 400 of FIG. 4, e.g.) acquired by another party 302 ("Roger") is retrofitted (by Roger or a device reconfiguration service provider 388, e.g.) with a jailbreak or other rooting protocol 718 that includes installing a substitute subscriber identity module (SIM) 472 or other components 862 to facilitate device virtualization or device sharing as described herein. Such a substitute SIM 472 may include a recipient indicator selection module 751 or may include an authorization code 1057 configured to cause update module 171 to download recipient indicator selection module 751 (from a server 428 remote from mobile device 322, e.g.). As a result of such configuration, mobile device 322 thereafter includes an incoming wireless signal processing protocol 716 and one or more other mobile device protocols 717 as described herein for facilitating mobile device sharing (of device 322 among several users, e.g.) as variously described herein. This permits one or more processors aboard shared mobile device 322 to respond to a recipient-selective incoming wireless signal 497 intelligently as described herein.

In some variants account-specific header 371 may be a local identifier of several bits (a 3-bit binary value of "001" or an 8-bit binary value of "01111101", e.g.) that uniquely identifies Roger locally within a context of device 322 (but not in network 390, e.g.). This permits mobile device 322 to behave responsively to which of several user sets (numbered 0 to 63, e.g.) are active (logged in or recently having used device 322, e.g.) or indicated (by a communication or user configuration protocol 719, e.g.). In a context in which a user designates a subset 1051 of users (by providing a list 1055 that identifies users "001" and "003" but not others, e.g.), for example, a single device-detectable user configuration input indication 1042 (key press or utterance, e.g.) may cause an app 833 or media item 1011 (audio recording, e.g.) to be acquired (installed, e.g.) and thereby made selectively accessible for the user-designated subset 1051 of users but not for any other user of device 322. Likewise an interpersonal communication 701 directed to a particular user (e.g. a text 522 to Roger's virtual cell phone number) may include one or more items 681 of interpersonal message content 523 as well as one or more items 682 of protocol selection content 523 (a parameter directing device 322 not to manifest the communication 701 in the presence of any users other than the recipient identified by account-specific header, e.g.). Alternatively or additionally one or more such items 682 may identify the device user (party 402, e.g.) who initiated the communication 701.

In another context, an indicator selection module 752 aboard device 322 implements a tag recognition protocol 715 by causing mobile device 322 to present a visible or audible recipient indication 1041 (one or more of displayed text or a voice saying "call for Roger" via a speaker 971 or display 972 of device 322 e.g.) selected partly based on the one or more party indication tags (an account-specific header 371 of "1" or "61," e.g.) from among several such indications 1043-1045 that reside in the mobile device.

In some variants of event sequencing described herein, Roger configures shared mobile device 322 so as to accommodate a guest user temporarily (Larry receiving or sending messages via device 322 for a time period 661 specified by Roger of less than a month, e.g.) or so as to monitor or control a guest user access (preventing Larry from accessing one or more protocols 712, 713 or data items resident on device 322 and accessible to Roger, e.g.).

In some contexts, for example, protocol 713 may enable device 322 to access WLAN service (via an access point within a shared residence, e.g.) that not all users registered to device 322 can invoke. That way, for example, a more-privileged user (Roger, e.g.) can send or receive messages from WLAN-only zone 374 (a cellar, e.g.) within which at least one registered user (Larry, e.g.) cannot. In some contexts, such other users may need to bring mobile device 322 to a cell-only zone 315 (a balcony within an effective range of a cell tower, e.g.) to send or receive interpersonal communication. In other contexts, Roger may selectively disable other users' outgoing communications via device 322 or may selectively permit one or more other registered users to access incoming communications via device 322 only after reviewing one or more user data items 681-683 associated with the incoming wireless signal 397. In some contexts a more-privileged user (an owner of an account 1002 associated with device 322, e.g.) can likewise control access to other cost-determinant resources. Such resources may, for example, include (1) a metered data download protocol 714 charged to account 1002 or (2) authorization for a charge to account 1002 at least partly based on an affiliation-dependent mobile device (device 440, e.g.) using a cellular linkage in lieu of a WLAN linkage. (As used herein, a device is "affiliation dependent" if and only if it is at least one of an unsubscribed mobile device or a formerly-subscribed mobile device or a formerly-charged mobile device.)

In an instance of event-sequencing logic 900 implementing a mobile device 322, 440 described above, signal processing module 958 receives a wireless signal 397, 497 (via antenna 956, e.g.) including a network routing tag 672 (a phone number 120 identifying the recipient mobile device, e.g.) and one or more account-specific headers 671 (designating one or more parties 302, 402 intended to receive user data, e.g.). The user data may include one or more voice data items 681, graphic image data items 682, or other such message content 523.

One or more selection modules 754 selects a specific-party recipient indication 1047 (a ring tone unique to a caller/recipient pairing, e.g.) from among two or more such indications 1047-1049 according to a registry 722 that contains a record of (a) which parties are known to device 440 and (b) which of those parties are logged into device 440 and (c) which of those parties are apparently present within a detection zone of a camera 961, microphone 962, or other sensor 963. For an incoming communication designating either party 402 (Nancy) or party 403 (Carol), for example, selection modules 754 selects a recipient-party-specific indication (of a sound 573 or text, such as a voice or display message saying "call for Carol" via a presentation module 970 of device 440, e.g.) as a conditional response to either (1) Nancy being offline and Carol being online or (2) Nancy being apparently absent and Carol being apparently present within a detection range (line of sight, e.g.) of characterization module 965. This can occur, for example, in a context in which such party designations take the form of numerical tags ("62" & "63," e.g.) interpreted by a tag recognition protocol 546 (recognizing a call for Susan if a last digit is "1" for Nancy if a last digit is "2" or for Carol if last digit is "3," e.g.).

A communication is initiated by a user input component (a keypad or microphone 962, e.g.) obtaining (from party 302 using device 322, e.g.) an identifier of a first recipient device user ("Carol" or "206-555-2463," e.g.). A determination is made whether the identifier is aliased. If the determination is positive, an aliasing-determination-dependent tag is offset from the identifier of the first recipient device user according to a conversion function (by arithmetic transfer function like "subtracting 3" or by a lookup table, e.g.). If the determination is negative, the aliasing-determination-dependent tag is obtained by assigning an identifier of a first recipient device user as the aliasing-determination-dependent tag ("206-555-2460," e.g.). The communication is established by invoking transistor-based circuitry configured to cause a PSTN selectively to route a message that uniquely identifies the first recipient device user (Carol) to a shared mobile device 440 identified by the aliasing-determination-dependent tag.

In some contexts, Roger (party 302) may implement one or more privacy protocols 712 when directing a communication 535 via a virtual identifier (e.g. calling Carol at "206-555-2463"), such as in a context in which he is concerned that a digital sequence that identifies him will be filtered automatically or manually intercepted (by a hostile party, e.g.). In light of teachings herein, such a protocols may be implemented in various ways. Privacy protocol 712 may (optionally) include, for example, transmitting a false natural language statement 1021 (a statement from Roger like "this is Larry and I urgently need to talk to Nancy" in text or audio format, e.g.) or another indication 1046 mis-identifying a user who initiates the communication as another entity.

Alternatively or additionally, a portion of communication 535 (one or more data items 681-683, e.g.) of may be encrypted in a way that effectively prevents an unintended recipient from accessing that portion. In a context in which communication 535 arrives when an intended recipient (party 403 designated by an account-specific header, e.g.) is not logged onto device 440 and another party 401, for example, that portion may be shown as encrypted or hidden entirely. At a later time at which party 403 enters a private key or personal biometric by which she is authenticated (identified by an account-specific header 671, e.g.), that portion is extracted (decrypted using the private key, e.g.) and presented at device 440. Alternatively or additionally, such encryption and decryption for a substantial communication (video call or extended telephone call, e.g.) may be contingent upon two or more parties 302, 403 to the communication using a mobile device 440 that is either currently charging or adequately charged (above a preset threshold that corresponds to a charging state of more than 10%, e.g.).

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

In some embodiments, a "state" of a component may comprise "available" or some other such state-descriptive labels, an event count or other such memory values, a partial depletion or other such physical property of a supply device, a voltage, or any other such conditions or attributes that may change between two or more possible values irrespective of device location. Such states may be received directly as a measurement or other detection, in some variants, and/or may be inferred from a component's behavior over time. A distributed or other composite system may comprise vector-valued device states, moreover, which may affect dispensations or departures in various ways as exemplified herein.

"After," "automatic," "among," "anonymous," "apparently," "as," "associated," "audible," "caused," "between," "bidirectional," "common," "component," "conditional," "configured," "constructed," "coupled," "defined," "detectable," "determined," "executable," "executed," "free," "from," "effective," "handheld," "indirect," "informational," "in a vicinity," "local," "later," "mobile," "more," "implemented," "in association with," "integrated," "interpersonal," "only," "operable," "portable," "single," "particular," "nominal," "within," "passive," "partly based," "previously," "proactively," "programmatic," "received," "remote," "responsive," "signal-bearing," "switched," "resident," "selective," "shared," "specific," "special-purpose," "stationary," "temporary," "matching," "significant," "semi-permanent," "transitory," "transmitted," "virtual," "visible," "wireless," or other such descriptors herein are used in their normal yes-or-no sense, not as terms of degree, unless context dictates otherwise. In light of the present disclosure those skilled in the art will understand from context what is meant by "vicinity," by being "in" a region or "within" a range, by "remote," and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. As used herein, the term "tangible medium" does not definitionally encompass mere transitory propagating signals. "For" is not used to articulate a mere intended purpose in phrases like "circuitry for" or "instruction for," moreover, but is used normally, in descriptively identifying special purpose software or structures.

In some embodiments a "manual" occurrence includes, but is not limited to, one that results from one or more actions consciously taken by a device user in real time. Conversely an "automatic" occurrence is not affected by any action consciously taken by a device user in real time except where context dictates otherwise.

In some embodiments, "signaling" something can include identifying, contacting, requesting, selecting, or indicating the thing. In some cases a signaled thing is susceptible to fewer than all of these aspects, of course, such as a task definition that cannot be "contacted."

In some embodiments, "causing" events can include triggering, producing or otherwise directly or indirectly bringing the events to pass. This can include causing the events remotely, concurrently, partially, or otherwise as a "cause in fact," whether or not a more immediate cause also exists.

As used herein, a static value (phone number or other entity identifier, e.g.) cannot be "derived from" another static value if both are the same. Likewise a component that merely relays an input signal as an output signal does not "derive" the output signal. In light of teachings herein, however, numerous existing techniques may be applied for configuring special-purpose circuitry or other structures effective for implementing a time-varying or other quantitative modulations as described herein without undue experimentation. See, e.g., structural components to which the enclosed Information Disclosure Statement (in form 1449A/PTO or substitute filed herewith as another component of the instant application) refers, several of which publications describe record retrieval and other entity associations in detail.

Some descriptions herein refer to an "indication whether" an event has occurred. An indication is "positive" if it indicates that the event has occurred, irrespective of its numerical sign or lack thereof. Whether positive or negative, such indications may be weak (i.e. slightly probative), definitive, or many levels in between. In some cases the "indication" may include a portion that is indeterminate, such as an irrelevant portion of a useful photograph.

Some descriptions herein refer to a "device" or other physical article. A physical "article" described herein may be a long fiber, a transistor 351, a submarine, or any other such contiguous physical object. An "article" may likewise be a portion of a device as described herein (part of a memory 336 or a speaker 971 of a smartphone, e.g.) or a mechanically coupled grouping of devices (a tablet computer with a removable memory and earpiece attached, e.g.) as described herein, except where context dictates otherwise. A communication "linkage" may refer to a unidirectional or bidirectional signal path via one or more articles (antennas 956 or other signal-bearing conduit, e.g.) except where context dictates otherwise. Such linkages may, in some contexts, pass through a free space medium 391 or a network 390.

Figure 11:
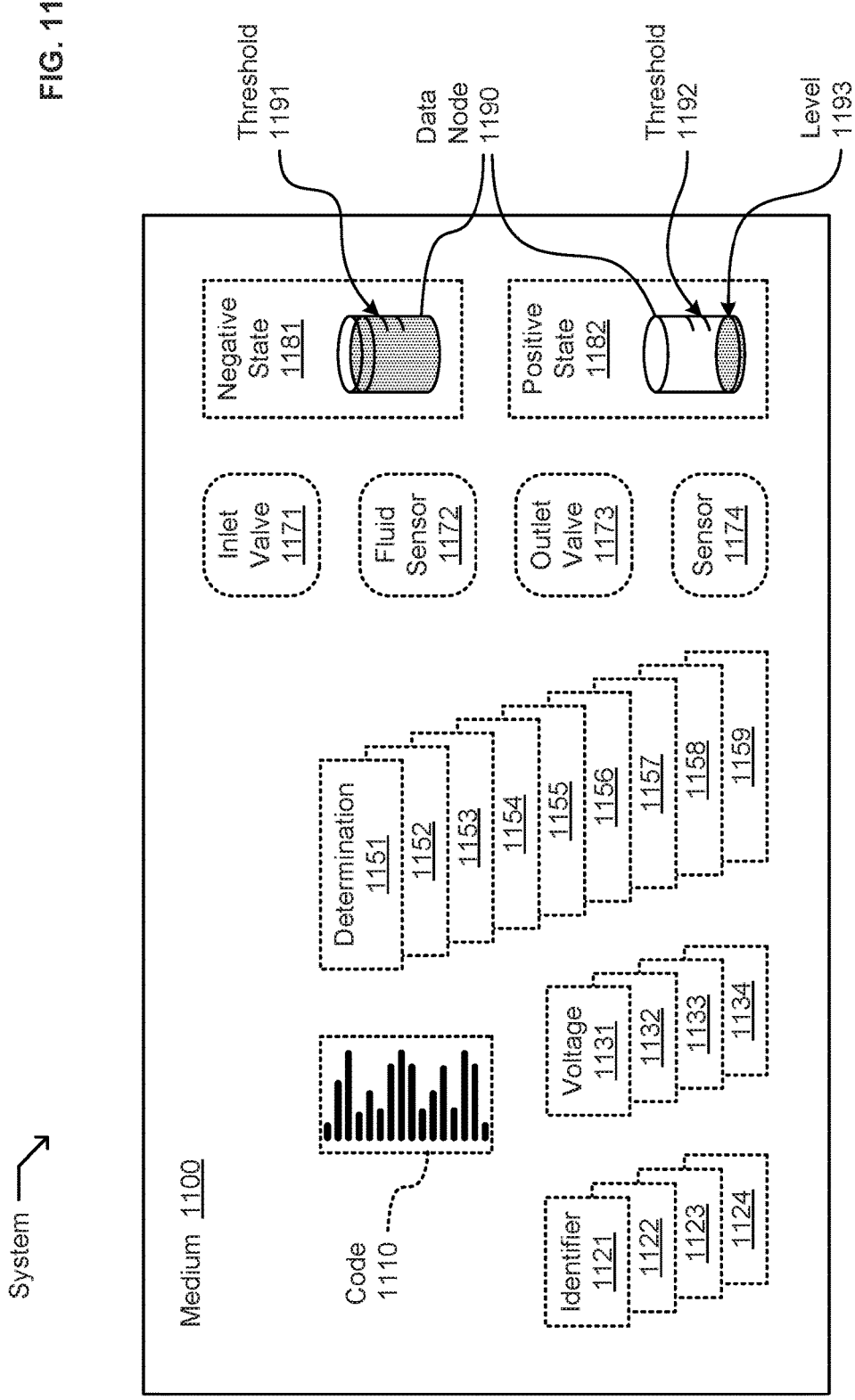
FIGS. 11-16 each depict an exemplary environment in which one or more technologies may be implemented in tangible data-handling media.

Referring now to FIG. 11, a system is shown comprising one or more tangible data-handling media 1100 bearing one or more instances of code 1110; of identifiers 1121, 1122, 1123, 1124; of voltages 1131, 1132, 1133, 1134; of determinations 1151, 1152, 1153, 1154, 1155, 1156, 1157, 1158, 1159; or other such metrics. Such informational data may be manifested on a node set (e.g. of one or more nodes 341-344) of an integrated circuit 333, for example, as a configuration of one or more respective voltage levels 331-334. See FIGS. 3C and 17-20 (depicting useful node sets). Likewise each node set may comprise media 1100 in which other kinds of indicia (one or more levels 1193, e.g.) may manifest such information. (Insofar that voltage levels 331-334 and fluid levels 1193 are analogous, this example will prove useful to some readers.) A data node 1190 literally containing a fluid, for example, may manifest either a negative state 1181 (as any fluid level 1193 above a threshold 1191, e.g.) or a positive state 1182 (as any fluid level 1193 below a threshold 1192, e.g.). A fluid inlet valve 1171 may allow fluid to enter (as a "current," e.g.) so that data node 1190 transitions from positive state 1182 to negative state 1181. Conversely a fluid outlet valve 1173 may allow fluid to exit so that data node 1190 transitions from negative state 1181 to positive state 1182. In some contexts, for example, one or more instances of fluid sensors 1172 may be configured to detect a fluid level configuration of or transitions in a data node set manifesting one or more determinations 1151-1159 or other indications. Transistor components or other sensors 1174 can likewise manifest such indications in some variants, as further described below.

Figure 12:
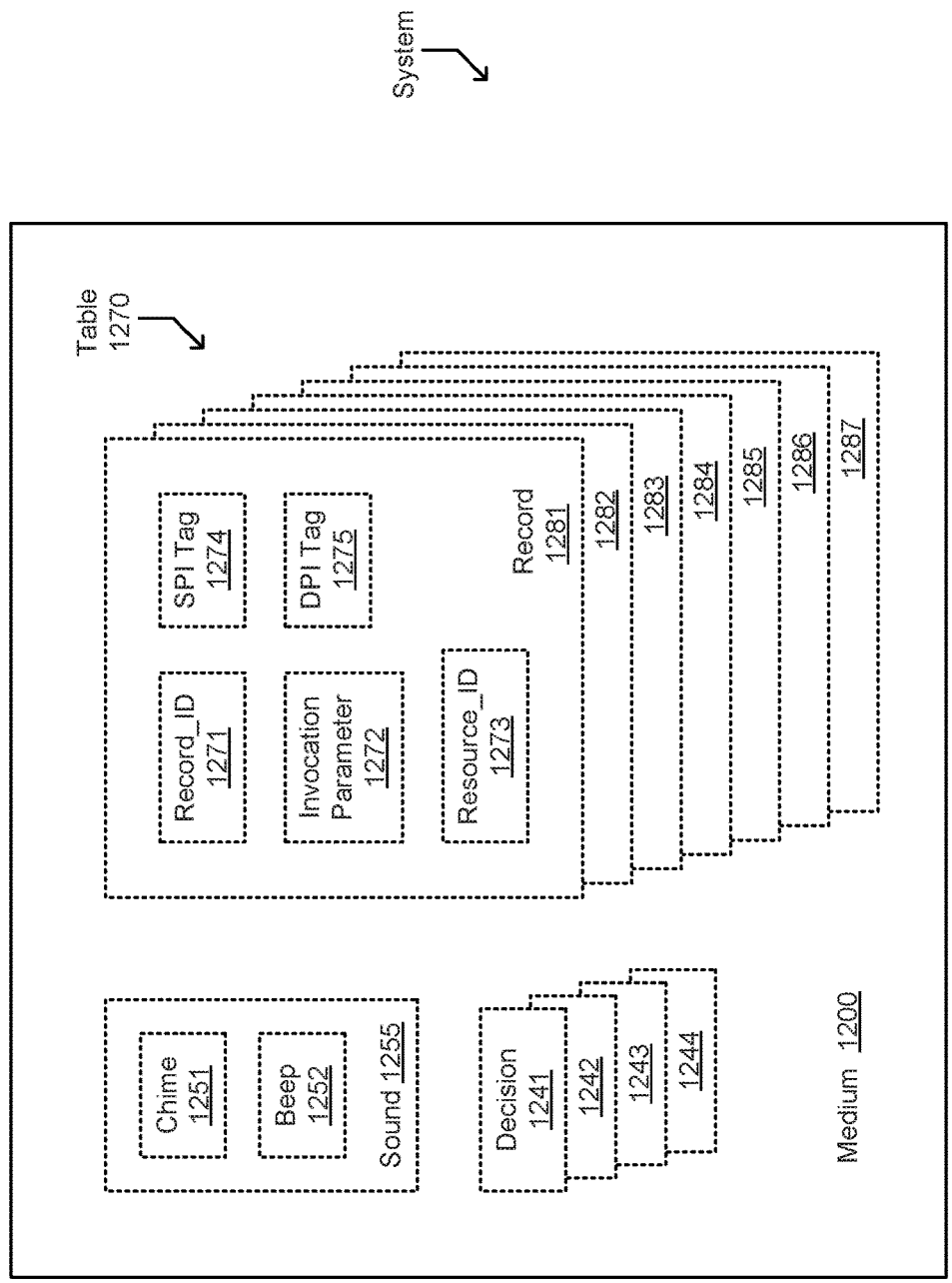

Referring now to FIG. 12, a system is shown comprising one or more tangible data-handling media 1200 bearing one or more instances of code 1110; of recorded or other digitally expressed sounds 1255 (one or more chimes 1251 or beeps 1252 or other such phenomena, e.g.); of decisions 1241, 1242, 1243, 1244; or of tables 1270. As described below, such tables may each comprise several records 1281, 1282, 1283, 1284, 1285, 1286, 1287 each containing one or more fields (e.g. one or more record identifiers 1271, invocation parameters 1272 or other operating parameters, resource identifiers 1273, source party identification tags 1274, or destination party identification tags 1275 as shown).

Figure 13:
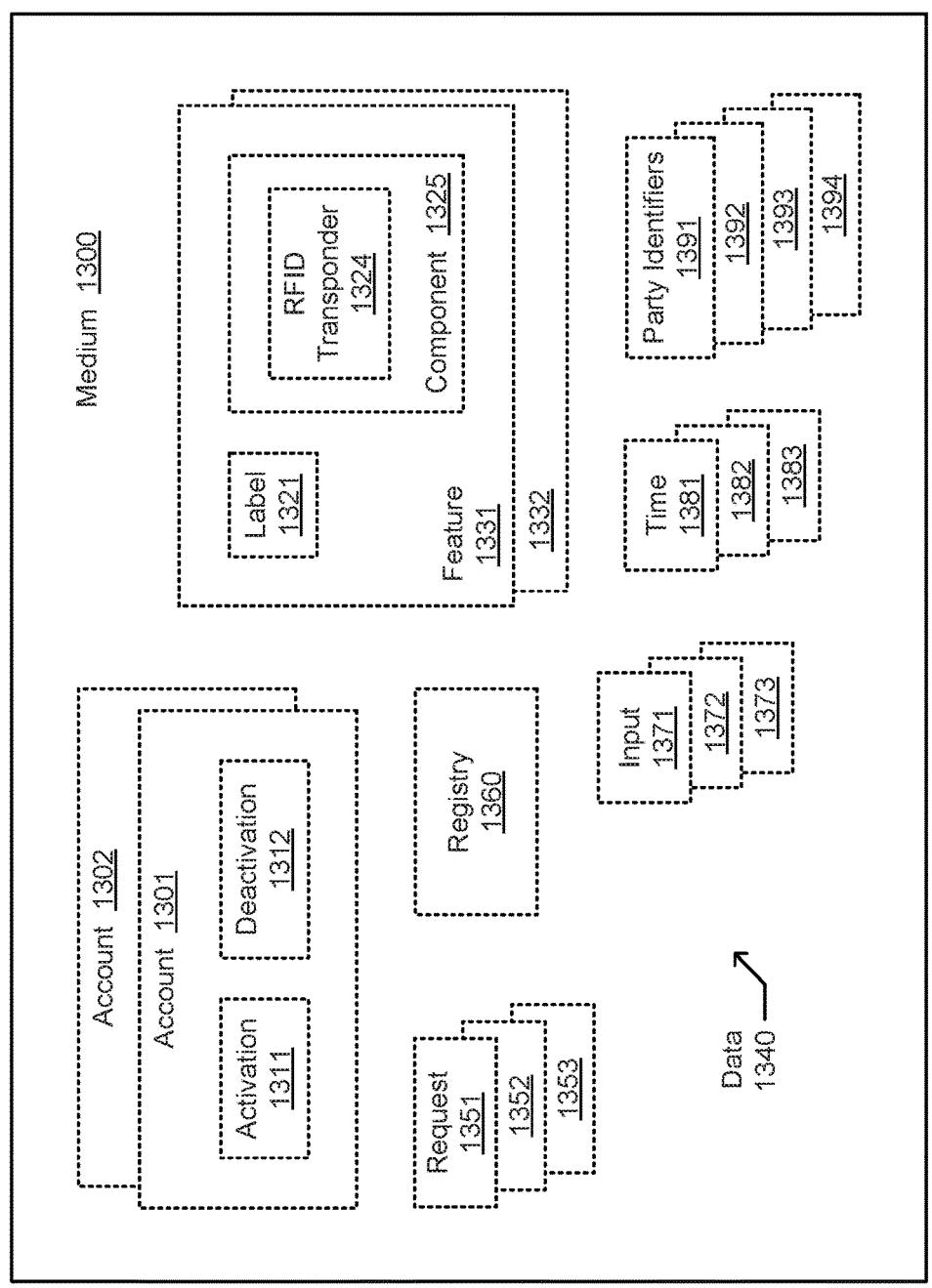

Referring now to FIG. 13, a system is shown comprising one or more tangible data-handling media 1300 bearing one or more instances of accounts 1301, 1302 (each manifesting one or more activations 1311 or deactivations 1312, e.g.); of requests 1351, 1352, 1353; of registries 1360; of labels 1321 or other marking components 1325 (radio frequency identification transponders 1324, e.g.) or other such physical features 1331, 1332; of inputs 1371, 1372, 1373; of times 1381, 1382, 1383; or of party identifiers 1391, 1392, 1393, 1394 as described below.

Figure 14:
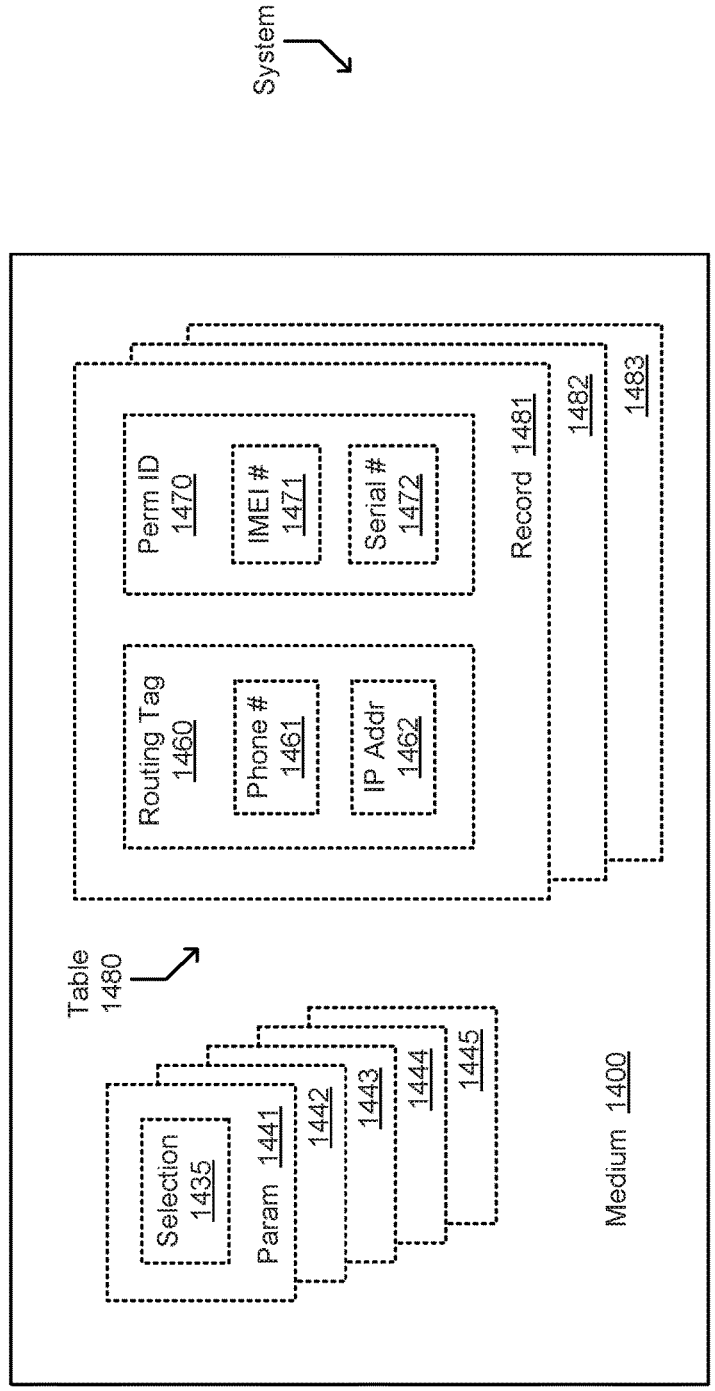

Referring now to FIG. 14, a system is shown comprising one or more tangible data-handling media 1400 bearing one or more instances of selections 1435 or other parameters 1441, 1442, 1443, 1444, 1445 or of tables 1480 containing one or more records 1481, 1482, 1483. In some contexts described herein, each such record may associate one or more routing tags 1460 (comprising a phone number 1461 or internet protocol address 1462, e.g.) with one or more permanent identifiers 1470 (comprising an international mobile station equipment identity number 1471 or other serial number 1472, e.g.).

Figure 15:
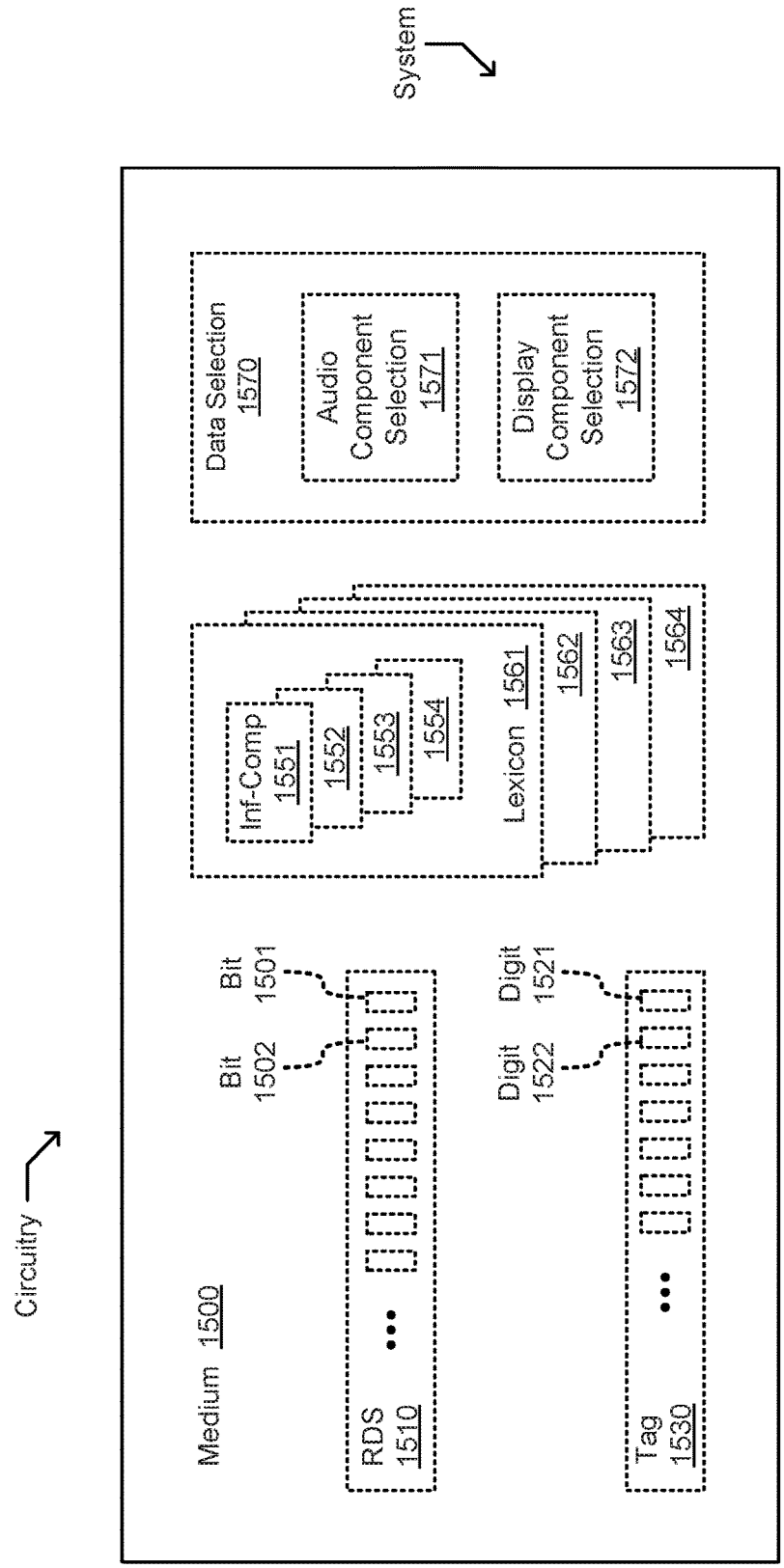

Referring now to FIG. 15, a system is shown comprising one or more tangible data-handling media 1500 bearing one or more instances of recipient designation signals 1510 (e.g. comprising a series of one or more bits 1501, 1502); of network routing tags 1530 (e.g. comprising a series of one or more bits 1521, 1522); of information components 1551, 1552, 1553, 1554 (e.g. arranged in lexicons 1561, 1562, 1563, 1564); or of data selections 1570 (each comprising one or more audio component selections 1571 or display component selections 1572, e.g.).

Figure 16:
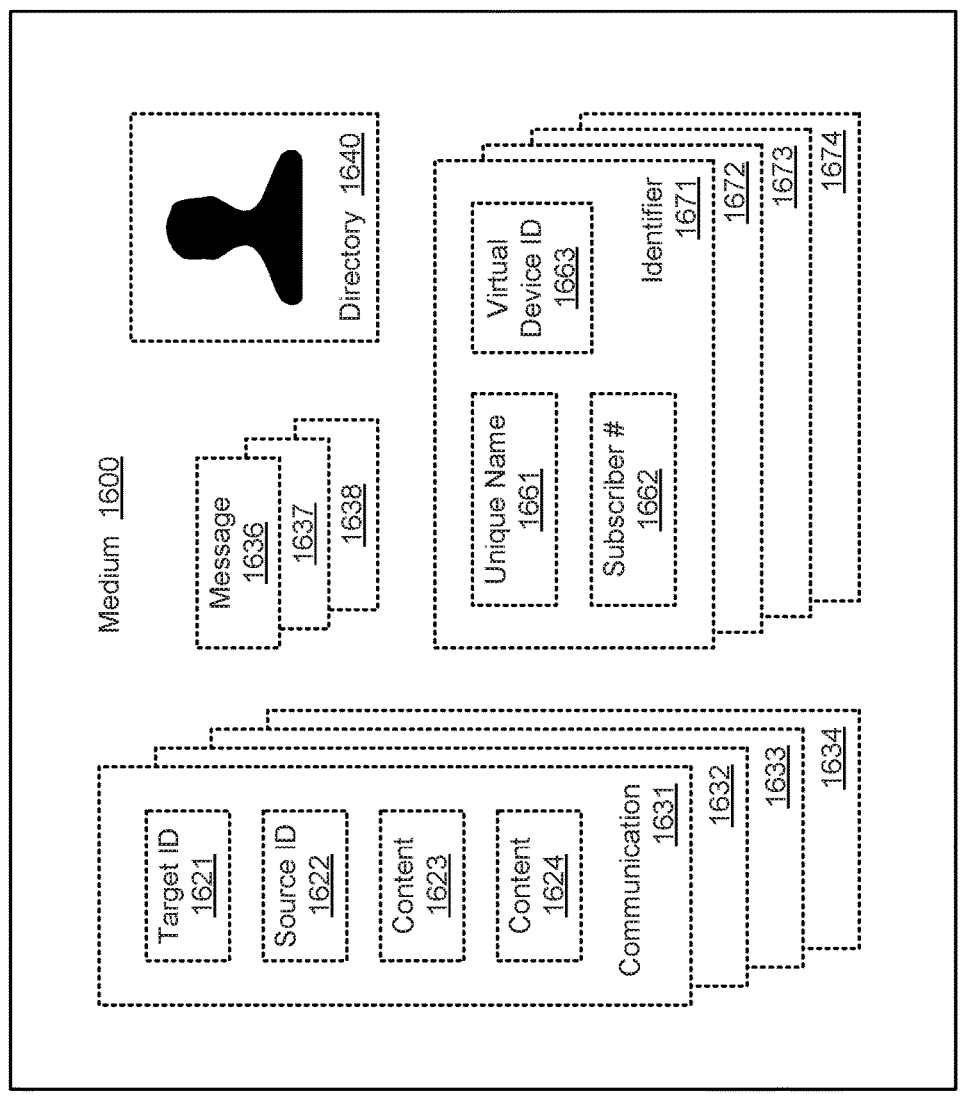

Referring now to FIG. 16, a system is shown comprising one or more tangible data-handling media 1600 bearing one or more instances of communications 1631, 1632, 1633, 1634 optionally comprising one or more instances of target identifications 1621; of source identifications 1622; or of content 1623, 1624. In some contexts, for example, such communications 1631-1634 may comprise one or more device-generated or interpersonal messages 1636, 1637, 1638 or communications 531-535 as described below. Alternatively or additionally, such media 1600 may include one or more instances of locally or remotely accessible directories 1640 or indexed by one or more unique names 1661, subscriber numbers 1662, virtual device identifiers 1663 or other such identifiers 1671, 1672, 1673, 1674 and optionally associating two or more such entities as described herein.

Figure 17:
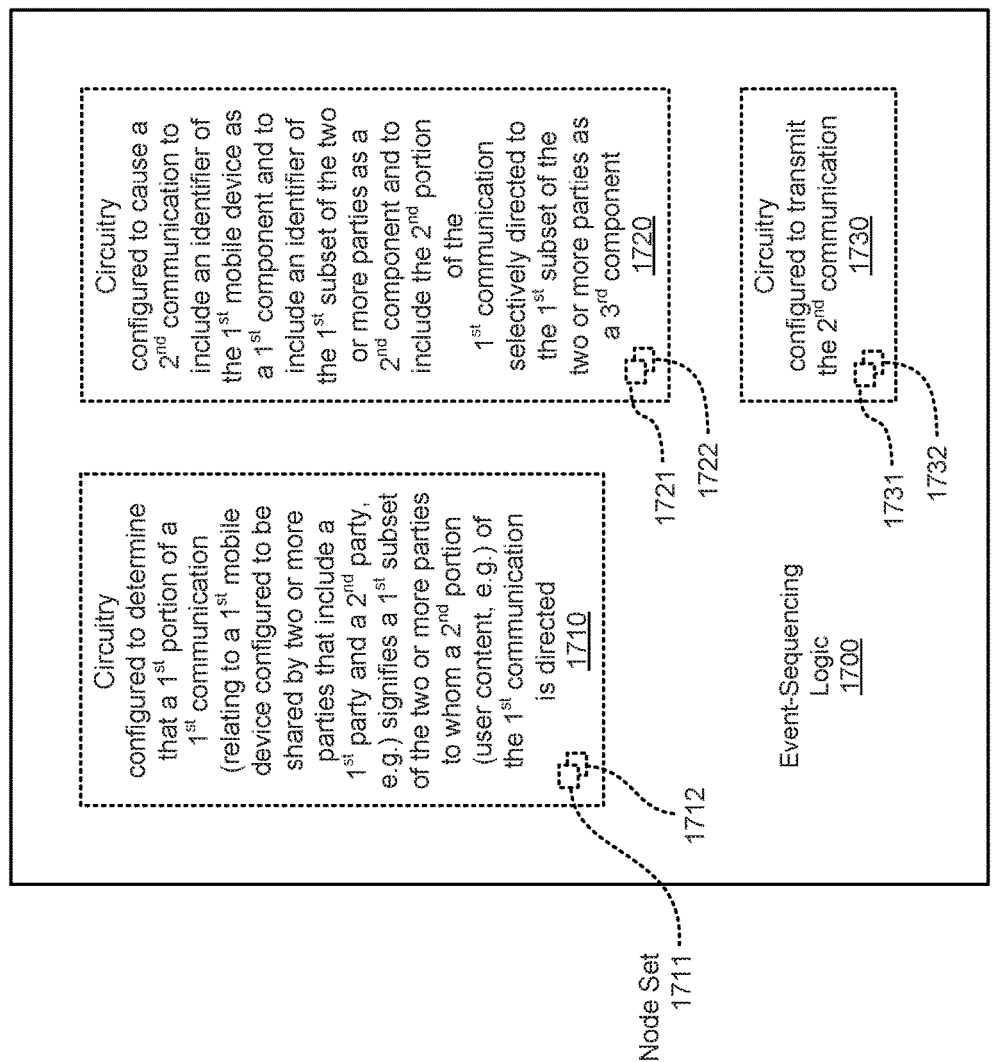
FIG. 17 depicts another exemplary environment in which one or more technologies may be implemented in circuitry or other event-sequencing logic.

Referring now to FIG. 17, a system is shown comprising event-sequencing logic 1700 relating to a mobile device configured to be shared by two or more parties. Such logic may include one or more node sets 1711, 1712 implementing or interacting with circuitry 1710 configured to determine that a first portion of a first communication signifies a first subset of the two or more parties to whom a second portion of the first communication is directed and having one or more voltage configurations thereon each manifesting a respective component (protocol or determinant or result, e.g.) thereof, as further described below. Such logic may likewise include one or more node sets 1721, 1722 implementing or interacting with circuitry 1720 configured to cause a second communication to include an identifier of the first mobile device as a first component and to include an identifier of the first subset of the two or more parties as a second component and to include the second portion of the first communication directed to the first subset of the two or more parties as a third component and having one or more voltage configurations thereon each manifesting a respective component thereof, as further described below. Such logic may likewise include one or more node sets 1731, 1732 implementing or interacting with circuitry 1730 configured to transmit the second communication and having one or more voltage configurations thereon each manifesting a respective component thereof, as further described below.

In some variants described herein a "party" refers to a living entity (one or more human beings, e.g.). A "set" of parties may be divided into two or more "subsets" (one of which subsets may be a "remainder" of the set that is complementary to another subset, e.g.). A "component" of a digital communication may refer to an entirety of the communication or to any portion of the communication (comprising one or more bits, e.g.). An initiator or sender may cause a communication to be "directed to" one or more entities (devices or parties, e.g.) in various ways, such as by configuring an "address" or "destination" portion of the communication. Moreover in some contexts an expression in a communication may "signify" one or more such entities either directly (by including a unique identifier of each such entity, e.g.) or indirectly (by including one or more expressions sufficiently specific to identify an entity locally or by providing enough information so that unique identifiers of each such entity may be retrieved or otherwise accessed, e.g.).

Figure 18:
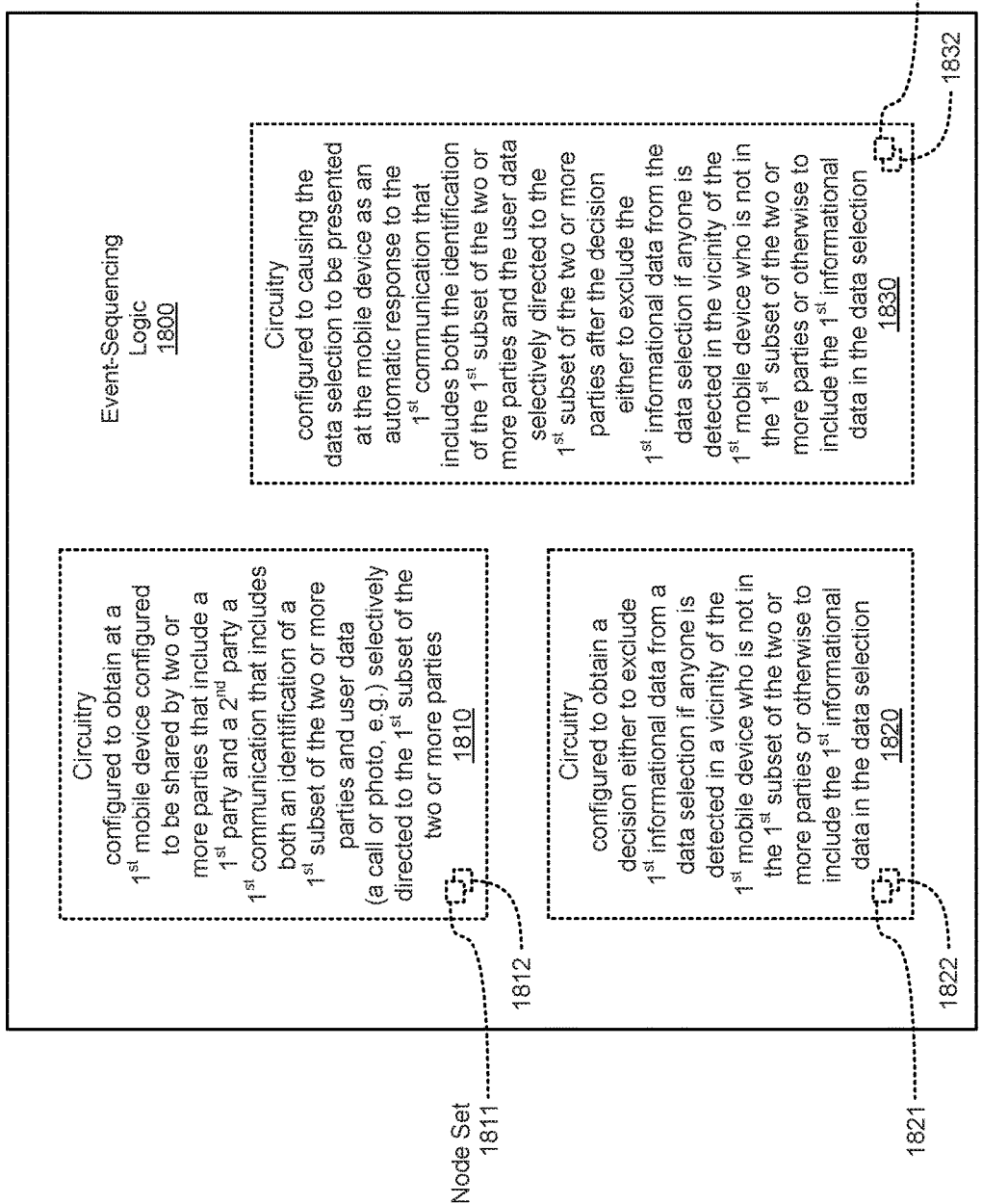
FIG. 18 depicts another exemplary environment in which one or more technologies may be implemented in circuitry or other event-sequencing logic.

Referring now to FIG. 18, a system is shown comprising event-sequencing logic 1800 relating to a mobile device configured to be shared by two or more parties. Such logic may include one or more node sets 1811, 1812 implementing or interacting with circuitry 1810 configured to obtain a first communication having both a first routing tag and first user content and having one or more voltage configurations thereon each manifesting a respective component (protocol or determinant or result, e.g.) thereof, as further described below. Such logic may likewise include one or more node sets 1821, 1822 implementing or interacting with circuitry 1820 configured to obtain both a selective identification of a first subset of the two or more parties derived from the first routing tag and the first user content to be transmitted in a second communication having a second routing tag also derived from the first routing tag and having one or more voltage configurations thereon each manifesting a respective component thereof, as further described below. Such logic may likewise include one or more node sets 1831, 1832 implementing or interacting with circuitry 1830 configured to cause the data selection to be presented at the first mobile device as an automatic response to the first communication that includes both the identification of the first subset of the two or more parties and the user data directed to the first subset of the two or more parties after the decision either to exclude the first informational data from the data selection if anyone is detected in the vicinity of the first mobile device who is not in the first subset of the two or more parties or to include the first informational data in the data selection if no one is detected in the vicinity of the first mobile device who is not in the first subset of the two or more parties and having one or more voltage configurations thereon each manifesting a respective component thereof, as further described below.

Figure 19:
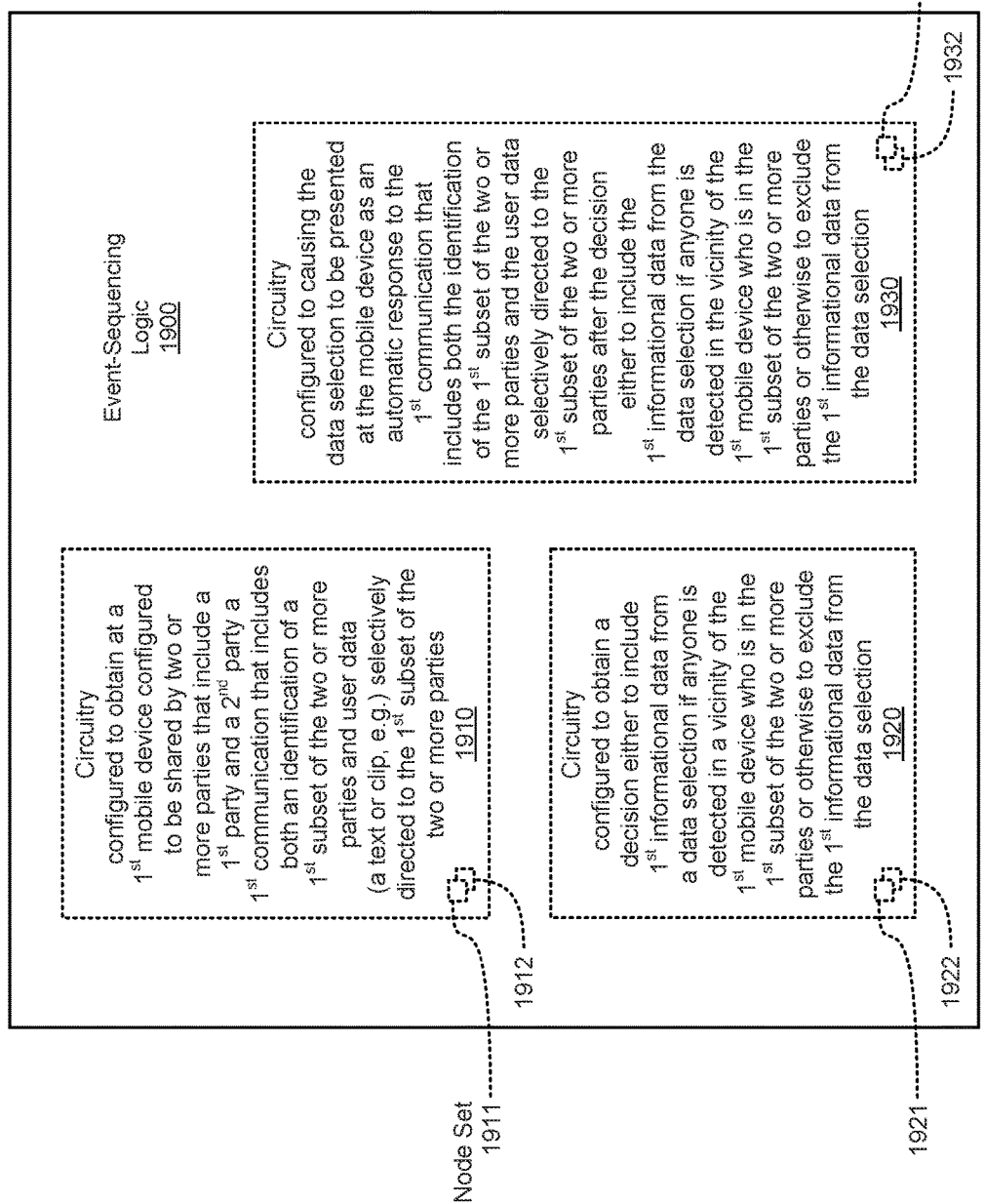
FIG. 19 depicts another exemplary environment in which one or more technologies may be implemented in circuitry or other event-sequencing logic.

Referring now to FIG. 19, a system is shown comprising event-sequencing logic 1900 relating to a mobile device configured to be shared by two or more parties. Such logic may include one or more node sets 1911, 1912 implementing or interacting with circuitry 1910 configured to obtain a first component of a first communication and an identification of a first subset of the two or more parties with whom the first component is associated and a network routing tag identifying the first mobile device all at network equipment operably coupled with the first mobile device and having one or more voltage configurations thereon each manifesting a respective component (protocol or determinant or result, e.g.) thereof, as further described below. Such logic may likewise include one or more node sets 1921, 1922 implementing or interacting with circuitry 1920 configured to obtain a second communication that includes the first component of the first communication and identifies the first subset of the two or more parties and identifies the first mobile device at the network equipment as an automatic response to an indication of an active account being associated with the first subset and having one or more voltage configurations thereon each manifesting a respective component thereof, as further described below. Such logic may likewise include one or more node sets 1931, 1932 implementing or interacting with circuitry 1930 configured to cause the second communication from the network equipment and having one or more voltage configurations thereon each manifesting a respective component thereof, as further described below.

Figure 20:
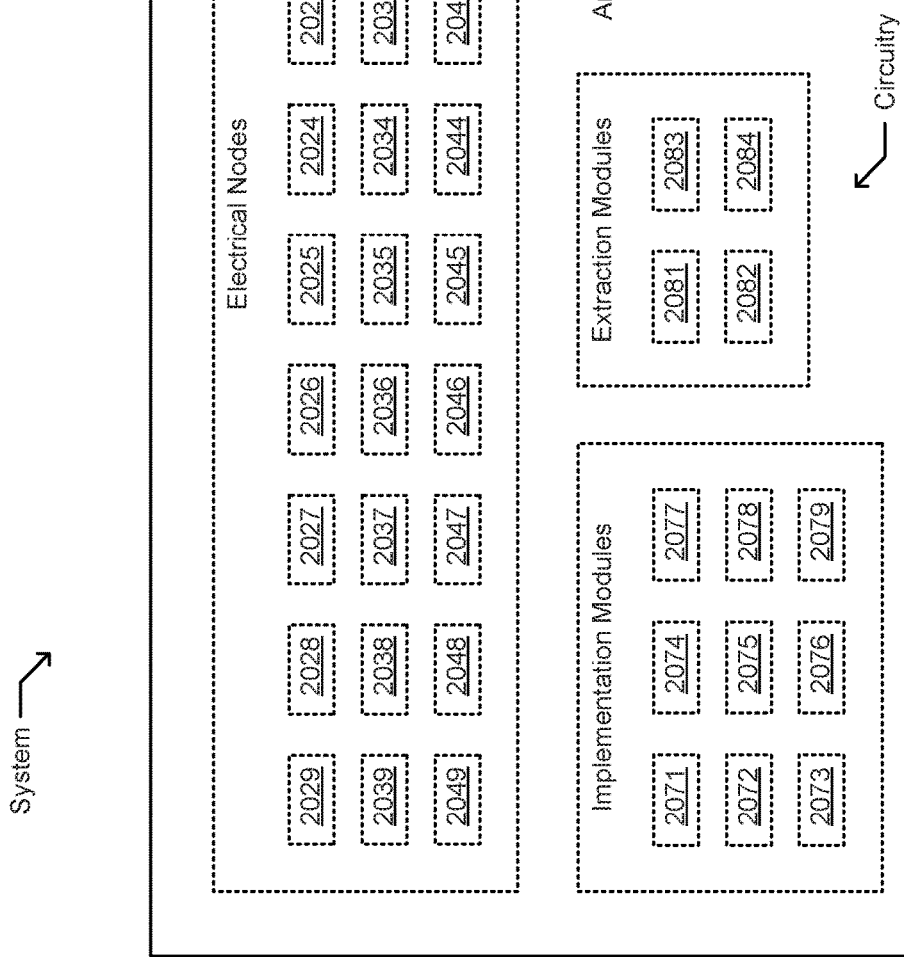
FIG. 20 depicts another exemplary environment in which one or more technologies may be implemented in circuitry or other event-sequencing logic.

Referring now to FIG. 20, a system is shown comprising event-sequencing logic 2000 comprising several electrical nodes 2020, 2021, 2022, 2023, 2024, 2025, 2026, 2027, 2028, 2029, 2030, 2031, 2032, 2033, 2034, 2035, 2036, 2037, 2038, 2039, 2040, 2041, 2042, 2043, 2044, 2045, 2046, 2047, 2048, 2049 (bearing one or more values 2098, e.g.) operably coupled with one or more instances of implementation modules 2071, 2072, 2073, 2074, 2075, 2076, 2077, 2078, 2079; of extraction modules 2081, 2082, 2083, 2084; or of antennas 2090 (able to receive a communication through air 2089, e.g.), as further described below. As used in the contexts of FIGS. 17-19 above, a "node set" includes one or more such electrical nodes each having a respective voltage—usually nominally "high" or "low" at times of interest—the "voltage configuration" of the node set being the component voltages taken collectively.

Figure 21:
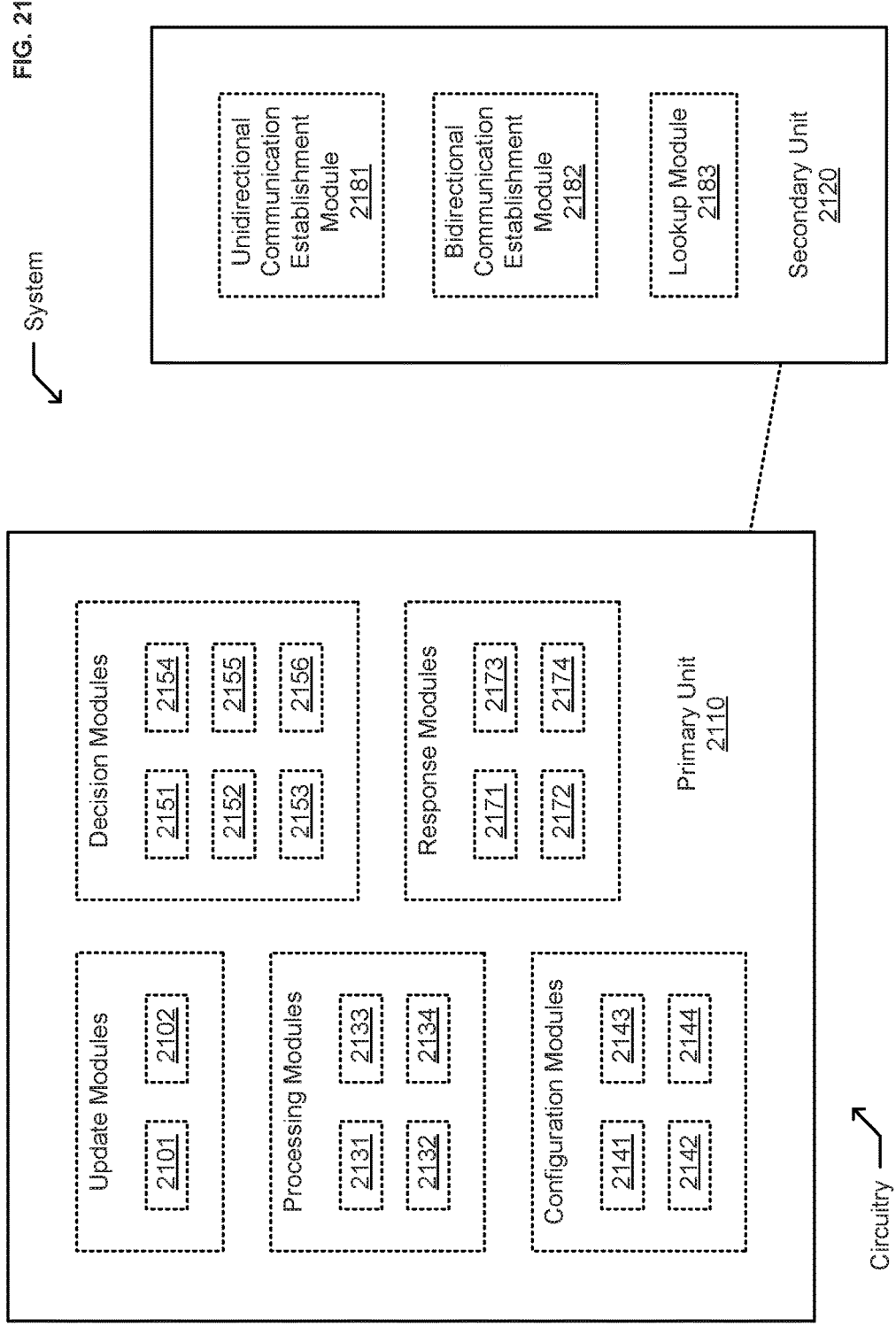
FIG. 21 depicts an exemplary environment in which one or more technologies may be implemented between a primary device and a secondary device.

Referring now to FIG. 21, a system is shown comprising a primary unit 2110 (exemplifying a mobile or other "first" device, e.g.) operably coupled with a secondary unit 2120 (exemplifying a "second" device receiving a signal from or sending a signal to the "first" device as described below, e.g.). In some variants, primary unit 2110 comprises one or more instances of update modules 2021, 2102; of processing modules 2131, 2132, 2133, 2134; of configuration modules 2141, 2142, 2143, 2144; of decision modules 2151, 2152, 2153, 2154, 2155, 2156; or of response modules 2171, 2172, 2173, 2174. A secondary unit 2120 may likewise comprise one or more instances of unidirectional communication establishment modules 2181; of bidirectional communication establishment modules 2182; or of lookup modules 2183, as further described below.

Figure 22:
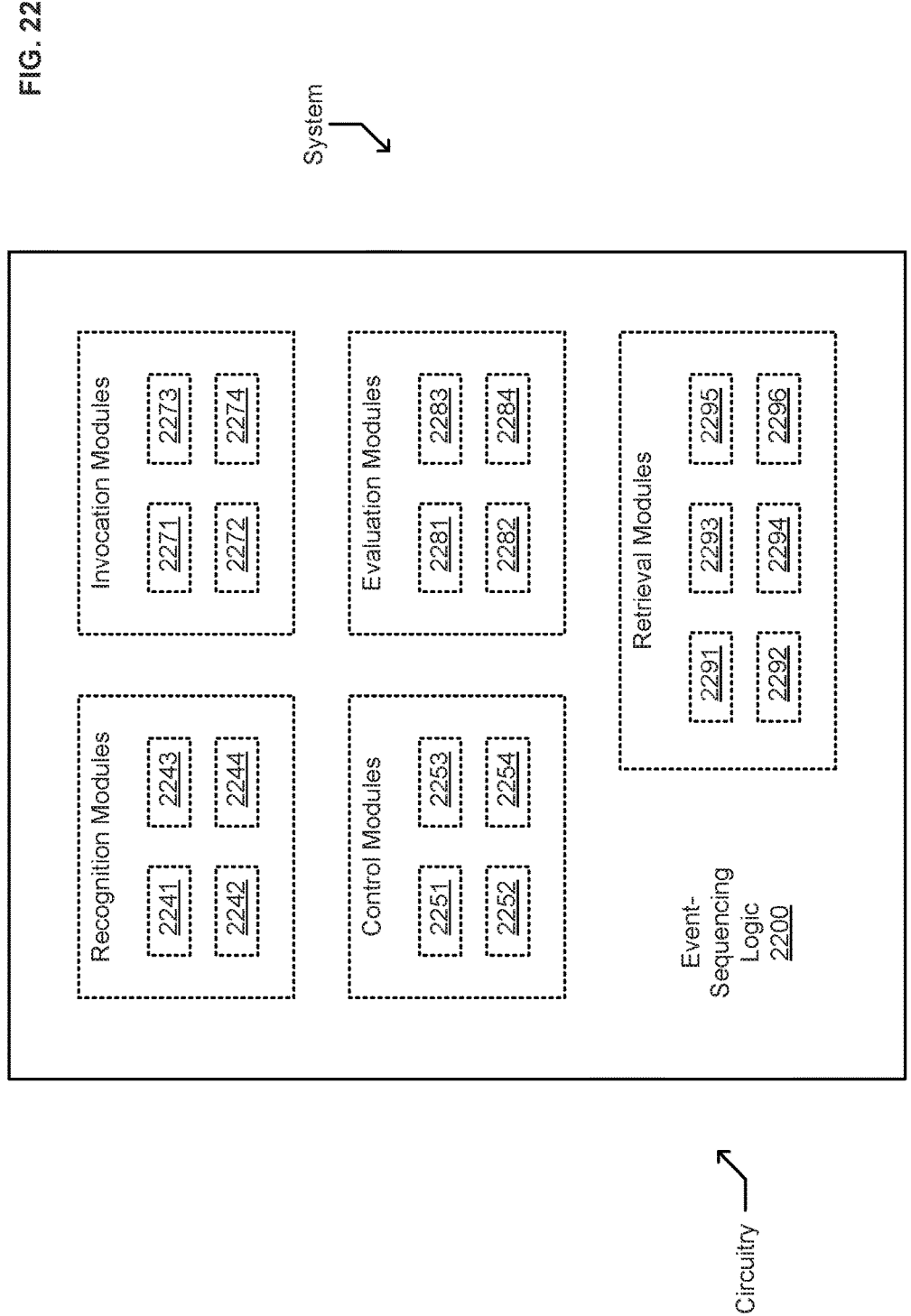
FIG. 22 depicts another exemplary environment in which one or more technologies may be implemented in circuitry or other event-sequencing logic.

Referring now to FIG. 22, a system is shown comprising event-sequencing logic 2200 comprising one or more instances of recognition modules 2241, 2242, 2243, 2244; of control modules 2251, 2252, 2253, 2254; of invocation modules 2271, 2272, 2273, 2274; of evaluation modules 2281, 2282, 2283, 2284; or of retrieval modules 2291, 2292, 2293, 2294, 2295, 2296 as further described below.

Figure 23:
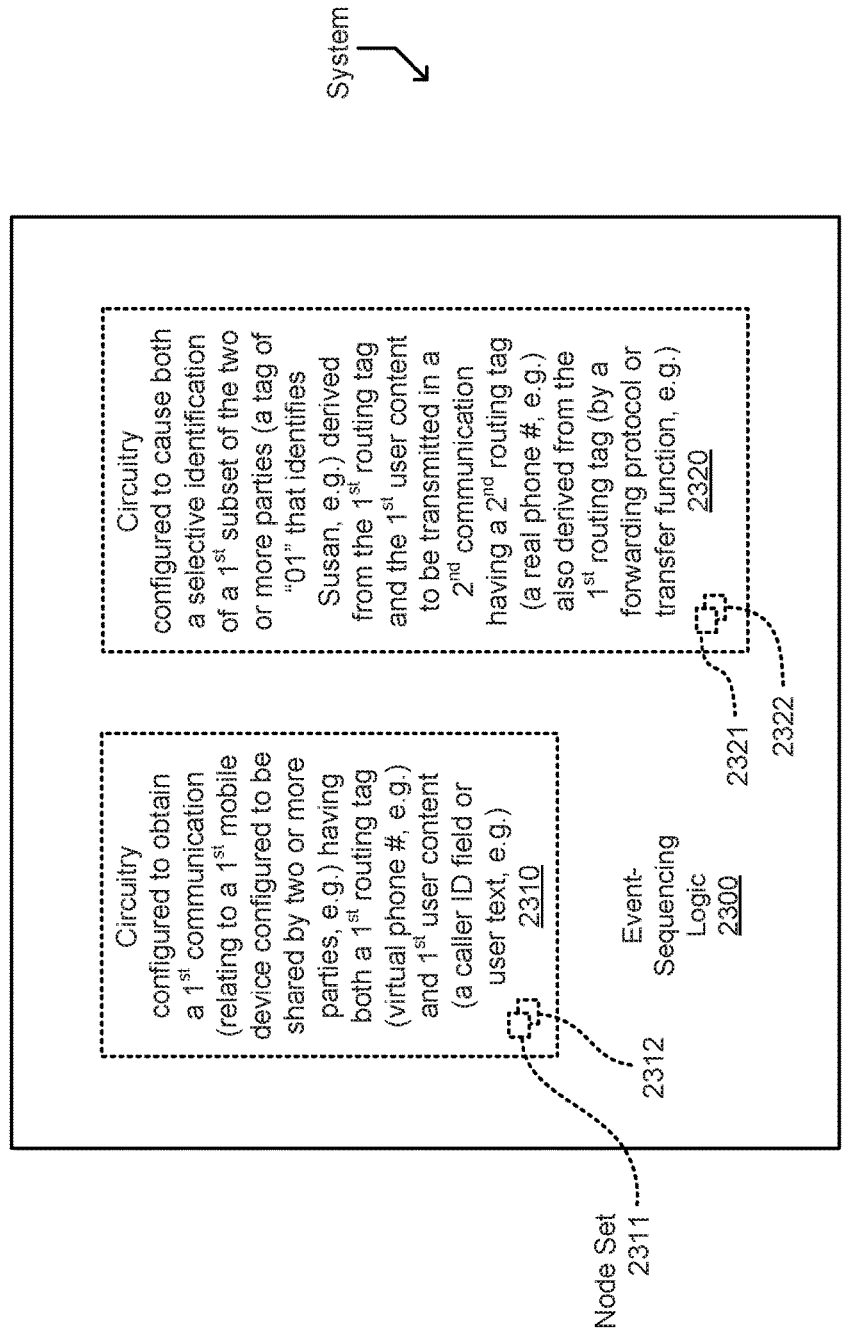
FIG. 23 depicts another exemplary environment in which one or more technologies may be implemented in circuitry or other event-sequencing logic.

Referring now to FIG. 23, a system is shown comprising event-sequencing logic 2300 relating to a mobile device configured to be shared by two or more parties. Such logic may include one or more node sets 2311, 2312 implementing or interacting with circuitry 2310 configured to obtain a first communication having both a first routing tag and first user content and having one or more voltage configurations thereon each manifesting a respective component (protocol or determinant or result, e.g.) thereof, as further described below. Such logic may likewise include one or more node sets 2321, 2322 implementing or interacting with circuitry 2320 configured to cause both a selective identification of a first subset of the two or more parties derived from the first routing tag and the first user content to be transmitted in a second communication having a second routing tag also derived from the first routing tag and having one or more voltage configurations thereon each manifesting a respective component thereof, as further described below.

Figure 24:
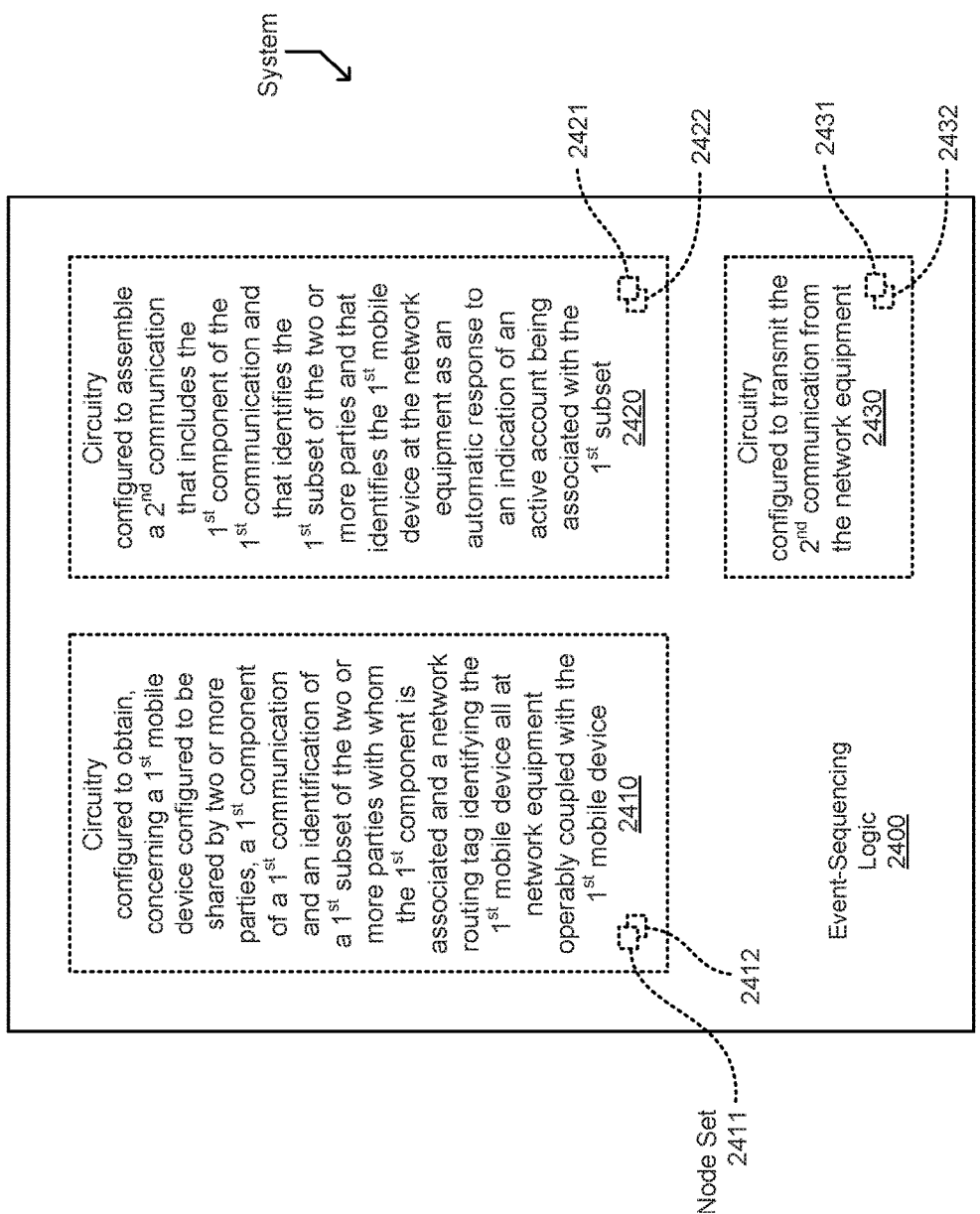
FIG. 24 depicts another exemplary environment in which one or more technologies may be implemented in circuitry or other event-sequencing logic.

Referring now to FIG. 24, a system is shown comprising event-sequencing logic 2400 relating to a mobile device configured to be shared by two or more parties. Such logic may include one or more node sets 2411, 2412 implementing or interacting with circuitry 2410 configured to obtain a first component of a first communication and an identification of a first subset of the two or more parties with whom the first component is associated and a network routing tag identifying the first mobile device all at network equipment operably coupled with the first mobile device and having one or more voltage configurations thereon each manifesting a respective component (protocol or determinant or result, e.g.) thereof, as further described below. Such logic may likewise include one or more node sets 2421, 2422 implementing or interacting with circuitry 2420 configured to assemble a second communication that includes the first component of the first communication and identifies the first subset of the two or more parties and identifies the first mobile device at the network equipment as an automatic response to an indication of an active account being associated with the first subset and having one or more voltage configurations thereon each manifesting a respective component thereof, as further described below. Such logic may likewise include one or more node sets 2431, 2432 implementing or interacting with circuitry 2430 configured to transmit the second communication from the network equipment and having one or more voltage configurations thereon each manifesting a respective component thereof, as further described below.

Figure 25:
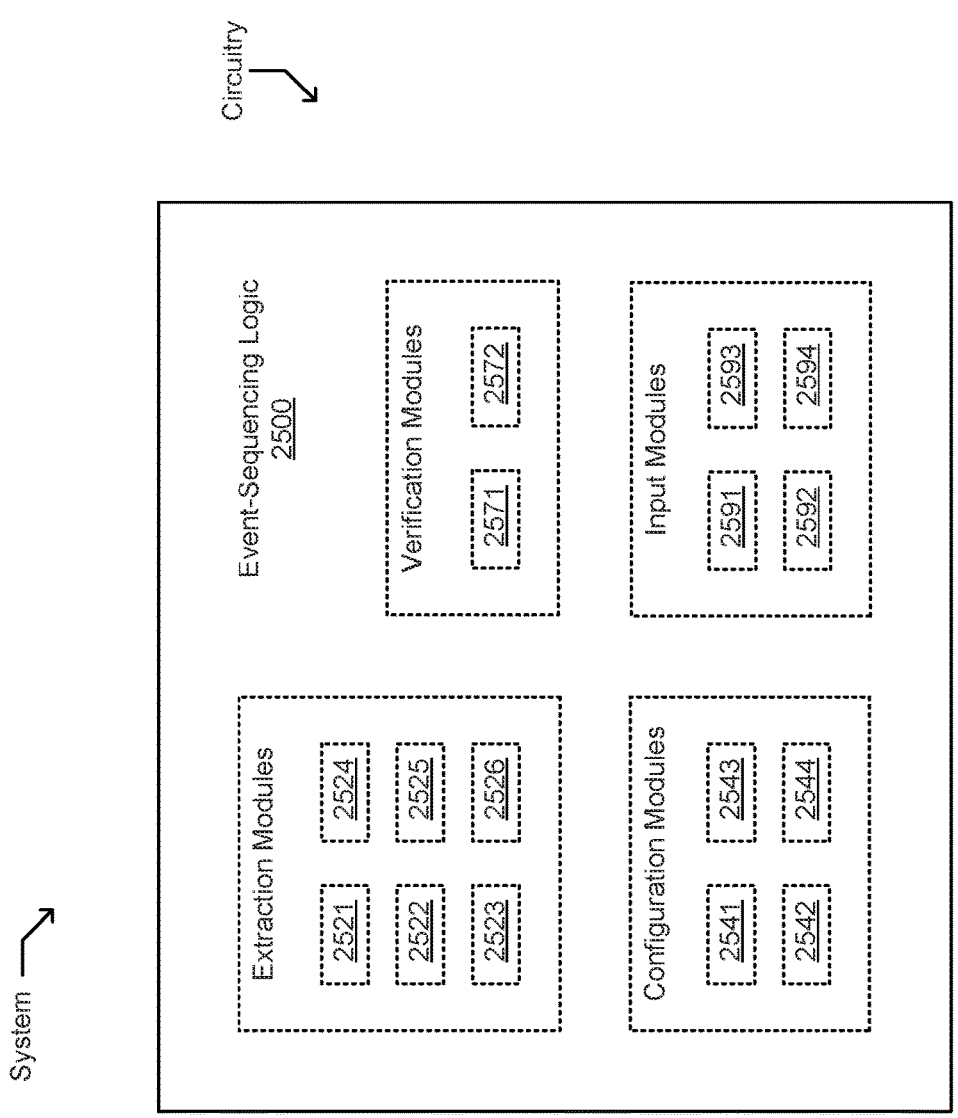
FIG. 25 depicts another exemplary environment in which one or more technologies may be implemented in circuitry or other event-sequencing logic.

Referring now to FIG. 25, a system is shown comprising event-sequencing logic 2500 comprising one or more instances of extraction modules 2521, 2522, 2523, 2524, 2525, 2526; of configuration modules 2541, 2542, 2543, 2544; of verification modules 2571, 2572; or of input modules 2591, 2592, 2593, 2594 as further described below.

Figure 26:
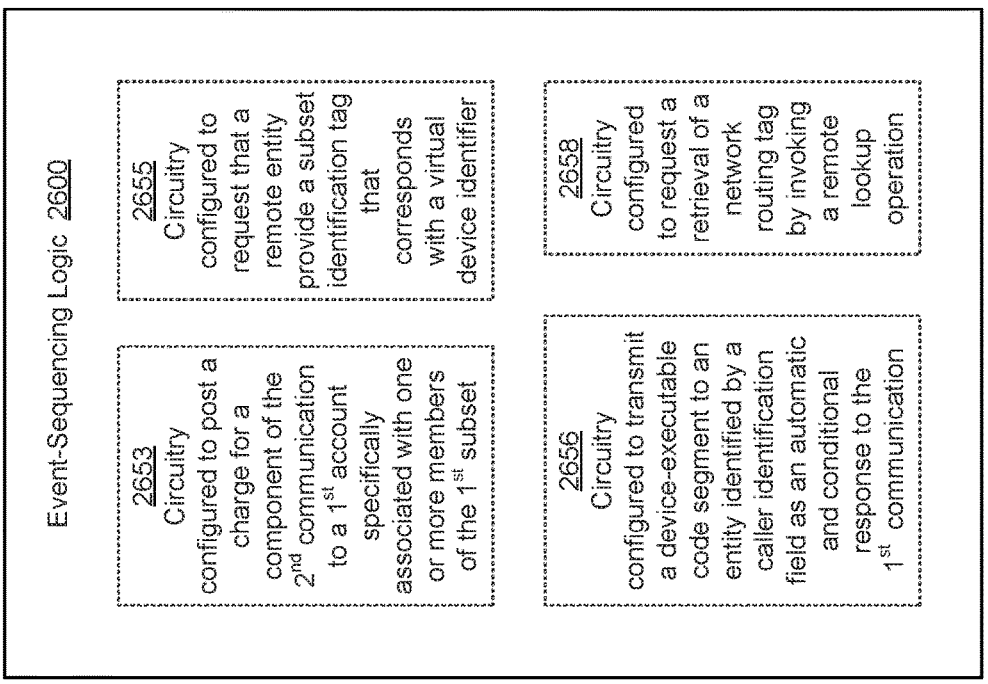
FIG. 26 depicts another exemplary environment in which one or more technologies may be implemented in circuitry or other event-sequencing logic.

Referring now to FIG. 26, a system is shown comprising event-sequencing logic 2600 comprising one or more instances of circuitry 2653 configured to post a charge for a component of the second communication to a first account specifically associated with one or more members of the first subset; of circuitry 2655 configured to request that a remote entity provide a subset identification tag that corresponds with a virtual device identifier; of circuitry 2656 configured to transmit a device-executable code segment to an entity identified by a caller identification field as an automatic and conditional response to the first communication; or of circuitry 2658 configured to request a retrieval of a network routing tag by invoking a remote lookup operation as further described below.

Figure 27:
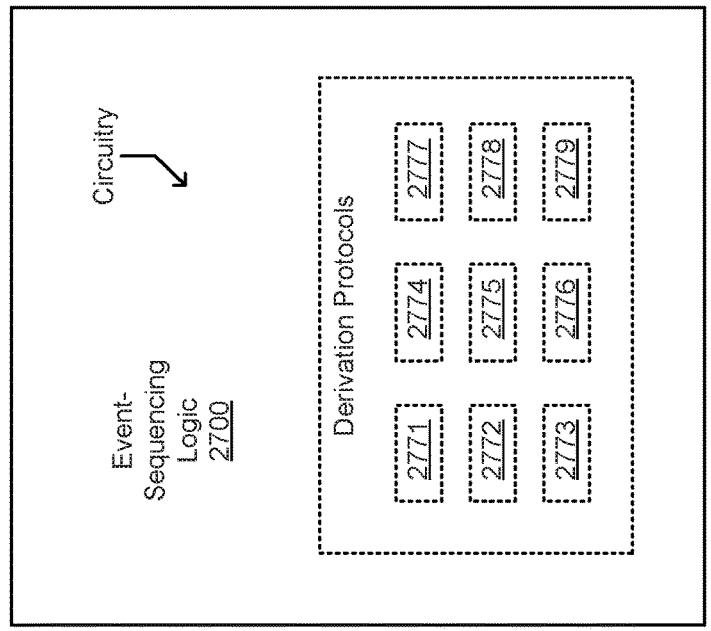
FIG. 27 depicts another exemplary environment in which one or more technologies may be implemented in circuitry or other event-sequencing logic.

Referring now to FIG. 27, a system is shown comprising event-sequencing logic 2700 comprising one or more instances of derivation modules 2771, 2772, 2773, 2774, 2775, 2776, 2777, 2778, 2779 as further described below.

Figure 28:
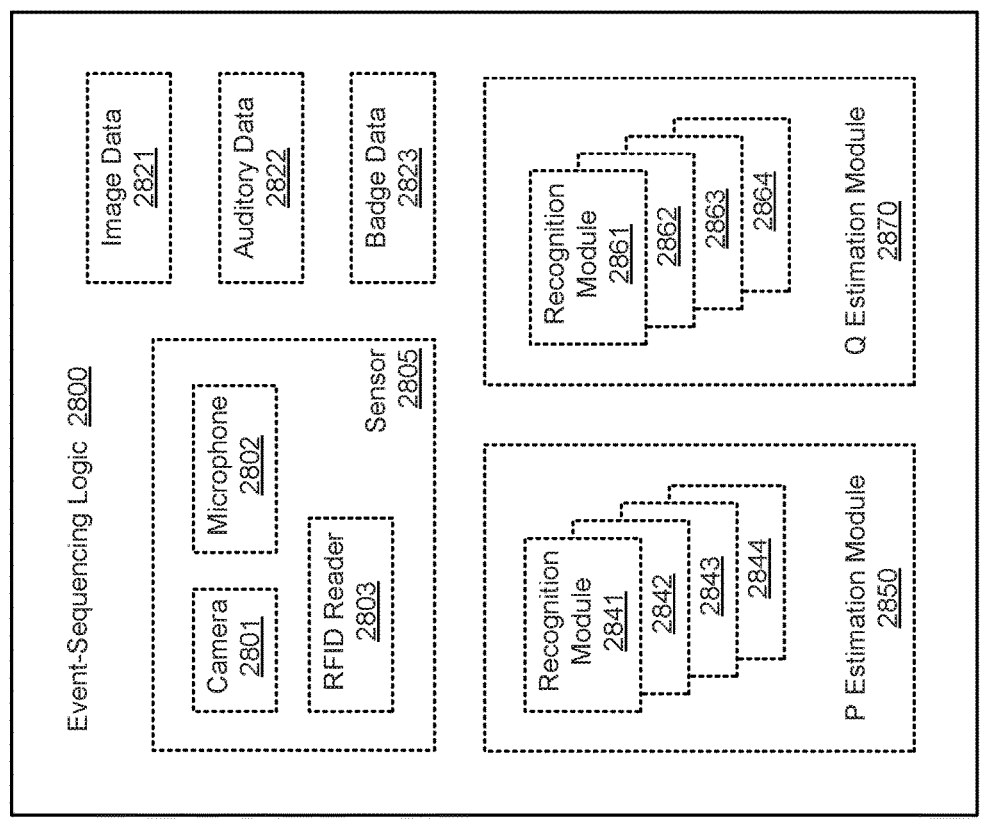
FIG. 28 depicts another exemplary environment in which one or more technologies may be implemented in circuitry or other event-sequencing logic.

Referring now to FIG. 28, a system is shown comprising event-sequencing logic 2800 comprising one or more instances of cameras 2801, microphones 2802, radio frequency identification (RFID) readers 2803, or other sensors 2805; of image data 2821; of auditory data 2822; of badge data 2823; of P estimation modules 2850 comprising one or more recognition modules 2841, 2842, 2843, 2844; of Q estimation modules 2870 comprising one or more recognition modules 2861, 2862, 2863, 2864 as further described with reference to U.S. application Ser. No. 14/175,617 (at FIG. 36 thereof, e.g.).

Figure 29:
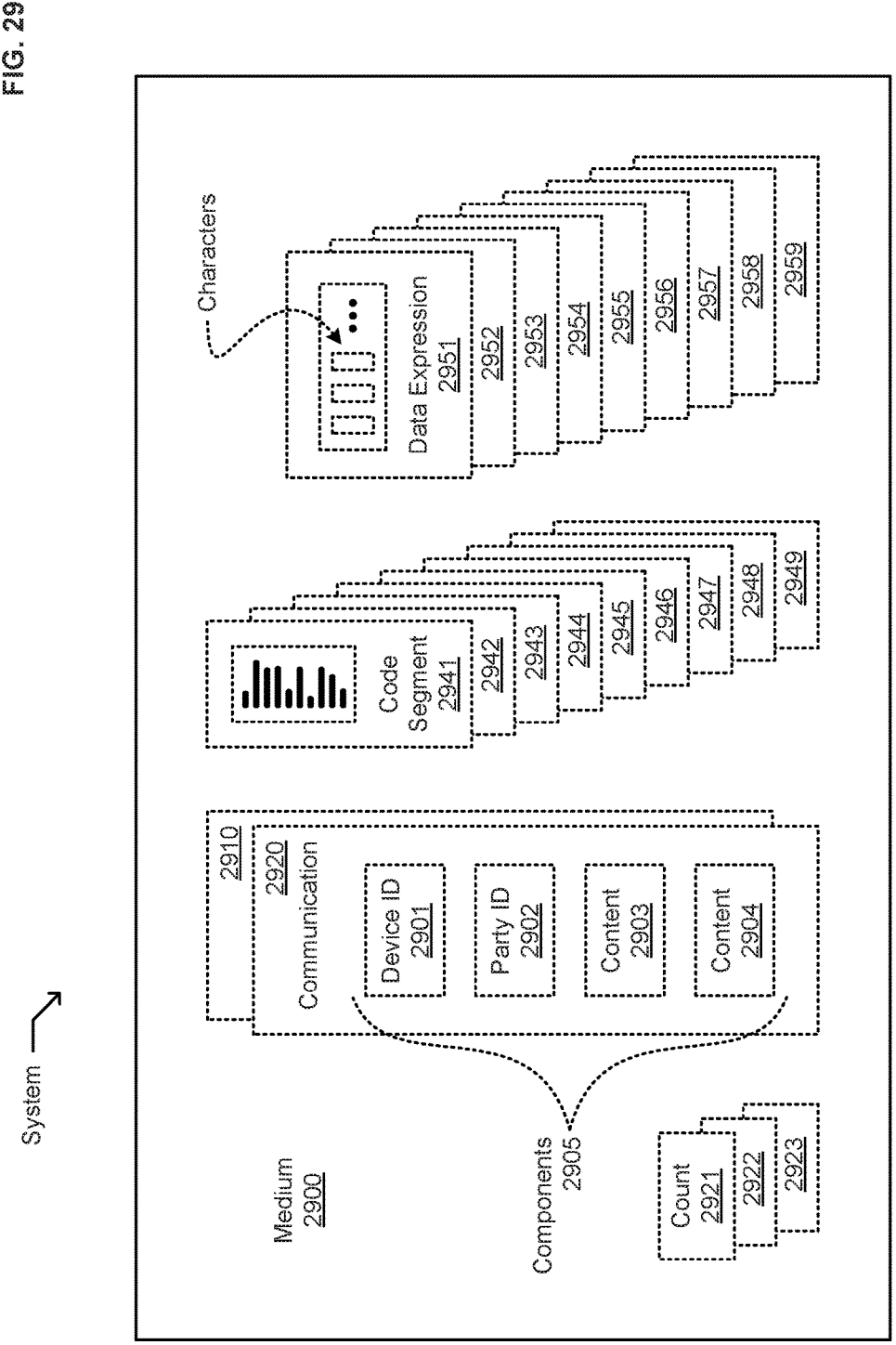
FIGS. 29-30 each depict an exemplary environment in which one or more technologies may be implemented in tangible data-handling media.

Referring now to FIG. 29, a system is shown comprising one or more tangible data-handling media 2900 bearing one or more instances of communications 2910, 2920 each comprising one or more components 2905; of counts 2921, 2922, 2923; of code segments 2941, 2942, 2943, 2944, 2945, 2946, 2947, 2948, 2949; or of data expressions 2951, 2952, 2953, 2954, 2955, 2956, 2957, 2958, 2959 (each comprising one or more binary or decimal digits or other characters or character sequences, as shown) as further described below. In some variants, moreover, such components 2905 may include one or more instances of device identifiers 2901; of party identifiers 2902; of content 2903, 2904; or of other aspects described with reference to U.S. application Ser. No. 14/175,617 (at FIG. 35 thereof, e.g.).

Figure 30:
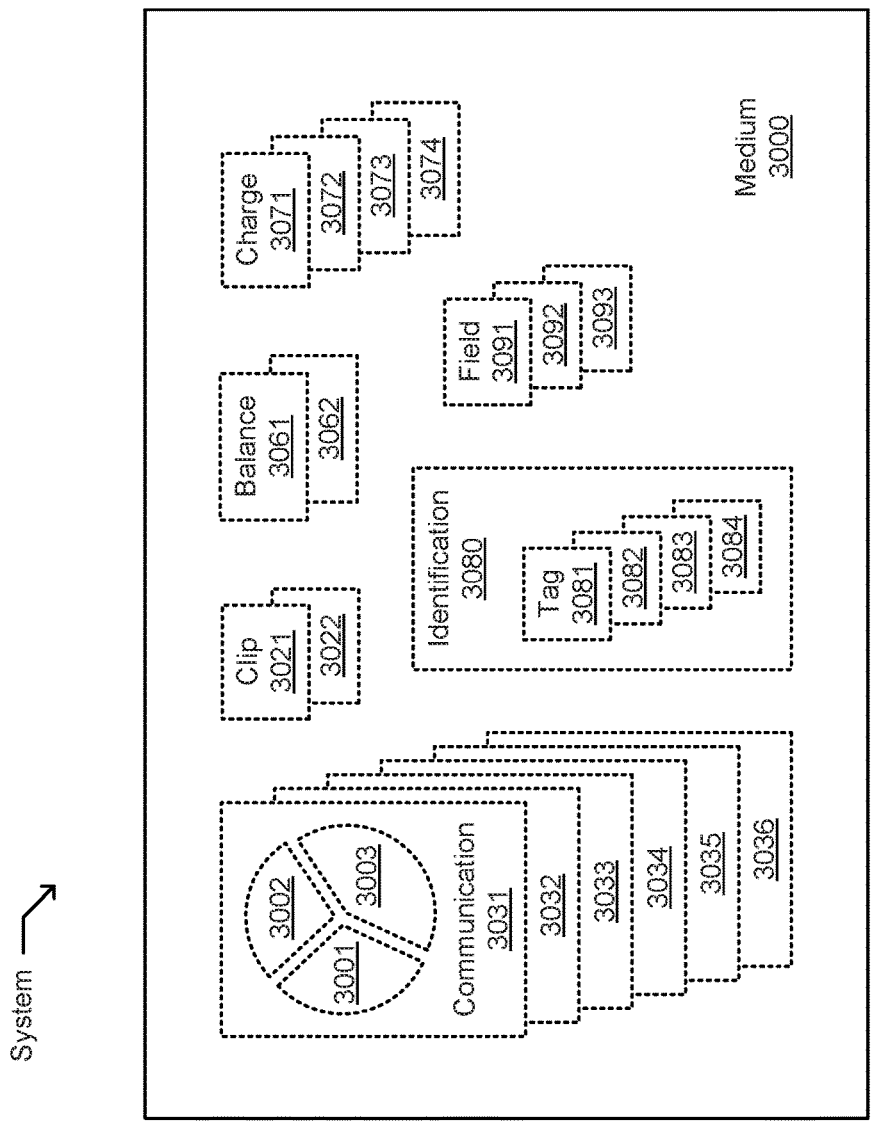

Referring now to FIG. 30, a system is shown comprising one or more tangible data-handling media 3000 bearing one or more instances of communications 3031, 3032, 3033, 3034, 3035, 3036 (e.g. each comprising one or more components 3001, 3002, 3003); of clips 3021, 3022; of current balances 3061, 3062 (in subscriber accounts, e.g.); of tags 3081, 3082, 3083, 3084 or similar identification 3080; of charges 3071, 3072, 3073, 3074 (affecting subscriber accounts, e.g.); or of fields 3091, 3092, 3093 as described below.

Figure 31:
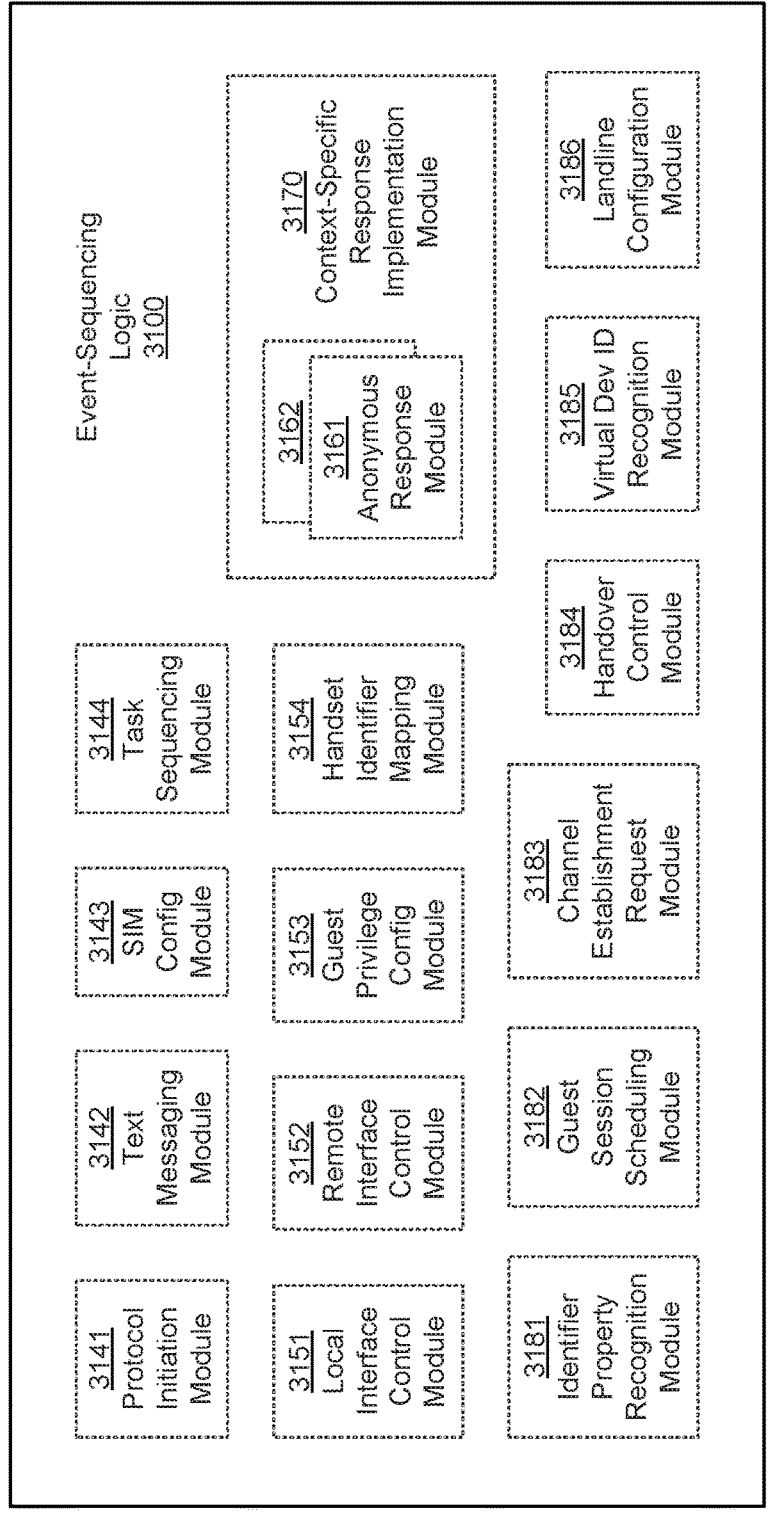
FIG. 31 depicts another exemplary environment in which one or more technologies may be implemented in circuitry or other event-sequencing logic.

Referring now to FIG. 31, a system is shown comprising event-sequencing logic 3100 comprising one or more instances of protocol initiation modules 3141; of text messaging modules 3142; of SIM configuration modules 3143; of task sequencing modules 3144; of local interface control modules 3151; of remote interface control modules 3152; of guest privilege configuration modules 3153; of handset identifier mapping modules 3154; of anonymous response modules 3161, 3162 or other context-specific response implementation modules 3170; of identifier property recognition modules 3181; of guest session scheduling modules 3182; of channel establishment request modules 3183; of handover control modules 3184; of virtual device identifier recognition modules 3185; or of landline configuration modules 3186. In light of teachings herein, numerous existing techniques may be applied for configuring special-purpose circuitry or other structures effective for implementing each of these in a configuration of voltage levels (in respective node sets thereof, e.g.) as described herein without undue experimentation. See, e.g., structural components to which the enclosed Information Disclosure Statement (in form 1449A/PTO or substitute filed herewith as another component of the instant application) refers, several of which publications describe such structures in detail.

Figure 32:
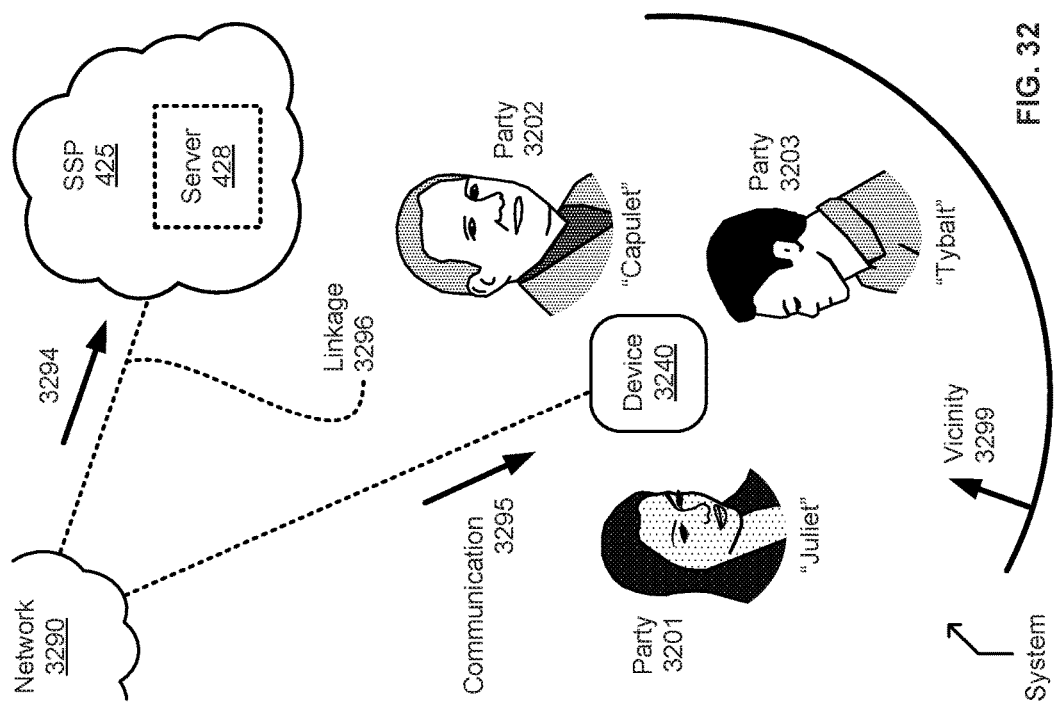
FIG. 32 depicts an exemplary environment in which one or more technologies may be implemented between respective parties.

Referring now to FIG. 32, a system is shown in a context like that of FIG. 3, one that highlights parties 3201, 3202, 3203 that may be in a vicinity 3299 of and selectively addressable via a shared mobile device 3240. As further depicted above in FIG. 3-N and further described below with reference to FIG. 35, support service provider 425 maintains one or more servers 428 operable to receive one or more incoming communications 3294 via linkage 3296 (a landline, e.g.) from network 3290. In some contexts support service provider 425 responsively transmits an outbound communication 3295 (via linkage 3296 or a wireless communication service provider 460 or other entities of network 3290, e.g.) to device 3240.

Figure 33:
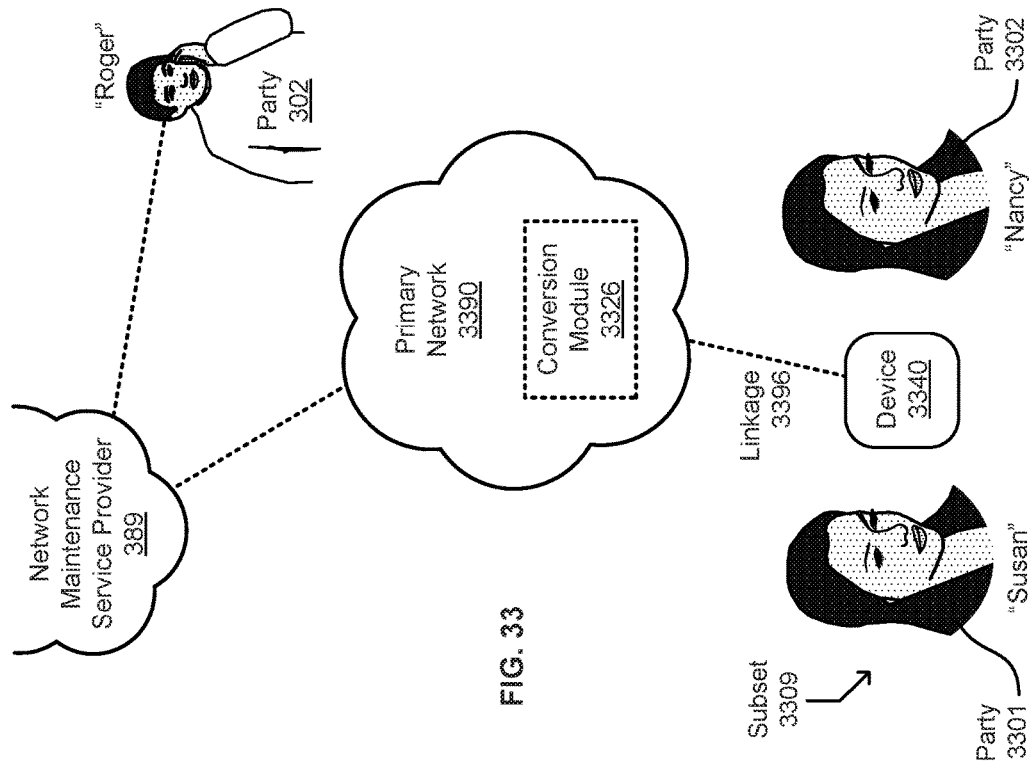
FIG. 33 depicts an exemplary environment in which one or more technologies may be implemented between respective parties.

Referring now to FIG. 33, a system is shown in a context like that of FIG. 3, one that highlights parties 3301, 3302 that may be in a vicinity of and selectively addressable via a shared mobile device 3340. As further depicted above in FIG. 3 and further described below with reference to FIG. 36, a network maintenance service provider 389 and a primary network 3390 (optionally including one or more conversion modules 3326, e.g.) facilitate one or more communications between party 302 (Roger) and (wirelessly via linkage 3396, e.g.) a device 3340 configured to be shared by two or more parties 3301, 3302.

Referring now to FIG. 34, a system is shown in a context like that of FIG. 3, one that highlights parties 3401, 3402, 3403 that may be in a vicinity of and selectively addressable via a shared mobile device 3440. As further depicted above in FIG. 3 and further described below with reference to FIG. 37, a network maintenance service provider 389 and another network 3490 (optionally including one or more towers 3485 or servers 3488 or other such network equipment, e.g.) facilitate one or more communications between party 302 (Roger) and (via linkages 3496, 3496) a device 3440 configured to be shared by two or more parties 3401, 3402, 3403.

Figure 35:
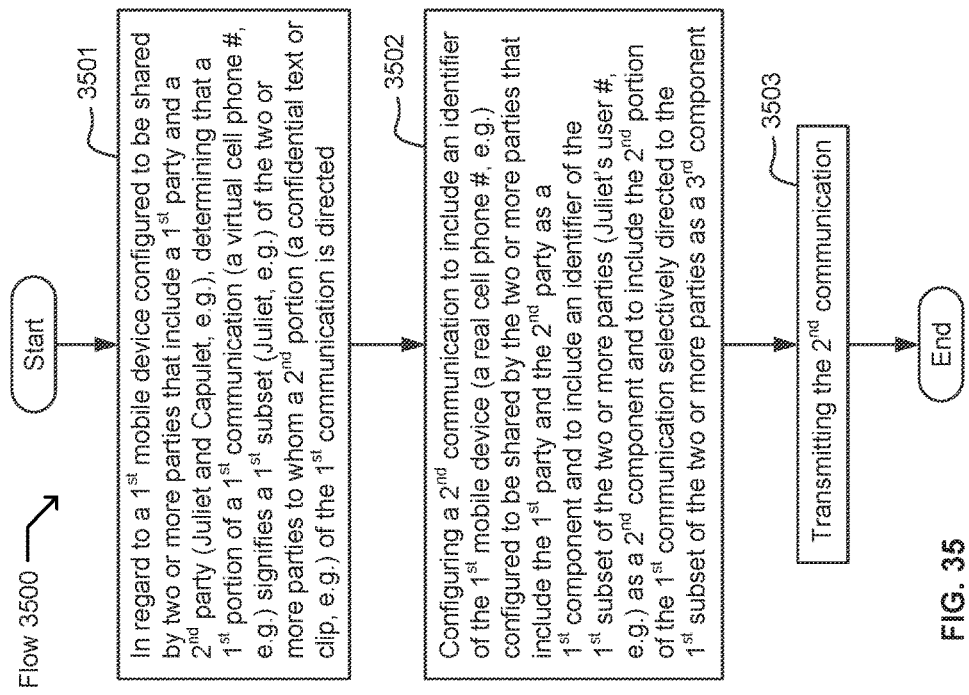
FIG. 35 depicts a high-level logic flow of an operational process (described with reference to FIG. 32, e.g.).

With reference now to FIG. 35, shown is a high-level logic flow 3500 of an operational process. Operation 3501 describes, in regard to a first mobile device configured to be shared by two or more parties (any of mobile devices 322, 440, 3240, 3340, 3440 described herein, e.g.), determining that a first portion of a first communication signifies a first subset of the two or more parties to whom a second portion of the first communication is directed (e.g. retrieval module 2294 determining that one or more entries in a target identification 1621 of "first" communication 2910 are found in a directory 562 of subscribers accessible to server 428). This can occur, for example, in a context in which the "first" portion of communication 2910 is the target identification 1621 that identifies to whom communication 2910 is (selectively) directed and in which event-sequencing logic 2200 includes or is otherwise operably coupled with (one or more instances of) tangible data-handling media 500, 1100, 1300, 1600, 2900. In some contexts, for example, target identification 1621 includes one or more virtual mobile device identifiers (a virtual number assigned to Juliet, e.g.) that one or more parties 3201 who share device 3240 have earlier provided (to Roger in lieu of a real mobile device identifier, e.g.). Alternatively or additionally, operation 3501 may be performed by an instance of retrieval module 2294 that resides in network 3290. In light of teachings herein, numerous existing techniques may be applied for configuring special-purpose circuitry or other structures effective for identifying data selections or otherwise expressing information in a configuration of voltage levels as described herein without undue experimentation. See, e.g., structural components to which the enclosed Information Disclosure Statement (in form 1449A/PTO or substitute filed herewith as another component of the instant application) refers, several of which publications describe pattern recognition or other such digital data handling in detail.

Operation 3502 describes configuring a second communication to include an identifier of the first mobile device as a first component and to include an identifier of the first subset of the two or more parties as a second component and to include the second portion of the first communication directed to the first subset of the two or more parties as a third component, the user data not being directed to a remainder of the two or more parties (e.g. processing module 2134 causing "second" communication 2920 to configure components 2905 as depicted in FIG. 35 to include one or more party identifiers 2902 but excluding an indication of Capulet). This can occur, for example, in a context in which the "first" component comprises a device identifier 2901 that addresses mobile device 3240; in which the "second" component comprises (one or more instances of) a party identifier 2902 (comprising a digital designator by which Juliet identifies herself on mobile device 3240, e.g.); and in which the "third" component" comprises user content 2903 (an audio or video clip received as the "second" portion of communication 2910, e.g.) not suitable for one or more other parties 3202 who share device 3240 to intercept. In some contexts, for example, the "first" subset may include more than one party (Juliet and Tybalt, e.g.) to whom confidential content 2904 (a party invitation, e.g.) is selectively directed. Alternatively or additionally, in some contexts, user content 2904 may be presented in alternative forms (merely showing "message for Juliet or Tybalt" in lieu of the party invitation when presented to third parties (Capulet or anyone else who is not in the "first" subset, e.g.). In light of teachings herein, numerous existing techniques may be applied for configuring special-purpose circuitry or other structures effective for generating and implementing logic decisions in circuitry as described herein without undue experimentation. See, e.g., structural components to which the enclosed Information Disclosure Statement (in form 1449A/PTO or substitute filed herewith as another component of the instant application) refers, several of which publications describe contingent logic implementations in detail.

Operation 3503 describes transmitting the second communication (e.g. implementation module 2075 initiating a transmission of communication 2920 addressed to mobile device 3240 via BTS 459). This can occur, for example, in a context in which the "first" component (an E.164-compatible cell phone number or other network routing tag 672, e.g.) identifies mobile device 3240; in which the "second" component (one or more party identifiers 2902 or other recipient designation signals 1510, e.g.) identifies at least one of Juliet or Tybalt; in which the mobile device 3240 to which the "first" component refers is able to process the "second" component (designating the "first" subset of the parties who share device 3240, e.g.) but is unable to process target identification 1621. In some variants, moreover, implementation module 2075 may be configured to trigger one or more other communications 1633 (when a target identification 1621 insinuates one or more other devices 440 by identifying one or more parties 401, 402 who share such other device(s) also, in connection with a broadcast, e.g.). Alternatively or additionally, communication 2920 may comprise one or more other components (a user text 522, channel establishment request 1353, or other such content 2904, e.g.) received in communication 2910 (as the "second" portion thereof, e.g.). In light of teachings herein, numerous existing techniques may be applied for configuring special-purpose circuitry or other structures effective for implementing various interpersonal and other communications as described herein without undue experimentation. See, e.g., structural components to which the enclosed Information Disclosure Statement (in form 1449A/PTO or substitute filed herewith as another component of the instant application) refers, several of which publications describe modes of human communication in detail.

Figure 36:
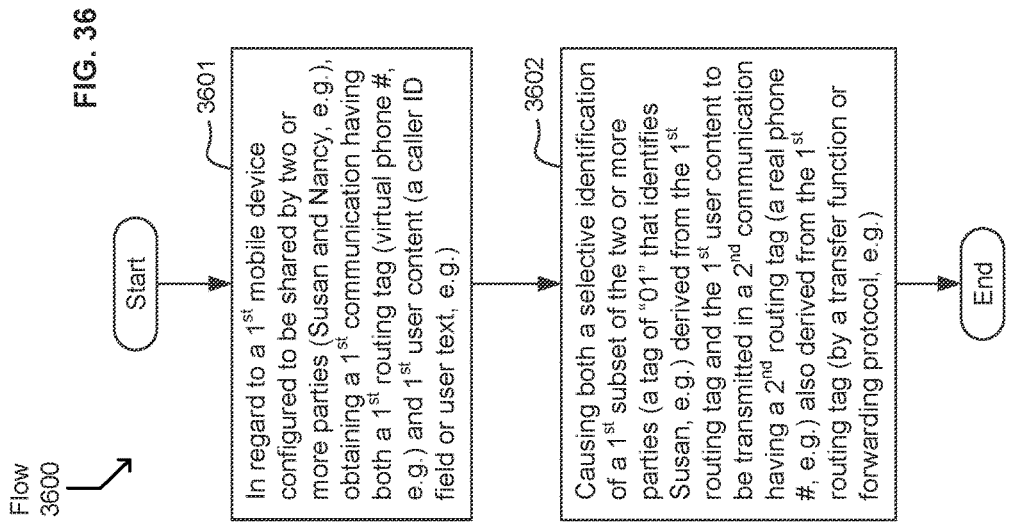
FIG. 36 depicts a high-level logic flow of an operational process (described with reference to FIG. 32, e.g.).

With reference now to FIG. 36, shown is a high-level logic flow 3600 of an operational process. Operation 3601 describes, in regard to a first mobile device configured to be shared by two or more parties (implementing one or more of mobile devices 322, 440, 3240, 3340, 3440 described herein, e.g.), obtaining a first communication having both a first routing tag and first user content (e.g. input module 2591 receiving a communication 3032 having one or more user data components 3001, 3002 as content and one or more virtual mobile numbers 121 indicative of one or more intended recipients). This can occur, for example, in a context in which device 3340 implements one or more mobile devices 440, 3240 configured to be shared as described above; in which one or more instances of event-sequencing logic 100, 200, 500, 700, 800, 900, 1000, 1700, 1800, 1900, 2000, 2200, 2300, 2400, 2500, 2600, 2700, 2800, 3100 residing in primary network 3390 include or otherwise interact with data-handling media 500, 3000; in which event-sequencing logic 2500 receives communication 3032 from or within network maintenance service provider 389; in which component 3002 of communication 3032 identifies party 302 (Roger) with an alphanumeric "caller ID" field; and in which the "first" routing tag is "206-555-2461" (a virtual mobile number 121 that Susan uses to identify herself, e.g.). Alternatively or additionally, user data component 3001 may include an audio clip 3021 or SMS text 522 entered via device 322 (by a sending party 302 initiating signal 397, e.g.). In light of teachings herein, numerous existing techniques may be applied for configuring special-purpose circuitry or other structures effective for using routing tags for various telecommunications as described herein without undue experimentation. See, e.g., structural components to which the enclosed Information Disclosure Statement (in form 1449A/PTO or substitute filed herewith as another component of the instant application) refers, several of which publications describe wireless network configurations in detail.

Operation 3602 describes causing both a selective identification of a first subset of the two or more parties derived from the first routing tag and the first user content to be transmitted in a second communication having a second routing tag also derived from the first routing tag (e.g. implementation module 2074 delegating or directly implementing one or more derivation protocols 2771, 2772, 2773 effective for causing the identification 3080 of the subset 3309 to be retrieved or computed as a function of the "first" routing tag 3081; and delegating or directly implementing one or more derivation protocols 2774, 2775, 2776 effective for causing the "second" routing tag 3082 to be derived as a function (a truncated division, offset function, or other integer transfer function, e.g.) of the "first" routing tag 3081; and delegating or directly implementing the assembly and transmission of the "second" communication 3035). This can occur, for example, in a context in which the selective identification of the "first" subset (of the parties who share device 3340, e.g.) comprises tag 3083 (a sequence of alphanumeric characters, such as "01," that identifies Susan, e.g.); in which derivation protocol 2774 comprises a remote invocation of a virtual-to-real conversion module 426 by which a server 428 remote from event-sequencing logic 2000 uses the "first" routing tag 3081 to look up or compute the "second" routing tag 3082 (in response to implementation module 2074 transmitting tag 3081 to support service provider 425, e.g.); in which server 428 (as depicted in FIG. 3-N, e.g.) and base transceiver station 459 (as depicted in FIG. 3-R, e.g.) both reside in primary network 3390; and in which an indiscriminate presentation of such content (to Carol or someone else not in subset 3309, e.g.) could otherwise be avoided only by Roger's device 322 directly assembling the "second" communication 3035 (by an app 852 running in Roger's device 322 that somehow acquired both the second routing tag 3082 and a recipient designation signal 1510 that identifies the first subset 3309, e.g.). In some variants described below with reference to FIG. 37, for example, server 428 may assemble communication 3035 in response to (an instance of) an intermediate communication 3034 containing tag 3081 (relayed by event-sequencing logic 2000, e.g.). Alternatively or additionally, implementation module 2074 may trigger a derivation protocol 2771 by which an instance of conversion module 3326 generates a recipient designation signal 1510 (as described above, e.g.) as the identification 3080 of the subset 3309 conditionally, as a response to an indication (from one or more intrinsic properties of the "first" routing tag 3081 recognized by an instance of VDIDRM 365 residing in event-sequencing logic 2000, e.g.) that tag 3081 identifies a virtual device. In light of teachings herein, numerous existing techniques may be applied for configuring special-purpose circuitry or other structures effective for handling party identifiers in association with other information as described herein without undue experimentation. See, e.g., structural components to which the enclosed Information Disclosure Statement (in form 1449A/PTO or substitute filed herewith as another component of the instant application) refers, several of which publications describe biometric or other human recognition in detail.

With reference now to FIG. 37, shown is a high-level logic flow 3700 of an operational process. Operation 3701 describes, in regard to a first mobile device configured to be shared by two or more parties (implementing one or more of mobile devices 322, 440, 3240, 3340, 3440 described herein, e.g.), obtaining a first component of a first communication and an identification of a first subset of the two or more parties with whom the first component is associated and a network routing tag identifying the first mobile device all at network equipment operably coupled with the first mobile device (e.g. input module 2592 obtaining component 3001 of "first" communication 3034 and one or more tags 3084 identifying the "first" subset 3409 of device-sharing parties for whom component 3001 is intended and a network routing tag 3083 identifying device 3440 all within a network 3490 in communication with device 3440). This can occur, for example, in a context in which device 3440 implements one or more mobile devices 440, 3240, 3340 configured to be shared as described above; in which linkage 3496 comprises a signal path through a single (contiguous) free space medium 391 (between antennas of a transmitter and receiver, e.g.); in which one or more instances of event-sequencing logic 100, 1000, 2000, 2500 (optionally in combination with those described with reference to other flows herein, e.g.) reside in a server 3488; in which server 3488 receives communication 3034 from network maintenance service provider 389; in which component 3002 of communication 3034 identifies party 302 (Roger) with an alphanumeric field; and in which the network routing tag is an independent identifier 151 (e.g. a "real" mobile number of "206-555-2460" that one or more networks use to identify the "first" mobile device 3440, e.g.). In some contexts, for example, device 3440 may be situated within a transmission range of a tower 3485 directly coupled to server 3488 (via a contiguous fiberoptic conduit, e.g.). Alternatively or additionally, user data component 3001 may include an audio clip 3021 or SMS text 522 entered via device 321 (by a sending party 302 initiating signal 397, e.g.).

Operation 3702 describes assembling a second communication that includes the first component of the first communication and identifies the first subset of the two or more parties and identifies the first mobile device at the network equipment as an automatic response to an indication of an active account being associated with the first subset (e.g. implementation module 2073 configuring communication 3035 to include a component 3001 extracted from communication 3034 and to identify the "first" subset 3409 of parties and to identify device 3440 all in response to verification module 2571 determining that one or more parties 3401, 3402 in subset 3409 have an active account 1003). This can occur, for example, in a context in which Susan or Nancy is a subscriber of a cellular service provider who maintains the account 1003; and in which the "first" component 3001 is only directed to parties who are in the subset 3409 (in which Roger does not intend that component 3001 be presented to Carol, e.g.). In some contexts, for example, the owner of the network equipment (tower 3485 or server 3488, e.g.) may not recognize a contractual relationship pertaining to mobile device 3440 or to communication 3034. Alternatively or additionally, operation 3702 may include invoking a derivation protocol 2777 that includes causing one or more charges 3072 associated with communications through network 3490 (resulting from Roger participating in cell-only zone 315 without having a cellular service subscription, e.g.) to be associated with (posted to, e.g.) account 1003 (with a balance or other resource limitation expressed in minutes or dollars, e.g.). Alternatively or additionally, in some variants, implementation module 2073 may be configured to perform the assembly of the "second" communication 3035 responsive to a verification module 2572 that provides an indication (conditioned upon having recognized a certificate in communication 3034, e.g.) that an active account 1003 is associated with the "first" communication 3034.

Operation 3703 describes transmitting the second communication from the network equipment (e.g. implementation module 2072 at least transmitting the "second" communication 3035 via a wireless linkage 3496 to device 3440). This can occur, for example, in a context in which operations 3701, 3702 as described above have occurred or are occurring and in which an owner of the network equipment would not otherwise have a sufficient incentive to facilitate some wireless network services for device 3440 (by providing the "second" communication, e.g.). Alternatively or additionally, one or more other instances of implementation module 2072 may be configured to transmit another "second" communication 3033 (pursuant to another instance of operation 3703, e.g.) as described below.

Figure 38:
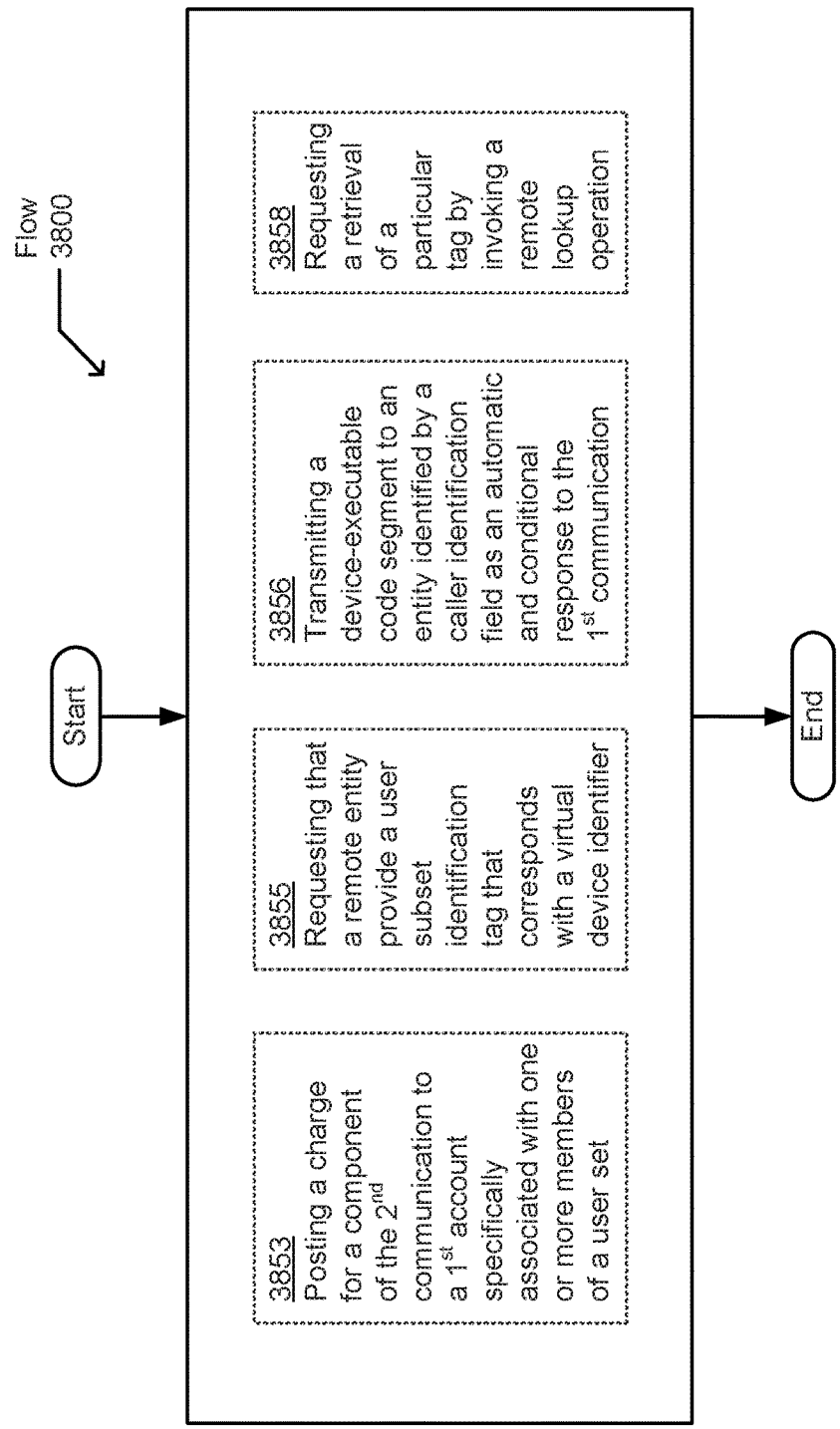
FIG. 38 depicts a high-level logic flow of an operational process with several optional operations.

With reference now to flow 3800 of FIG. 38 and to other flows described above, in some variants, one or more of operations 3853, 3855, 3856, or 3858 may be performed in preparation for or in response to or otherwise in conjunction with any of operations in flows depicted in FIGS. 35-37 above. Operation 3853 describes posting a charge for a component of the second communication to a first account specifically associated with one or more members of the first subset (e.g. processing module 2133 triggering an application of one or more charges 3071 associated with delivering some or all of a "second" communication described herein against a current balance 3061 of one or more person-specific accounts 1001-1004, 1301, 1302). This can occur, for example, in a context in which the balance 3061 is expressed in minutes or dollars. In light of teachings herein, numerous existing techniques may be applied for configuring special-purpose circuitry or other structures effective for handling charge authorizations or other access control features as described herein without undue experimentation. See, e.g., structural components to which the enclosed Information Disclosure Statement (in form 1449A/PTO or substitute filed herewith as another component of the instant application) refers, several of which publications describe such features in detail.

Operation 3855 describes requesting that a remote entity provide a user subset identification tag that corresponds with a virtual device identifier (e.g. implementation module 2079 requesting that a retrieval module 2293 not within a common facility of event-sequencing logic 2000 provide one or more destination party identification tags 1275 or other tags 3044 described herein). This can occur, for example, in a context in which implementation module 2079 performs operation 3855 by transmitting the virtual device identifier in a trigger signal to event-sequencing logic 2200 and in which retrieval module 2293 looks up the user subset identification tag (identifying Tybalt or Carol, e.g.) and transmits the result (the tag or an error message, e.g.) to implementation module 2079 as an automatic response.

Operation 3856 describes transmitting a device-executable code segment to an entity identified by a caller identification field as an automatic and conditional response to the first communication (e.g. configuration module 2543 transmitting one or more device-executable code segments 2941-2949 to an entity identified by an alphanumeric caller identification field 3091 as an automatic and conditional response to a "first" communication described herein). This can occur, for example, in a context in which a primary unit 2110 including event-sequencing logic 900, 2000, 2500 receives the "first" communication as a wireless signal (from adjacent air 2089 via an antenna 956, 2090 thereof, e.g.) and in which "the entity" is a mobile device 322, 440 that apparently triggered the "first" communication 2910, 3032, 3034, 3036, 3294. Alternatively or additionally, in some variants, "the entity" may comprise one or more parties who use such devices.

Operation 3858 describes requesting a retrieval of a particular tag by invoking a remote lookup operation (e.g. implementation module 2078 requesting that a remote instance of event-sequencing logic 2200 look up one or more source party identification tags 1274, destination party identification tags 1275, routing tags 1460, or other tags 3041-3044 described herein). This can occur, for example, in a context in which implementation module 2078 performs operation 3858 by transmitting one or more operands (search terms, e.g.) to an instance of retrieval module 2295 resident in server 428. Alternatively or additionally, the particular tag may (optionally) be a data component (of one or more communications described herein, e.g.) that identifies a particular mobile device 440 or other entity (user group, e.g.) described herein.

Figure 39:
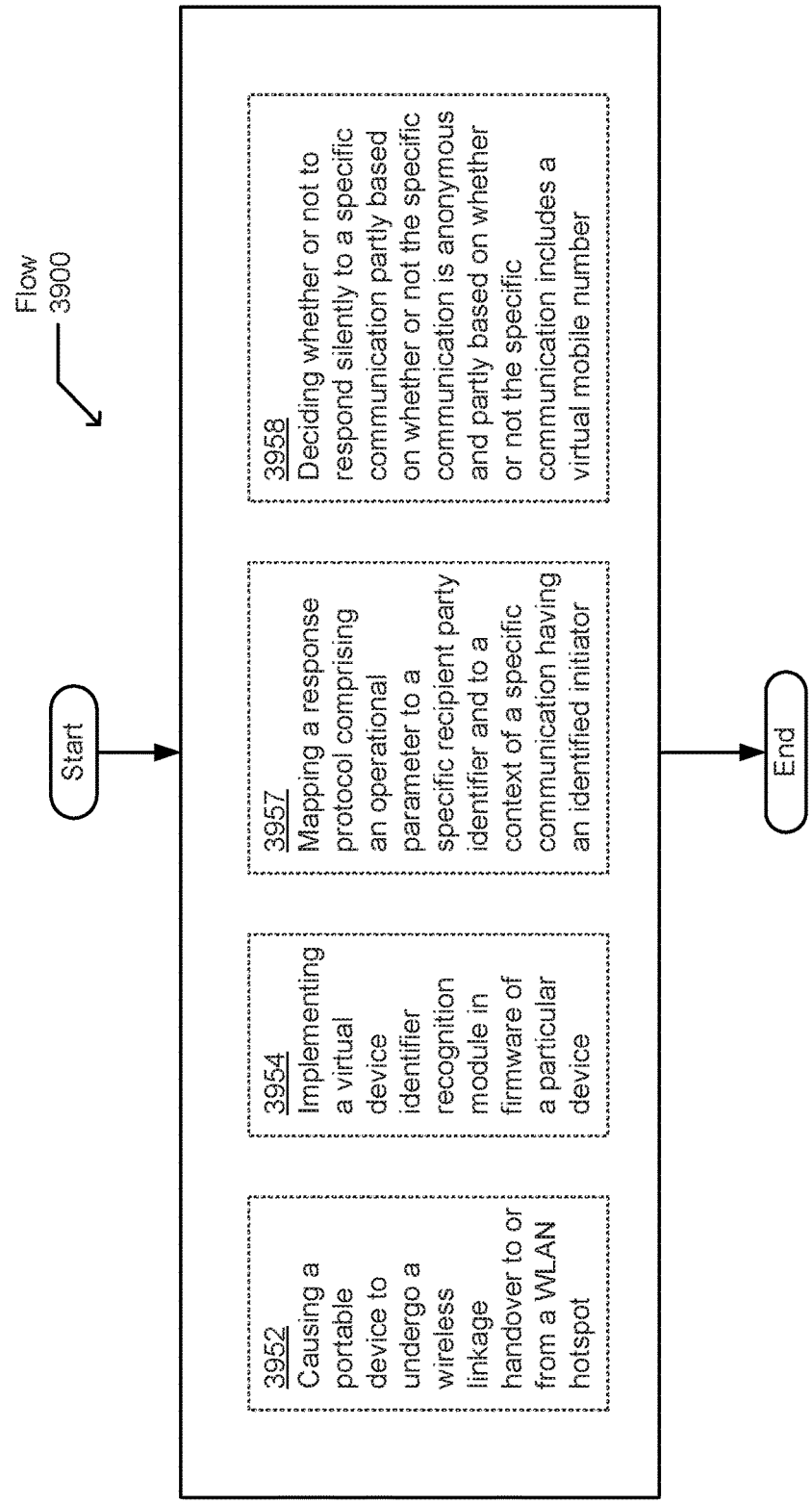
FIG. 39 likewise depicts variants of earlier-presented flows.

With reference now to flow 3900 of FIG. 39 and to other flows described above, in some variants, one or more of operations 3952, 3954, 3957, or 3958 may be performed in preparation for or in response to or otherwise in conjunction with any of operations in flows depicted in FIGS. 35-37 above. Operation 3952 describes causing a portable device to undergo a wireless linkage handover to or from a WLAN hotspot (e.g. invocation module 2273 causing one or more mobile devices 440 to undergo a wireless linkage handover to or from WLAN zone 416 across zone boundary 410, establishing or terminating a linkage with WLAN access point 456). This can occur, for example, in response to invocation module 2273 receiving a determination 1152 from evaluation module 2282 that a suitability indicator relating to the wireless linkage (a signal strength or bit error rate of a signal path through access point 456, e.g.) is marginal (has become adequate or inadequate, e.g.). Alternatively or additionally, invocation module 2273 may be configured as or operably coupled with a handover control module 3184 configured to perform (another instance of) operation 3952. In light of teachings herein, numerous existing techniques may be applied for configuring special-purpose circuitry or other structures effective for handoff-related decisions and protocols as described herein without undue experimentation. See, e.g., structural components to which the enclosed Information Disclosure Statement (in form 1449A/PTO or substitute filed herewith as another component of the instant application) refers, several of which publications describe wireless handovers in detail.

Operation 3954 describes implementing a virtual device identifier recognition module in firmware of a particular device (e.g. configuration module 2142 implementing one or more dependent identifier recognition modules 131-133 as described herein in firmware 439). This can occur, for example, in a context in which device 440 initiates or otherwise facilitates a communication 531-535 as described herein (with a shared mobile device, e.g.). Alternatively or additionally, configuration module 2142 may be configured as or operably coupled with a virtual device identifier recognition module 3185 configured to perform (another instance of) operation 3954. In light of teachings herein, numerous existing techniques may be applied for configuring special-purpose circuitry or other structures effective for applying arithmetic and logical criteria as described herein without undue experimentation. See, e.g., structural components to which the enclosed Information Disclosure Statement (in form 1449A/PTO or substitute filed herewith as another component of the instant application) refers, several of which publications describe such digital processing and contingent action in detail.

Operation 3957 describes mapping a response protocol comprising an operational parameter to a specific recipient party identifier and to a context of a specific communication having an identified initiator (e.g. update module 2101 establishing a record 1281 within table 1270 that maps a particular response protocol comprising an invocation parameter 1272 to a specific destination party identification (DPI) tag 1275 and to a context of a specific communication 531-535 having a source party identification (SPI) tag 1274). In the context of datastructure 680, for example, SPI tag 1274 may comprise a caller ID field. Alternatively or additionally, operation 3957 may be performed by a (non-anonymous) context-specific response implementation module 3170 (responsive to update module 2101, e.g.). In light of teachings herein, numerous existing techniques may be applied for configuring special-purpose circuitry or other structures effective for implementing caller identification (ID) and spoofing as described herein without undue experimentation. See, e.g., structural components to which the enclosed Information Disclosure Statement (in form 1449A/PTO or substitute filed herewith as another component of the instant application) refers, several of which publications describe source party identification and authentication in detail.

Operation 3958 describes deciding whether or not to respond silently to a specific communication partly based on whether or not the specific communication is anonymous and partly based on whether or not the specific communication includes a virtual mobile number (e.g. configuration module 2141 signaling an affirmative decision 1242 to present a chime 1251 or other distinctive sound 1255 signifying an anonymous communication 534 via speaker 971 as an automatic and conditional response to an indication that the communication is directed to an unavailable recipient). This can occur, for example, in a context in which a negative decision 1241 would result in no such presentation and in which the targeted recipient is busy or unlisted or otherwise offline and in which output control module 2253 is configured to present informational data 1340 via one or more presentation modules 970 of mobile device 440 in response to one or more such decisions 1241, 1242, 1243. Alternatively or additionally, configuration module 2141 may be configured as or operably coupled with an anonymous response module 3161 configured to perform (another instance of) operation 3958. In light of teachings herein, numerous existing techniques may be applied for configuring special-purpose circuitry or other structures effective for presenting human-perceptible information at a mobile device as described herein without undue experimentation. See, e.g., structural components to which the enclosed Information Disclosure Statement (in form 1449A/PTO or substitute filed herewith as another component of the instant application) refers, several of which publications describe auditory and visual information in detail.

Figure 40:
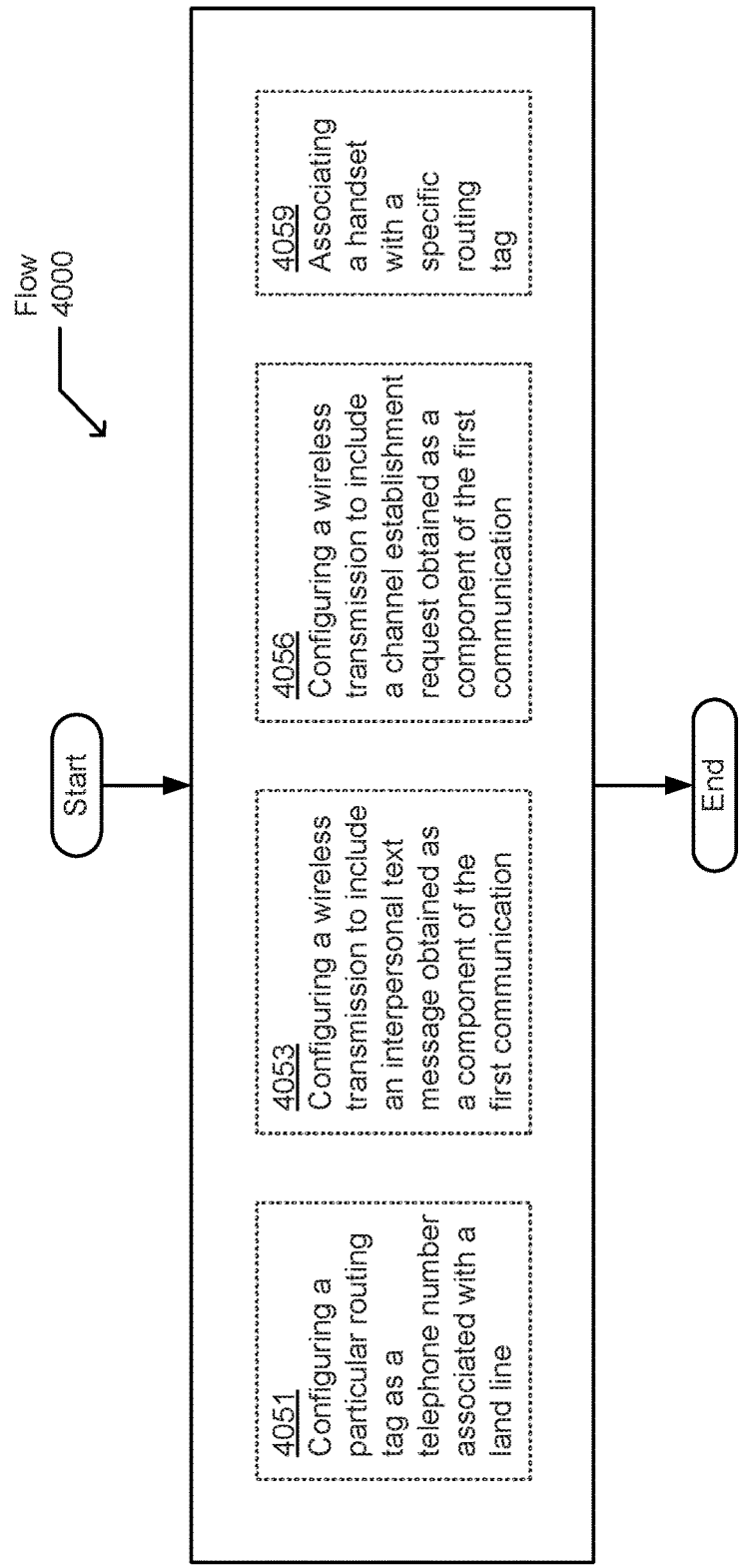
FIG. 40 likewise depicts variants of earlier-presented flows.

With reference now to flow 4000 of FIG. 40 and to other flows described above, in some variants, one or more of operations 4051, 4053, 4056, or 4059 may be performed in preparation for or in response to or otherwise in conjunction with any of operations in flows depicted above. Operation 4051 describes configuring a particular routing tag as a telephone number associated with a land line (e.g. control module 2254 associating an E.164-compatible phone number 1461 of a landline with a network routing tag 672, 1530 described herein). This can occur, for example, in a context in which the network routing tag is also an E.164-compatible phone number; in which the landline is a linkage 3296 to a server 428 (as depicted in FIG. 32, e.g.); and in which record 1482 associates that instance of phone number 1461 (in record 1482, e.g.) with a particular party. Alternatively or additionally, control module 2254 may be configured as or operably coupled with a landline configuration module 3186 constructed and arranged to perform (another instance of) operation 4051. In light of teachings herein, numerous existing techniques may be applied for configuring special-purpose circuitry or other structures effective for implementing a public switched or other telephone network as described herein without undue experimentation. See, e.g., structural components to which the enclosed Information Disclosure Statement (in form 1449A/PTO or substitute filed herewith as another component of the instant application) refers, several of which publications describe telephonic routing in detail.

Operation 4053 describes configuring a wireless transmission to include an interpersonal text message obtained as a component of the first communication (e.g. implementation module 2076 initiating a short message service (SMS) or multimedia message service (MMS) text 522 as wireless communication 531-535). Alternatively or additionally, implementation module 2076 may be configured as or operably coupled with a text messaging module 3142 configured to perform (another instance of) operation 4053. In light of teachings herein, numerous existing techniques may be applied for configuring special-purpose circuitry or other structures effective for interpersonal text message services as described herein without undue experimentation. See, e.g., structural components to which the enclosed Information Disclosure Statement (in form 1449A/PTO or substitute filed herewith as another component of the instant application) refers, several of which publications describe SMS and MMS text messaging in detail.

Operation 4056 describes configuring a wireless transmission to include a channel establishment request obtained as a component of the first communication (e.g. implementation module 2077 initiating a call 521, dialogue, or other such semi-permanent interactive wireless communication 531-535 with a channel establishment request 1353). Alternatively or additionally, implementation module 2077 may be configured as or operably coupled with a channel establishment request module 3183 configured to initiate (another instance of) operation 4056. In light of teachings herein, numerous existing techniques may be applied for configuring special-purpose circuitry or other structures effective for call or session establishment as described herein without undue experimentation. See, e.g., structural components to which the enclosed Information Disclosure Statement (in form 1449A/PTO or substitute filed herewith as another component of the instant application) refers, several of which publications describe channel establishment in detail.

Operation 4059 describes associating a handset with a specific routing tag (e.g. retrieval module 2296 obtaining a record 1481 that associates one or more phone numbers 1461 or internet protocol addresses 1462 with a permanent identifier 1470 of the handset). This can occur, for example, in a context in which the permanent identifier 1470 is an international mobile station equipment identity (IMEI) number 1471 or other serial number 1472 and in which the directory 1640 is remote (from event-sequencing logic 2200, e.g.). Alternatively or additionally, operation 4059 may be performed (by update module 2102, e.g.) by providing a new routing tag 1460 to the handset. Alternatively or additionally, retrieval module 2296 may be configured as or operably coupled with a handset identifier mapping module 3154 configured to perform (another instance of) operation 4059. In light of teachings herein, numerous existing techniques may be applied for configuring special-purpose circuitry or other structures effective for routing communications as described herein without undue experimentation. See, e.g., structural components to which the enclosed Information Disclosure Statement (in form 1449A/PTO or substitute filed herewith as another component of the instant application) refers, several of which publications describe cellular network routing in detail.

Figure 41:
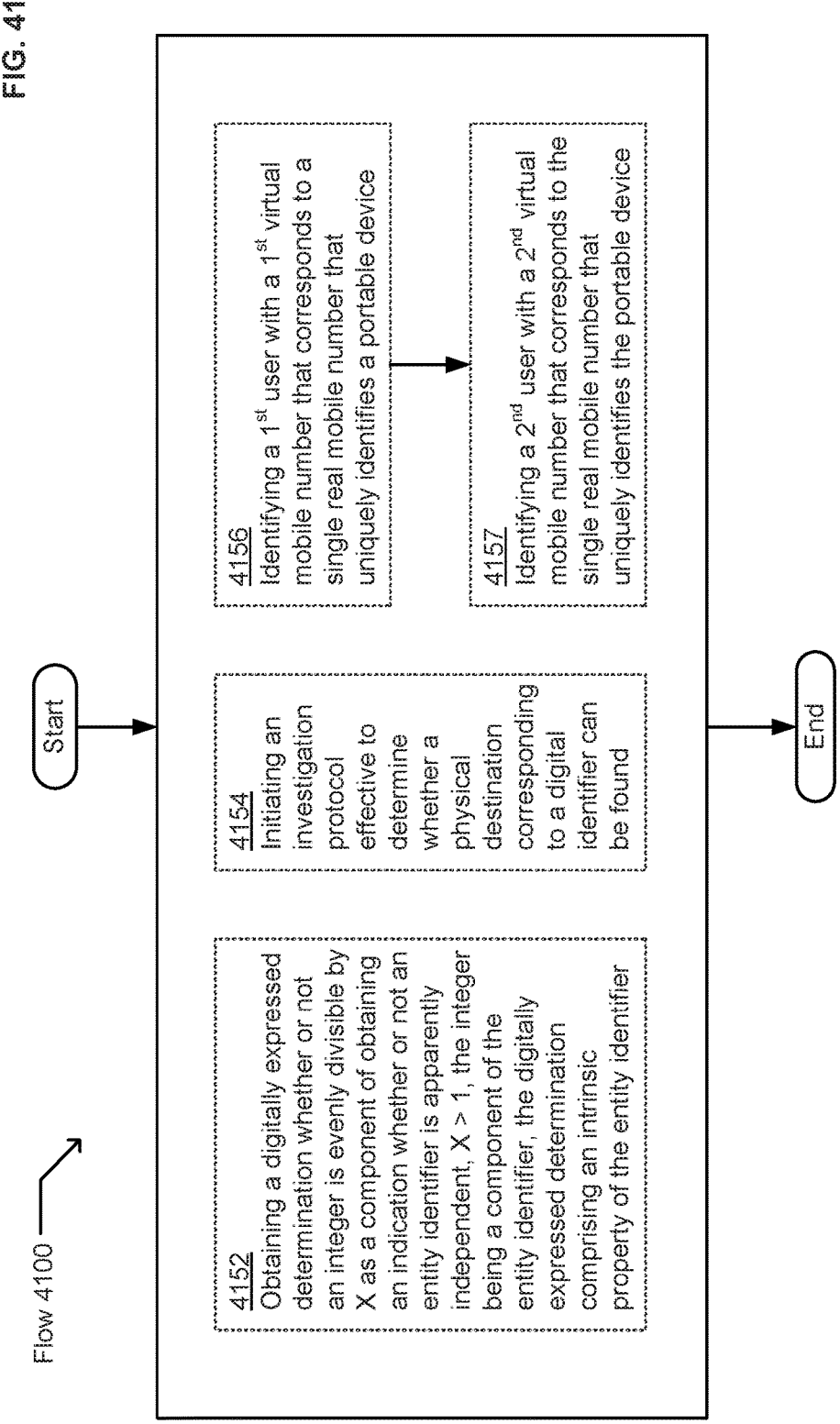
FIG. 41 likewise depicts variants of earlier-presented flows.

With reference now to flow 4100 of FIG. 41 and to other flows described above, in some variants, one or more of operations 4152, 4154, 4156, or 4157 may be performed in preparation for or in response to or otherwise in conjunction with any of operations in flows depicted above. Operation 4152 describes obtaining a digitally expressed determination whether or not an integer is evenly divisible by X as a component of obtaining an indication whether or not an entity identifier is apparently independent, X being greater than 1, the integer being a component of the entity identifier, the digitally expressed determination comprising an intrinsic property of the entity identifier (e.g. extraction module 2081 generating an affirmative determination 1153 if a 3-digit extraction 1122 from entity identifier 1121 is divisible by X and otherwise generating a negative determination 1154). This can occur, for example, in a context in which 3<X<30; in which a large block of 34-digit identifiers is contiguous; in one or more such determinations 1153, 1154 is required for generating a determination 1155 that a given entity identifier 1121 is apparently not independent; in which such determination 1155 triggers a conditional lookup in a separate registry 1360 (to obtain a corresponding independent entity identifier, e.g.); in which such a conditional lookup implementation prevents a party 302 from receiving an erroneous determination 1156 that entity identifier 1121 is not in use without requiring every entity identifier 1121 to be listed in a location register; and in which most entity identifiers within the large block are not evenly divisible by X. This can occur, for example, in a context in which server 428 has assigned entity identifier 1121 to a user account 1302 (assigned to party 403, e.g.) that resides in a shared mobile device 440 and in which event-sequencing logic 2000 resides in a mobile device 322 at which an interpersonal communication is initiated. Alternatively or additionally, in some variants, an instance of extraction module 2081 implemented at wireless communication service provider 360 may be configured to generate such determinations 1155, 1156 by determining whether a parsed extraction 1123 (comprising the 9th, 6th, and 3rd digits as shown, e.g.) is an integer multiple of another instance of X>1. Alternatively or additionally, extraction module 2081 may be configured as or operably coupled with an identifier property recognition module 3181 configured to perform (another instance of) operation 4152.

Operation 4154 describes initiating an investigation protocol effective to determine whether a physical destination corresponding to a digital identifier can be found (e.g. invocation module 2271 triggering a lookup module 2183 effective to determine whether a 10-digit identifier 1121 or other mobile number 120 is listed in a home location register 363 or visitor location register 364). This can occur, for example, in a context in which one or more instances of primary unit 2110 include event-sequencing logic 2200 operably coupled with tangible data-handling medium 1100. Alternatively or additionally, invocation module 2271 may be configured to perform operation 4154 by broadcasting a request 1351 (to one or more wireless communication service providers 390, 460 or support service providers 425, e.g.) via one or more satellites 399 or other components of network 390. In light of teachings herein, numerous existing techniques may be applied for configuring special-purpose circuitry or other structures effective for locating a cellphone or similar communication device in a network as described herein without undue experimentation. See, e.g., structural components to which the enclosed Information Disclosure Statement (in form 1449A/PTO or substitute filed herewith as another component of the instant application) refers, several of which publications describe record retrieval in detail.

Operation 4156 describes identifying a first user with a first virtual mobile number that corresponds to a single real mobile number that uniquely identifies a portable device (e.g. retrieval module 2291 obtaining one or more components of a record 1286 that associates a destination party indication tag 1275 thereof with a virtual mobile number 123 that corresponds to real mobile number 120). This can occur, for example, in a context in which event-sequencing logic 2200 includes or is otherwise operably coupled with (an instance of) tangible data-handling medium 1200; in which retrieval module 2291 selects record 1286 using virtual mobile number 123 as a search term (by matching one or more components of virtual mobile number 123 to record identifier 1271, e.g.); and in which record 1286 includes a real mobile number 120 that uniquely identifies mobile device 440.

Operation 4157 describes identifying a second user with a second virtual mobile number that corresponds to the single real mobile number that uniquely identifies the portable device (e.g. retrieval module 2292 obtaining one or more components of a record 1287 that associates a destination party indication tag 1275 thereof with a different virtual mobile number 124 that also corresponds to real mobile number 120). This can occur, for example, in a context in which retrieval module 2291 selects record 1287 the same way; in which record 1287 includes the same real mobile number 120 obtained by retrieval module 2291; and in which such first and second users (parties 401, 402) would otherwise be unable to configure device 440 to be simultaneously ready to receive communications specifically directed to either user via her respective virtual number. Alternatively or additionally, device 440 may (optionally) be configured to implement recipient-party-specific response protocols 614, 624, 634 (as well as recipient-party-nonspecific protocols 604) specific to a context 654 described herein. Alternatively or additionally, retrieval modules 2291, 2292 may be configured as or operably coupled with protocol initiation module 3141 configured to perform operations 4156, 4157 in sequence.

With reference now to flow 4200 of FIG. 42 and to other flows described above, in some variants, one or more of operations 4251, 4252, 4254, 4255, or 4259 may be performed in preparation for or in response to or otherwise in conjunction with any of operations in flows depicted above. Operation 4251 describes mapping a response protocol comprising an operational parameter to a specific recipient party identifier and to a specific anonymous communication context (e.g. implementation module 2071 accessing a particular record 1282 that contains the operational parameter 1441, a destination party identification (DPI) tag 1275, and a direct or indirect signal that no specific identification of a sender or initiator of the communication is available). This can occur, for example, in a context in which operational parameter 1441 is an invocation parameter 1272 that identifies one or more contingent response protocols 603, 613, 623 (each implemented as code 1110 executable by processor 580 or as special-purpose circuitry, e.g.); in which a DPI tag 1275 identifies a specific party 403 (Carol) to whom a communication 531 is addressed; in which the "no specific identification" signal comprises record 1282 having an omitted or blank source party identifier tag 1274; and in which implementation module 2071 invokes the one or more contingent response protocols 603, 613, 623 when an incoming anonymous communication 531 matches the particular record 1282. In some contexts, for example, DPI tag 1275 may comprise a text string of "Carol" or audio recording of someone saying "Carol" or Carol's ringtone or some other data that device 440 can present in a suitable context. Alternatively or additionally, implementation module 2071 may be configured as or operably coupled with an anonymous response module 3162 configured to perform (another instance of) operation 4251. In light of teachings herein, numerous existing techniques may be applied for configuring special-purpose circuitry or other structures effective for contingent invocation as described herein without undue experimentation. See, e.g., structural components to which the enclosed Information Disclosure Statement (in form 1449A/PTO or substitute filed herewith as another component of the instant application) refers, several of which publications describe sender or initiator identity indications in detail.

Operation 4252 describes transmitting a trigger signal that causes at least one of a display or a speaker to present data at a specific mobile device (e.g. control module 2251 transmitting one or more components of audio component selection 1571 remotely or locally to speaker 971 or a driver thereof). This can occur, for example, in a context in which (one or more instances of) presentation module 970 resides in the mobile device 440, 3240, 3340, 3440. Alternatively or additionally, in some variants, control module 2251 may be configured to perform operation 4252 by transmitting one or more components of display component selection 1572 to a driver of display 972. Alternatively or additionally, control module 2251 may be configured as or operably coupled with a remote interface control module 3152 configured to perform operation 4252 (in an instance in which the specific mobile device is remote from event-sequencing logic 3100, e.g.). In light of teachings herein, numerous existing techniques may be applied for configuring special-purpose circuitry or other structures effective for controlling mobile device outputs as described herein without undue experimentation. See, e.g., structural components to which the enclosed Information Disclosure Statement (in form 1449A/PTO or substitute filed herewith as another component of the instant application) refers, several of which publications describe presenting user-detectable output data in detail.

Operation 4254 describes configuring a component of a user interface with a specific voltage configuration that manifests wireless signal content (e.g. processing module 2132 putting a group of several electrical nodes 2040, 2041, 2042, 2043 each at a respective H/L voltage levels directly indicative of a parameter 1441 obtained in or for a wireless signal 531-535). This can occur, for example, in a context in which nodes 2040-2043 reside in a user interface 477 (presentation module 970, e.g.) of device 440 and in which parameter 1441 includes a hexadecimal value (an integer of at least zero and at most 15, often designated as 0-9 or A-F, e.g.) of "1" (equivalent to a binary value of "0001," which expresses respective H/L voltages of nodes 2040-2043 directly). Alternatively or additionally, processing module 2132 may be configured as a local interface control module 3151 configured to perform operation 4254 (in an instance in which the user interface is local to event-sequencing logic 3100, e.g.). In light of teachings herein, numerous existing techniques may be applied for configuring special-purpose circuitry or other structures effective for expressing H/L voltage levels as described herein without undue experimentation. See, e.g., structural components to which the enclosed Information Disclosure Statement (in form 1449A/PTO or substitute filed herewith as another component of the instant application) refers, several of which publications describe binary voltage configurations in detail.

Operation 4255 describes configuring a component of a subscriber identity module with a specific voltage configuration that manifests wireless signal content (e.g. processing module 2131 configuring a group of several electrical nodes 2044, 2045, 2046, 2047 each at a respective H/L voltage levels derived from a parameter 1442 obtained locally or remotely in or for a wireless signal 531-535 as described herein). This can occur, for example, in a context in which nodes 2044-2047 reside in a subscriber identity module 472 of device 440 and in which parameter 1442 includes a hexadecimal value of "2" (equivalent to a binary value of "0010," which expresses respective H/L voltages of nodes 2044-2047 directly). Alternatively or additionally, processing module 2131 may be operably coupled with a SIM configuration module 3143 constructed and arranged to perform operation 4255 (in an instance of event-sequencing logic 3100 remote from event-sequencing logic 2100, e.g.). In light of teachings herein, numerous existing techniques may be applied for configuring special-purpose circuitry or other structures effective for encryption or other such data derivation as described herein without undue experimentation. See, e.g., structural components to which the enclosed Information Disclosure Statement (in form 1449A/PTO or substitute filed herewith as another component of the instant application) refers, several of which publications describe digital data derivation in detail.

Operation 4259 describes configuring a component of one or more processors with a specific voltage configuration that manifests an executable protocol (e.g. control module 2252 putting a group of two or more electrical nodes 2048, 2049 each at a respective H/L voltage levels in one of four permutations indicative of a parameter 1443 obtained in or for a wireless signal 531-535 by reading value 2098). This can occur, for example, in a context in which nodes 2048, 2049 reside in (an instance of) device 440 and in which parameter 1443 includes a binary value of "00" or "01" or "10" or "11" used as a selection 1435 of a next protocol (among several available protocols, e.g.) to be invoked or executed by control module 2252. Alternatively or additionally, control module 2252 may be configured as or operably coupled with a task sequencing module 3144 configured to perform (another instance of) operation 4259. In light of teachings herein, numerous existing techniques may be applied for configuring special-purpose circuitry or other structures effective for selecting which circuitry to read or otherwise activate next as described herein without undue experimentation. See, e.g., structural components to which the enclosed Information Disclosure Statement (in form 1449A/PTO or substitute filed herewith as another component of the instant application) refers, several of which publications describe circuitry configurations and activations in detail.

Figure 44:
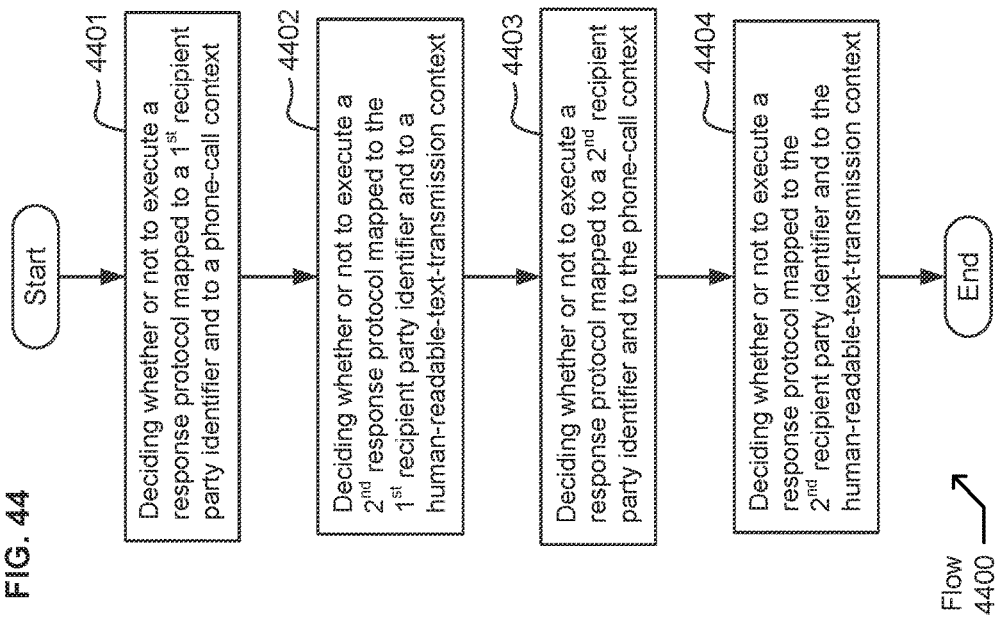
FIG. 44 likewise depicts variants of earlier-presented flows.
Figure 43:
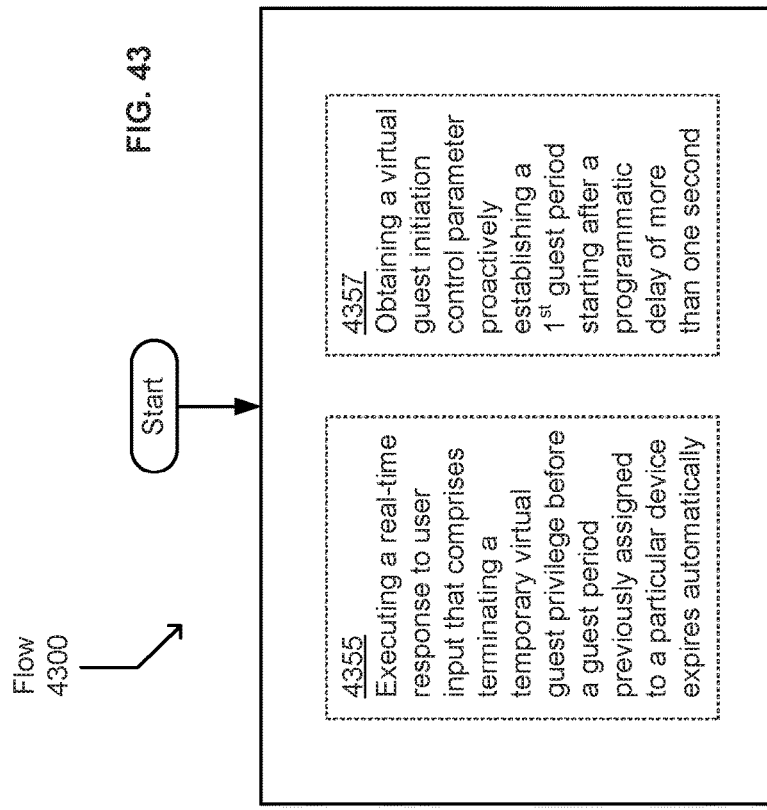
FIG. 43 likewise depicts variants of earlier-presented flows.

With reference now to flow 4300 of FIG. 43 and to flow 4400 of FIG. 44 and to other flows described above, in some variants, one or more of operations 4355, 4357, 4401, 4402, 4403, or 4404 may be performed in preparation for or in response to or otherwise in conjunction with any of operations in flows depicted above. Operation 4355 describes executing a real-time response to user input that comprises terminating a temporary virtual guest privilege before a guest period previously assigned to a particular device expires automatically (e.g. decision module 2151 triggering a deactivation 1312 of a guest user account 1301 as a real-time response to user input 1372 in a context in which the guest user account 1301 would otherwise have automatically expired at a later time 1381 specified by earlier-provided user input 1371). In a context in which mobile device 440 is provided to a hotel guest as a perk and in which the guest user account 1301 hosted on mobile device 440 coincides with a hotel room stay having a nominal time 1382 (a checkout time of 11 am, e.g.) of ending, for example, prior to user input 1372 the guest user account 1301 may be programmed also to terminate at that (later) nominal time. If the guest checks out of the room at an earlier time, however, a hotel clerk may provide user input 1372 that invokes decision module 2151 to trigger the deactivation 1312 before the default ending time 1382. Alternatively or additionally, the mobile device 440 may be configured to include one or more guest convenience control features 1331 such as a uniquely serialized alphanumeric label 1321 (indicating a room number establishing the guest's authority to charge to that room's bill, e.g.) or a wireless transmission component 1325 (a passive RFID transponder 1324 configured to unlock a door of that room or to a hotel amenity, e.g.). Alternatively or additionally, decision module 2151 may be configured as or operably coupled with a guest privilege configuration module 3153 constructed and arranged to perform (another instance of) operation 4355. In light of teachings herein, numerous existing techniques may be applied for configuring special-purpose circuitry or other structures effective for account privileges and similar access control as described herein without undue experimentation. See, e.g., structural components to which the enclosed Information Disclosure Statement (in form 1449A/PTO or substitute filed herewith as another component of the instant application) refers, several of which publications describe authorization features in detail.

Operation 4357 describes obtaining a virtual guest initiation control parameter proactively establishing a first guest period starting after a programmatic delay of more than one second (e.g. decision module 2152 generating a control parameter 1445 establishing a nominal time 1383 at which a guest user account 1301 will automatically be activated that is more than an hour or more than a day in the future). This can occur, for example, in a context in which a host user (party 401, e.g.) provides user input 1372 (a menu selection 1435, e.g.) that specifies or otherwise defines the nominal time 1383. In a context in which a temporary guest user account 1301 is being established on mobile device 440 for the benefit of an out-of-town guest, for example, the nominal time 1383 at which such access will begin (coinciding with a beginning of a lease of a vehicle or hotel room, e.g.) can be communicated in advance of nominal time 1383. This can occur in a context in which such guest may wish to purchase an earlier beginning time, for example, or to rely upon the use of guest user account 1301 thereafter in scheduling a telephonic appointment while staying in a foreign city. Alternatively or additionally, the mobile device 440 may be configured to include one or more guest convenience control features 1332 such as a key ring bearing a vehicle key or room key, e.g.). Alternatively or additionally, decision module 2152 may be configured as or operably coupled with a guest session scheduling module 3182 configured to perform (another instance of) operation 4357.

Operation 4401 describes deciding whether or not to execute a response protocol mapped to a first recipient party identifier and to a phone-call context (e.g. recognition module 2241 invoking a response protocol 611 that is conditional upon an incoming communication comprising a phone call 521 and upon a party identifier 610 signaling that the communication is directed to Susan). This can occur, for example, in a context 651 in which the phone call 521 manifests the communication; in which a digitally expressed component of the phone call 521 includes a party identifier 610 associated with Susan; in which event-sequencing logic 500, 2200 is operably coupled with tangible data-handling media 600 described herein; and in which response protocol 611 would not otherwise be invoked. In light of teachings herein, numerous existing techniques may be applied for configuring special-purpose circuitry or other structures effective for implementing various response protocols 611-615, 621-625, 631-635 as described herein without undue experimentation. See, e.g., structural components to which the enclosed Information Disclosure Statement (in form 1449A/PTO or substitute filed herewith as another component of the instant application) refers, several of which publications describe contingent response protocols in detail.

Operation 4402 describes deciding whether or not to execute a second response protocol mapped to the first recipient party identifier and to a human-readable-text-transmission context (e.g. recognition module 2242 implementing a response protocol 612 that is conditional upon an incoming communication comprising text 522 and upon a party identifier 610 signaling that the communication is directed to Susan).

Operation 4403 describes deciding whether or not to execute a response protocol mapped to a second recipient party identifier and to the phone-call context (e.g. recognition module 2243 implementing a response protocol 621 that is conditional upon an incoming communication comprising a phone call and upon a party identifier 620 signaling that the communication is directed to someone other than Susan).

Operation 4404 describes deciding whether or not to execute a response protocol mapped to the second recipient party identifier and to the human-readable-text-transmission context (e.g. recognition module 2244 implementing a response protocol 622 that is conditional upon an incoming communication comprising text and upon a party identifier 620 signaling that the communication is directed to someone other than Susan).

In some variants, with respect to mobile device experimentation, the mobile device may schedule or initiate at least one experimentation round based at least partially on any of the following: (a) in the background while other automations progress, (b) at timed intervals or if a certain amount of time elapses, (c) if signal quality drops below a certain level, (d) if a certain amount of movement (such as translational, rotational, or a combination thereof, etc.) is detected (such as using an inertial measurement unit (IMU) or GPS unit), (e) at a known or determinable boundary for a physical state entry of an antenna configuration data structure (such as which may include a parameter-to-physical state data structure), (f) if the mobile device is approaching a known or determinable boundary for a physical state entry of an antenna configuration data structure, (g) predictively (such as based at least partly on (i) predicting a certain amount of movement is soon to occur, (ii) predicting that a boundary crossing into a physical state that corresponds to a different physical state entry of an antenna configuration data structure, or a combination thereof, etc.), or a hybrid that includes any one or more of these. However, claimed subject matter is not limited to any particular described embodiments, implementations, examples, etc.

In some variants, with respect to mobile device experimentation, experimentation may be constrained responsive to one or more conditional parameters. By way of example only, parameter options/possibilities to be tested may be constrained based at least partially on power usage. For instance, the mobile device may intend to enable wireless communication with at least one bases station, but limit power output for such wireless communication to a particular power level (such as 100 mW). A battery may set limits or establish specified guidelines that constrain power usage, including but not limited to constraining power usage/charge drain over time. Accordingly, an experimentation module may trade (i) a selection of wireless standard being used or (ii) frequency or bandwidth of searching, for example, (instead of or in addition to transmit power) with power drain. Moreover, as another example, a power constraint may be selectively applied based at least partly on time of day or predicted time until a battery will next be charged. For instance, whether or to what stringency a power constraint is applied may depend on a time of day. Accordingly, there may be a greater concern on battery drain earlier in a day as compared to later when recharging typically occurs (a typical temporal pattern of charging—such as around noon in a car as well as starting at around midnight with a wall outlet—may also or alternatively be considered). From an alternative perspective, a battery level may be considered as a condition for ascertaining at least one associated antenna assembly configuration parameter (such as if selecting a wireless communication mode—or a group of wireless communication parameters). However, claimed subject matter is not limited to any particular described embodiments, implementations, examples, etc.

In some variants, an antenna configuration data structure may have separate entries for, or otherwise denote a difference between, uplink versus downlink. Appropriate uplink and downlink communication parameters may differ because multipath may affect the mobile device more than a base transceiver station, because different frequencies may be assigned to uplink versus downlink communications, or a hybrid that includes any one or more of these. However, claimed subject matter is not limited to any particular described embodiments, implementations, examples, etc.

In some variants, with respect to receiving commands or data at the mobile device from a base transceiver station, the mobile device may cooperate with the base transceiver station to obtain one or more wireless communication parameters. First, the base transceiver station may send to the mobile device or the mobile device may receive from the base transceiver station one or more wireless communication parameters that the mobile device may adopt. Second, the base transceiver station may send to the mobile device or the mobile device may receive from the base transceiver station at least some reception data from a perspective of the base transceiver station for the mobile device to incorporate into an automation process ascertaining what wireless communication parameters are to be implemented. Third, the mobile device and the base transceiver station may negotiate to determine a direction of a wireless signal that enables a reflection of a wireless signal off of an object between the mobile device and the base transceiver station (such as a bank shot may be planned and implemented) to facilitate signal propagation between the mobile device and the base transceiver station. Conducting a signal bank shot may be facilitated by using, for example, a 3D map depicting walls, furniture, terrain, vehicles, people, etc., and one or more reflection coefficients for proximate objects that indicate how or to what extent signals of particular frequencies can be expected to reflect off of an object. Cooperation between two wireless nodes may encompass, for example, any one or more of the above. However, claimed subject matter is not limited to any particular described embodiments, implementations, examples, etc.

In some variants, a data structure may link one or more wireless communication parameters with a given physical state of the mobile device. Thus, if the mobile device knows its spatial location (such as in terms of GPS coordinates or placement within a 3D map of a building), a group of wireless communication parameters (such as a set of antenna elements and respective phase delays) to be adopted to communicate with a particular base transceiver station may be ascertained from data structure. For certain example implementations, an orientation of the mobile device may be part of an input physical state to ascertain associated wireless communication parameters (such as if an orientation is expected to be user-determined autonomously). Alternatively, an orientation of the mobile device may be part of a group of wireless communication parameters that are output based on an e.g. spatial location of the mobile device (such as if the mobile device is expected to indicate to a user a particular mobile-device-orientation offering enhanced communication—which may be especially pertinent, for instance, if the mobile device is not being held during use, such as when a user has a wired or wireless headset, or if a user is sitting in a chair that swivels).

In some variants, an antenna configuration data structure may include one or more entries having a physical state field that is associated with or linked to a field having a group of wireless communication parameters. However, a data structure may additionally or alternatively include one or more of the following conditions or potential inputs: (a) prediction of an upcoming physical state, (b) a power availability at a transmitter or a receiver (or a power usage constraint), (c) a spatial location (or orientation) of the base transceiver station, (d) an availability of one or more personal auxiliary relay items, (e) a time of day, (f) other, potentially-interfering wireless traffic that is known of through self-detection or notification, (g) an expected radio activity (such as is a data intensive activity, such as media streaming, anticipated?), (h) a device type for the mobile device, (i) one or more antenna characteristics of the mobile device (such as a feasible beam pattern, a polarization sensitivity, a frequency response, an impedance, or a combination thereof, etc.), (j) a frequency band, (k) a signal encoding, (1) one or more environmental factors (such as humidity—certain frequencies propagate less well than others in higher humidity (such as 50 GHz signals attenuate in the presence of water), temperature, physical barriers—stationary or moving, approaching devices, or a combination thereof, etc.), or a hybrid that includes any one or more of these. However, claimed subject matter is not limited to any particular described embodiments, implementations, examples, etc.

In some variants, a wireless node may develop an antenna configuration data structure. By way of example only, a wireless node may store or record a physical state along with a corresponding signal quality in association with each other in a data structure. A physical state may correspond to a currently-existing physical state, a recently-tested physical state, or a hybrid that includes any one or more of these. For certain example implementations, an updated association may be stored if there are certain amounts of change to (i) a physical state or (ii) signal quality or if a certain amount of (iii) time has elapsed, or a hybrid that includes any one or more of these. Additionally or alternatively, for certain example implementations, a wireless node may replace or add to an existing entry if a new group of wireless communication parameters are discovered for a given physical state that provides superior signal quality. For certain example implementations, an entry of an antenna configuration data structure may include a time stamp representing when a value was determining, the mobile device or device type identifier of the mobile device that determined or was a source of a value, or a hybrid that includes any one or more of these. However, claimed subject matter is not limited to any particular described embodiments, implementations, examples, etc.

In some variants, new values for entries may be determined via interpolation or extrapolation from values associated with other physical states. For example, if data is available (such as from experimentation in transmit or receive postures) with respect to multiple tested orientations, it may be predicted how well antenna elements (or other wireless communication parameters) will work at other orientations. Additionally or alternatively, if data is available with respect to multiple tested spatial locations (including if a 3D map of a room is accessible or if know directional capabilities of an antenna), it may be predicted how well antenna elements (or other wireless communication parameters) will perform at other spatial locations. Even without a 3D map, if there are a sufficient number of measurements, then values for other, untested spatial locations may be predicted. For instance, if data values are available from several different paths taken by the mobile device around a room, then the mobile device can predict data values for other points in the room. For certain example implementations, one or more entries an antenna configuration data structure may have an indicator that a value is predicted, an indicator that a value has a particular level of reliability, or a hybrid that includes any one or more of these.

In some variants, network-side actors may acquire, build, create, maintain, share, or disseminate (or a combination thereof, e.g.) at least a portion of an antenna configuration data structure. Network-side actors may include, by way of example but not limitation, a cloud-based actor, an internet actor, a telecommunications service provider, a telecommunications equipment supplier, or a hybrid that includes any one or more of these. In some variants, network-side actors may acquire data fully or partially from the mobile device. For certain example implementations, the following data may be received from the mobile device: at least a portion of a physical state, one or more wireless communication parameters that were employed during the existence of the physical state, and corresponding signal quality. Additionally or alternatively, for certain example implementations, the following data may be received from the mobile device: physical state and wireless communication parameters that were employed during the existence of the physical state, and the following data may be received from a counterpart wireless node (such as the base transceiver station): signal quality based on a network-side reception.

In some variants, a network-side actor may send to the mobile device or the mobile device may receive from a network-side actor one or more portions of an antenna configuration data structure so as to download a cacheable part thereof. For certain example implementations, a part may be downloaded, or offered for download, based at least partially on any one or more of the following: (a) current spatial location; (b) physical state; (c) predicted spatial location; (d) predicted physical state; (e) device type, make, model, specifications, or combination thereof, etc. (such as memory capability, at least one user setting, or a specific physical antenna array traits, or a combination thereof, etc.); (f) a proximity to a boundary of current cached part (such as including, but not limited to, a consideration of predicted movement toward a boundary thereof); some combination thereof, or a hybrid that includes any one or more of these.

In some variants, a portable wireless node may account for or address environmental factors or concerns pertinent to wireless communication at, e.g., EHF. For certain example implementations, to avoid transmission through a human body, human tissue (such as hand, head, or a combination thereof, e.g.) may be detected using one or more of the following: (a) test beam emanation (such as analyze reflections from test beams), (b) a capacitive sensor (such as of a touchscreen), (c) a proximity detector (such as a light sensor), (d) a pressure sensor (such as determine where finger tips are placed), (e) a sound sensor (such as determine where a user's mouth is located), or a hybrid that includes any one or more of these.

In some embodiments, a handheld device 440 or other portable wireless node may interact with another portable wireless node (configured as an auxiliary relay item in a shoe or hat or other wearable article, e.g.) via a local linkage (Bluetooth®, e.g.). For certain example implementations, such auxiliary relay items may be engaged or utilized for any one or more of the following reasons: (a) a clearer path to another wireless node (such as to avoid a head or other human tissue or another blocking object), (b) more power availability, (c) more or differently-arranged antenna elements on the auxiliary relay item, (d) a different available frequency or wireless communication standard, or a hybrid that includes any one or more of these. By way of example only, a portable wireless node may roll over to an auxiliary relay item to relocate transmission power away from a head or if throughput drops where a user is currently holding a portable wireless node. For certain example implementations: (1) a portable wireless node may select between or among one or more auxiliary relay items (such as may determine when it is advisable to fallback to an auxiliary relay item using a protocol for communication between the mobile device and an auxiliary relay item); (2) an auxiliary relay item may be creating/using/updating an antenna configuration data structure in conjunction with or independent of a portable wireless node; (3) a spatial location of a wearable auxiliary relay item may be determine based at least partly on an attachment site to a body part; (4) a system may automatically determine presence/absence or location of wearable auxiliary relay items; (5) searches for suitable antenna configuration parameters by an auxiliary relay item may be constrained by battery power (such as power/battery-related technology described herein with respect to a portable wireless node may be applied to an auxiliary relay item, unless context dictates otherwise); (6) if multiple items are linked so as to enable or merely enhance communication or user functions if they are working together, then one or more of the multiple items may alert (such as visually, audibly, haptically, or a combination thereof, e.g.) if they are separated from each other beyond a threshold distance (such as beyond a range which enables using them together, such as if a user is driving away from a house with one of two interacting components); or some combination thereof.

In some variants, technologies described herein may be directly apparent to a user in one or more ways. For certain example implementations, a portable wireless node may offer a user one or more settings: (a) a size of a data structure being cached, (b) a slider or other mechanism to indicate between battery consumption versus signal acquisition or enhancement, (c) a slider or other mechanism to indicate between an acceptable energy radiation level (such as exposure to a body or head portion thereof) versus signal quality or bandwidth throughput, (d) ability to activate/sync/configure an auxiliary relay item (such as input a type), or a hybrid that includes any one or more of these. For certain example implementations, a user may indicate a desire to be notified of (such as via at least one setting): (a) a position or orientation option for a portable wireless node that offers improved communication (such as more bandwidth, less power, less interference, lower cost, or a combination thereof, e.g.), (b) an impending signal loss (such as if movement continues along a current direction based on signal degradation or entries in an antenna configuration data structure), or a hybrid that includes any one or more of these. For certain example implementations, notifications may be delivered by a portable wireless node to a user audibly, haptically, visually, or a combination thereof, e.g. for indicating a different position/orientation, impending signal loss, or a hybrid that includes any one or more of these.

In some variants, an extremely high frequency (EHF) communication (such as at 30-300 GHz, such as at 60 GHz in accordance with IEEE 802.1 lad) may be conducted by wireless node that is also capable of utilizing other frequency bands or other wireless communication standards. To facilitate such interoperability, a wireless node may determine (i) whether or when to switch to another frequency band or another wireless communication standard or (ii) whether or when to share bandwidth demands with another frequency band or another wireless communication standard. For certain example implementations, other frequency bands may include, but are not limited to, (a) 2.4 GHz, 3.6 GHz, 5 GHz, or a combination thereof, e.g.; (b) 700/800 MHz, 900 MHz, 1800 MHZ, 1700/1900 MHz, 2500 MHz, 3500 MHz, or a combination thereof, e.g.; or a hybrid that includes any one or more of these. For certain example implementations, other wireless communication standards may include, but are not limited to, (a) IEEE 802.11b, 802.11g, 802.11a, 802.11n, 802.11ac, or a combination thereof, e.g.; (b) GSM/EDGE, CDMA, UMTS/HSPA, LTE, WiMAX; or a hybrid that includes any one or more of these. However, claimed subject matter is not limited to any particular described embodiments, implementations, examples, e.g.

In some variants, a wireless node may choose to switch frequency or wireless standard or may choose to share communication across two or more frequencies or wireless standards. For certain example implementations, one or more of a number of factors may be considered for switching versus sharing decisions. First, a wireless node may switch if another frequency band or standard can handle current bandwidth demands while a current one cannot. Second, a wireless node may switch if another frequency band or standard has a lower, or at least no higher, cost. Third, a wireless node may switch if a current frequency is experiencing attenuation but another frequency is likely not to experience the same attenuation (such as if body tissue is currently attenuating a 60 GHz signal, but the mobile device can switch to a lower frequency signal below 10 GHz). Fourth, a wireless node may share bandwidth demands if a current frequency or standard is not providing a sufficiently fast or strong connection, but another frequency or standard has a higher cost or insufficient bandwidth capability to meet current bandwidth demands. Additional or alternative factors for deciding between switching and sharing may be considered. For certain example implementations, one or more of a number of factors may prompt a wireless node to consider sharing or switching. First, a signal quality may drop below a threshold using a current frequency or standard. Second, no group of wireless communication parameters offering superior performance may be determinable by a wireless node via experimentation. Third, no entry in a wireless communication configuration data structure for a current or impending physical state (or set of conditions generally) may be ascertained. Additional or alternative factors for deciding whether to consider switching versus sharing may be incorporated into a wireless node's automation. However, claimed subject matter is not limited to any particular described embodiments, implementations, examples, e.g.

In some variants, a coordinated management system may be implemented where multiple wireless nodes occupy a given physical region, with the management system coordinating various signal strengths, antenna directions, polarizations, features, or a hybrid that includes any one or more of these. Coordination may enable a greater number of nodes within or a more efficient use of available spectrum within a given physical region. However, claimed subject matter is not limited to any particular described embodiments, implementations, examples, e.g.

In some variants, a coordinated management system may be constituted in a centralized or a distributed manner. For a centralized coordinated management system, in accordance with certain example implementations, an access point, the base transceiver station, a mobile switching center, a fixed wireless node, an internet node, a telecom node, or a combination thereof, e.g., may coordinate a number of portable wireless nodes across a single "cell" or multiple cells. For a distributed coordinated management system, in accordance with certain example implementations, two or more portable wireless nodes, separately from or in conjunction with at least one network-infrastructure-based node—such as a fixed wireless node or a telecom node or an internet node, may coordinate their own individual wireless signals. Coordination may be based at least partially on their own sensor readings, including but not limited to received signals, or based at least partially on using coordination-specific data received from or exchanged with other portable wireless nodes or with a fixed wireless nodes, such as the base transceiver station. For a hybrid coordinated management system, in accordance with certain example implementations, there may be some decentralized efforts by portable wireless nodes with overarching efforts by one or more network-infrastructure-based nodes for centralized oversight. However, claimed subject matter is not limited to any particular described embodiments, implementations, examples, etc.

In some variants, one or more factors may be separately or jointly considered in conjunction with, or as part of, an analysis to facilitate coordination. First, available frequency bands (in a given region or to a particular portable wireless node) may be considered. Different bands have different amounts or levels of absorption or other loss, dispersion, scattering, reflection, or a hybrid that includes any one or more of these. By way of example only, 60 GHz typically has more attenuation than 5 GHz. Thus, although 60 GHz generally propagates a relatively shorter distance, it can correspondingly be reused in smaller spaces. At 60 GHz, reflections may enable "bank shots" off of proximate objects. Two devices may determine to perform a bank shot via negotiation, or a centralized coordinator may order them to perform one. Furthermore, devices transmitting at higher frequencies may utilize smaller antenna elements that accommodate their smaller/shorter wavelengths. A physical size of a particular wavelength aperture may generally be smaller at higher frequencies. Relatively smaller devices can therefore implement beamforming at 60 GHz, for example, even if they would be unable to do so at 1800 MHz, or even 5 GHz. Second, governmental restrictions may be considered. In some contexts statutes or regulations may stipulate or require certain transmission maximums or reception capabilities. By way of example only, a signal strength may be limited at particular frequencies. Third, licensing constraints (such as with regard to available frequencies or particular uses thereof) may be considered. Licensing constraints may flow from a governmental entity, from a corporation to the mobile device or mobile device user (such as contractual obligations), or a hybrid that includes any one or more of these. Fourth, different or particular device types in a given physical region that are trying to share spectrum may be considered. For example, "permanent" characteristics may be considered: (a) antenna features (such as beam pattern capabilities, polarization sensitivity, frequency response, impedance, or a combination thereof, e.g.), (b) processing capability, or a hybrid that includes any one or more of these. As another example, current settings of a device (such as user-established settings, OS-specified settings, app-determined settings, or a combination thereof, e.g.) may be considered: (a) frequency selection from among multiple possible frequencies, (b) signal encoding selection from among multiple possible encoding schemes, (c) user-imposed restraints (such as based on cost, power, battery life, or a combination thereof, e.g.), or a hybrid that includes any one or more of these. As yet another example, current status levels or conditions of a device may be considered: (a) signal to noise ratio (SNR), (b) signal strength, (c) power constraints or battery status, (d) available processing bandwidth, (e) location, (f) expected radio activity level (such as whether an activity is anticipated to be data intensive (e.g. media streaming)), (g) orientation, (h) operating state (such as connected to a Wi-Fi network or not, access through near field communication (NFC), or a combination thereof, e.g.), or a hybrid that includes any one or more of these. Fifth, environmental characteristics may be considered. For example, physical barriers (such as walls, trees, billboards, etc.; those obtainable from one or more Google Earth or crowd-sourced 3D building data or other maps 3230; or a combination thereof; etc.) may be considered. Other environmental characteristics may include, but are not limited to, other approaching devices (such as their locations or transmitting characteristics), humidity, temperature, or a hybrid that includes any one or more of these. However, claimed subject matter is not limited to any particular described embodiments, implementations, examples, etc.

In some variants, coordination opportunities may include, but are not limited to, bank shots or beamforming. First, bank shots may be planned or implemented between at least two wireless nodes to avoid a wall or other obstacle, if a vehicle is detected to be approaching and will be temporarily block a line-of-sight transmission path, or a hybrid that includes any one or more of these. Second, beamforming may be achieved with, by way of example but not limitation, an antenna with multiple elements, a phased array, a meta-material antenna, or a hybrid that includes any one or more of these. An aimed beam may reach a target with less relative power (such as in comparison to an omnidirectional transmission a beam may reach a further distance (with a narrower footprint) using a same power level). Further with respect to coordination, an omnidirectional transmission may be used if a target or counterpart wireless node is moving (or if a transmitting node is moving), but beamforming may be used if a target is stationary (or slowly moving) (or if a transmitting node is not moving). Aiming a beam may be accomplished through "trial and error". As a first example, multiple beams may be sent out (such as fully or partially simultaneously or over time) with different indicators, and an intended recipient may be asked for an indicator that they received strongest to determine a good beam pattern for that recipient. As a second example, two nodes may send out beams until they connect. As a third example, a wireless node may sweep beams circularly until a directional angle (such as azimuth angle) is discovered that makes contact with an intended wireless target, and a wireless node may then slice up or down until it hones in to find an elevation or a zenith angle. However, claimed subject matter is not limited to any particular described embodiments, implementations, examples, etc.

In some variants, at least one sensor may sense, produce, or otherwise provide one or more sensor values (as a series of estimates or other digital signal, e.g.). Sensors may include, by way of example only, a camera, a microphone, an accelerometer, a thermometer, a satellite positioning system (SPS) sensor, a barometer, a humidity sensor, a compass, an altimeter, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), or a hybrid that includes any one or more of these. Values provided by at least one sensor 1174 may include, by way of example but not limitation, an image/video, a sound recording, an acceleration value, a temperature, one or more SPS coordinates, a barometric pressure, a humidity level, a compass direction, an altitude, a gyroscopic value, a magnetic reading, a pressure value, an oscillation value, an ambient light reading, inertial readings, touch detections, finger placements, flex detections, or a hybrid that includes any one or more of these.

Referring again to the flow variants of FIGS. 35-44 described above and in particular to flow 3500, operation 3501 may be performed by one or more special-purpose retrieval modules 2294 or extraction modules 2083 implemented as or operably coupled with circuitry 1710 having an event-sequencing structure configured to determine that a first portion of "first" communication 3294 signifies a first subset of the two or more parties to whom a second portion of the first communication is directed. In a context in which communication 3294 arrives at server 428 via a linkage 3296 configured as a landline, for example, circuitry 1710 may perform operation 3501 by determining that a particular "first" communication 3294 (comprising a user text 522 directed to a virtual cell phone number owned by support service provider 425 but not currently assigned to any party, e.g.) is addressed to a listed party (Juliet, e.g.). This can occur, for example, in a context in which a configurable node set 1711 (one or more instances of electrical nodes 341 implementing a volatile memory or otherwise coupled to one or more instances of transistors 351 described herein, e.g.) may be invoked to perform operation 3501 either jointly (where event-sequencing logic 1700 includes a processor 580 configured to execute a code segment 2941 therein that performs operation 3501 when so invoked, e.g.) or independently (where a gate array or other hardware expression thereof is adapted to respond to a digital data expression 2951 provided at one or more instances of input nodes 343 thereof, e.g.); in which data expression 2951 (one or more components of communication 3294, e.g.) is a voltage configuration on a node set 1712 (one or more instances of voltage levels 332 on respective nodes 342 thereof, e.g.) operably coupled therewith (through one or more transistors, e.g.). Alternatively or additionally, a virtual cell phone number may have been used at a remote mobile device 400 (comprising a legacy cellular telephone, e.g.) in a manner that is transparent to a user thereof (in which device 400 does not receive or present any indication that any device identifiers associated with communication 3294 are virtual, e.g.) to trigger communication 3294.

Also in such variants, operation 3502 may be performed by a special-purpose processing module 2134 operably coupled with circuitry 1720 having an event-sequencing structure configured to cause "second" communication 3295 to include an identifier of the first mobile device as a first component and to include an identifier of the first subset of the two or more parties as a second component and to include the second portion of the first communication directed to the first subset of the two or more parties as a third component. This can occur, for example, in a context in which a configurable node set 1721 is invoked to perform operation 3502 either jointly (where event-sequencing logic 1700 includes a processor 580 configured to execute a code segment 2942 therein that performs operation 3502 when so invoked, e.g.) or independently (where a gate array or other hardware expression thereof is adapted to respond to a digital data expression 2952 provided at one or more input nodes 343 thereof, e.g.); in which data expression 2952 (expressing a phone number identifying device 3240, e.g.) is a voltage configuration on a node set 1722 operably coupled therewith; and in which (an instance of) primary unit 2110 implemented in server 428 includes event-sequencing logic 1700. Alternatively or additionally, event-sequencing logic 1700 may (optionally) be operably coupled with other event-sequencing logic 100, 200, 500, 700, 800, 900, 1000, 1700, 1800, 1900, 2000, 2200, 2300, 2400, 2500, 2600, 2700, 2800, 3100 described herein.

Likewise in such variants, operation 3503 may be performed by a special-purpose implementation module 2075 operably coupled with circuitry 1730 having an event-sequencing structure configured to transmit second communication 3295. This can occur, for example, in a context in which a configurable node set 1731 is invoked to perform operation 3503 either jointly (where event-sequencing logic 1700 includes a processor 580 configured to execute a code segment 2943 therein that performs operation 3503 when so invoked, e.g.) or independently (where a gate array or other hardware expression thereof is adapted to respond to a digital data expression 2953 provided at one or more input nodes 343 thereof, e.g.); in which data expression 2953 (one or more components of "second" communication 3295, e.g.) is a voltage configuration on a node set 1732 operably coupled therewith; in which event-sequencing logic 1700 resides in server 428 or in network 3290; and in which network 3290 comprises network 390 and BTS 459 (as depicted in FIG. 3). In some contexts, for example, communication 3295 travels along the same signal path (linkage 3296, e.g.) via which communication 3294 arrived to server 428. Alternatively or additionally, Tybalt may (optionally) be designated as a "default recipient" of device 3240 such that he will receive any future instances of "second" communication 3295 that are not (selectively) directed to any other recognized parties 3201, 3202 (designated as users of device 3240, e.g.) in some variants described below. See FIG. 28.

Referring again to the flow variants of FIGS. 35-44 described above and in particular to flow 3600, operation 3601 may be performed by an input module 2591 implemented as or operably coupled with special-purpose circuitry 2310 having an event-sequencing structure configured to obtain an incoming communication 3032 having both a "first" routing tag (a virtual phone # used by a subset of the two or more parties 401, 402, 403, e.g.) and "first" user content (a caller ID field, user text, or other digital data expression 2954, e.g.) intended for that subset (Susan and Nancy, e.g.) but not for a remainder (not for Carol, e.g.) of the parties who share device 440. This can occur, for example, in a context in which a configurable node set 2311 (one or more instances of electrical nodes 341 implementing a volatile memory or otherwise coupled to one or more instances of transistors 351 described herein, e.g.) may be invoked to perform operation 3601 either jointly (where event-sequencing logic 2300 includes a processor 580 configured to execute a code segment 2944 therein that performs operation 3601 when so invoked, e.g.) or independently (where a gate array or other hardware expression thereof is adapted to respond to a digital data expression 2954 provided at one or more instances of input nodes 343 thereof, e.g.); and in which data expression 2954 is a voltage configuration on a node set 2312 (one or more instances of voltage levels 332 on respective nodes 342 thereof, e.g.) operably coupled therewith (through one or more transistors, e.g.). Alternatively or additionally, a virtual cell phone number may have been used at a remote mobile device (comprising an instance of device 322, e.g.) in a manner that is transparent to a user thereof (in which the remote device does not receive or present any indication that any device identifiers associated with the "first" communication are virtual, e.g.) to trigger the "first" communication 3032 arriving at event-sequencing logic 2300.

Also in such variants, operation 3602 may be performed by a special-purpose implementation module 2074 operably coupled with circuitry 2320 having an event-sequencing structure configured to cause both a selective identification of a "first" subset of the two or more parties (comprising one or more account-specific headers 671 that do not refer to Carol, e.g.) and the "first" user content to be transmitted in a downstream communication 3035. This can occur, for example, in a context in which communication 3035 includes a network routing tag 672 (a real phone #, e.g.) also derived from the "first" routing tag (by a forwarding protocol 2775 implemented at server 428, e.g.). This can occur, for example, in a context in which node set 2321 is configured to initiate operation 3602 either jointly (where event-sequencing logic 2300 includes a processor 580 configured to execute a code segment 2945 therein that performs operation 3602 when so invoked, e.g.) or independently (where a gate array or other hardware expression thereof is adapted to respond to a digital data expression 2955 provided at one or more input nodes 343 thereof, e.g.); in which data expression 2955 is a voltage configuration on a node set 2322 operably coupled therewith; and in which (an instance of) primary unit 2110 includes event-sequencing logic 2300. Alternatively or additionally, event-sequencing logic 2300 may (optionally) be operably coupled with other event-sequencing logic 100, 200, 500, 700, 800, 900, 1000, 1700, 1800, 1900, 2000, 2200, 2300, 2400, 2500, 2600, 2700, 2800, 3100 described herein.

Referring again to the flow variants of FIGS. 35-44 described above and in particular to flow 3700, operation 3701 may be performed by an (instance of) input module 2592 implemented as or operably coupled with special-purpose circuitry 2410 having an event-sequencing structure configured to obtain one or more components 3001, 3002 of a "first" communication 3036 and an identification of a "first" subset 3309 (including party 3301, e.g.) of the two or more parties with whom the one or more components 3001, 3002 are associated and (an instance of) network routing tag 1530 identifying the "first" mobile device 3340 (a caller identification field comprising Susan's virtual identifier, e.g.) all at network equipment (comprising an instance of event-sequencing logic 2400 residing in primary network 3390, e.g.) operably coupled (via a wireless linkage 3396, e.g.) with the "first" mobile device 3340 (by which Susan generated the one or more components 3001, 3002, e.g.). This can occur, for example, in a context in which other parties (including Carol, e.g.) are not associated with communication 3036 merely by having used mobile device 3340; by which a configurable node set 2411 (one or more instances of electrical nodes 341 implementing a volatile memory or otherwise coupled to one or more instances of transistors 351 described herein, e.g.) may be invoked to perform operation 3701 either jointly (where event-sequencing logic 2400 includes a processor 580 configured to execute a code segment 2947 therein that performs operation 3701 when so invoked, e.g.) or independently (where a gate array or other hardware expression thereof is adapted to respond to a digital data expression 2957 provided at one or more instances of input nodes 343 thereof, e.g.); and in which data expression 2957 is a voltage configuration on a node set 2412 (one or more instances of voltage levels 332 on respective nodes 342 thereof, e.g.) operably coupled therewith (through one or more transistors, e.g.). Alternatively or additionally, wireless linkage 3496 may be configured to implement a bidirectional communication (comprising two component communications 3035, 3036 as described above, e.g.) between device 3440 and network 3490.

Also in such variants, operation 3702 may be performed by a special-purpose implementation module 2073 operably coupled with circuitry 2420 having an event-sequencing structure configured to assemble a "second" communication 3033 (that includes the one or more components 3001, 3002 of the "first" communication 3036 described above, e.g.) and that identifies the "first" subset 3309 of the two or more parties (including Susan, e.g.) and that identifies the "first" mobile device 3340 at the network equipment as an automatic response to an indication of an active account 1003 being associated with one or more members of the subset 3309. This can occur, for example, in a context in which node set 2421 is configured to initiate operation 3702 either jointly (where event-sequencing logic 2400 includes a processor 580 configured to execute a code segment 2948 therein that performs operation 3702 when so invoked, e.g.) or independently (where a gate array or other hardware expression thereof is adapted to respond to a digital data expression 2958 provided at one or more input nodes 343 thereof, e.g.); in which data expression 2958 is a voltage configuration on a node set 2422 operably coupled therewith; and in which (an instance of) primary unit 2110 includes event-sequencing logic 2400. Alternatively or additionally, event-sequencing logic 2400 may (optionally) be operably coupled with other event-sequencing logic 100, 200, 500, 700, 800, 900, 1000, 1700, 1800, 1900, 2000, 2200, 2300, 2400, 2500, 2600, 2700, 2800, 3100 described herein. In some variants, moreover, the one or more components 3001, 3002 may be intended for transmission to a remote instance of device 321 (configured as a legacy cellular telephone, e.g.) in a manner that is transparent to a user thereof (in which the remote device does not receive or present any indication that any device identifiers associated with Susan's transmission are virtual, e.g.).

Also in such variants, operation 3703 may be performed by a special-purpose implementation module 2072 operably coupled with circuitry 2430 having an event-sequencing structure configured to transmit the "second" communication 3033 (from an instance of event-sequencing logic 2400 in primary network 3390 and via hotspot provider 386 or network maintenance service provider 389, e.g.) to one or more destination devices 321, 322. This can occur, for example, in a context in which node set 2431 is configured to initiate operation 3703 either jointly (where event-sequencing logic 2400 includes a processor 580 configured to execute a code segment 2948 therein that performs operation 3703 when so invoked, e.g.) or independently (where a gate array or other hardware expression thereof is adapted to respond to a digital data expression 2958 provided at one or more input nodes 343 thereof, e.g.); and in which data expression 2958 is a voltage configuration on a node set 2432 operably coupled therewith. Alternatively or additionally, event-sequencing logic 2400 may (optionally) be operably coupled with other event-sequencing logic 100, 200, 500, 700, 800, 900, 1000, 1700, 1800, 1900, 2000, 2200, 2300, 2400, 2500, 2600, 2700, 2800, 3100 described herein. In some variants, moreover, the one or more components 3001, 3002 may be intended for transmission to a remote instance of device 321 (configured as a legacy cellular telephone, e.g.) in a manner that is transparent to a user thereof (in which the remote device does not receive or present any indication that any device identifiers associated with Susan's transmission are virtual, e.g.). Alternatively or additionally, wireless linkage 3497 may be configured to implement a bidirectional communication (comprising two component communications 3033, 3034 as described above, e.g.) between network maintenance service provider 389 and network 3490.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

CLAUSES

1. A communication system relating to both a first communication and a first mobile device configured to be shared by two or more parties that include a first party and a second party, the first communication having a first component, the communication system comprising:
   one or more articles of manufacture including
   transistor-based circuitry configured to obtain a first component of a first communication and an identification of a first subset of the two or more parties with whom the first component is associated and a network routing tag identifying the first mobile device all at network equipment operably coupled with the first mobile device;
   transistor-based circuitry configured to assemble a second communication that includes the first component of the first communication and identifies the first subset of the two or more parties with whom the first communication is associated and identifies the first mobile device at the network equipment as an automatic response to an indication of an active account being associated with the first subset, the first component of the first communication not being associated with a remainder of the two or more parties; and
   transistor-based circuitry configured to transmit the second communication from the network equipment.

2. The communication system of any of the above SYSTEM CLAUSES further comprising:
   the transistor-based circuitry configured to obtain the first component of the first communication and the identification of the first subset of the two or more parties with whom the first component is associated and the network routing tag identifying the first mobile device all at the network equipment operably coupled with the first mobile device including an electrical node set upon which a voltage configuration manifests the identification of the first subset of the two or more parties with whom the first component is associated.

3. The communication system of any of the above SYSTEM CLAUSES further comprising:
   the transistor-based circuitry configured to obtain the first component of the first communication and the identification of the first subset of the two or more parties with whom the first component is associated and the network routing tag identifying the first mobile device all at the network equipment operably coupled with the first mobile device including an electrical node set upon which a voltage configuration manifests a Boolean determination resulting from an occurrence of an identifier of a member of the first subset of the two or more parties with whom the first component is associated having been found in a directory, the member of the first subset being the first party or being the second party.

4. The communication system of any of the above SYSTEM CLAUSES further comprising:
   the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including an electrical node set upon which a voltage configuration manifests a current balance in the active account.

5. The communication system of any of the above SYSTEM CLAUSES further comprising:
   the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including an electrical node set upon which a voltage configuration manifests a current balance in the active account.

6. The communication system of any of the above SYSTEM CLAUSES further comprising:
   the transistor-based circuitry configured to transmit the second communication including an electrical node set upon which a voltage configuration manifests the first component of the first communication.

7. The communication system of any of the above SYSTEM CLAUSES further comprising:
   an integrated circuit (IC) chip, the IC chip having a first portion and a second portion and a third portion, the first portion of the IC chip being the transistor-based circuitry configured to obtain the first component of the first communication and the identification of the first subset of the two or more parties with whom the first component is associated and the network routing tag identifying the first mobile device all at the network equipment operably coupled with the first mobile device, the second portion of the IC chip being the transistor-based circuitry configured to assemble the second communication that includes the first component of the first communication and identifies the first subset of the two or more parties with whom the first communication is associated and identifies the first mobile device at the network equipment as the automatic response to the indication of the active account being associated with the first subset, the third portion of the IC chip being the transistor-based circuitry configured to transmit the second communication from the network equipment.

8. The communication system of any of the above SYSTEM CLAUSES further comprising:

the network equipment, including the transistor-based circuitry configured to obtain the first component of the first communication and the identification of the first subset of the two or more parties with whom the first component is associated and the network routing tag identifying the first mobile device all at the network equipment operably coupled with the first mobile device, the network equipment also including the transistor-based circuitry configured to assemble the second communication that includes the first component of the first communication and identifies the first subset of the two or more parties with whom the first communication is associated and identifies the first mobile device at the network equipment as the automatic response to the indication of the active account being associated with the first subset, the network equipment also including the transistor-based circuitry configured to transmit the second communication from the network equipment.

9. The communication system of any of the above SYSTEM CLAUSES further comprising:

the network equipment comprising a server that includes the transistor-based circuitry configured to obtain the first component of the first communication and the identification of the first subset of the two or more parties with whom the first component is associated and the network routing tag identifying the first mobile device all at the network equipment operably coupled with the first mobile device, the server also including the transistor-based circuitry configured to assemble the second communication that includes the first component of the first communication and identifies the first subset of the two or more parties with whom the first communication is associated and identifies the first mobile device at the network equipment as the automatic response to the indication of the active account being associated with the first subset, the server also including the transistor-based circuitry configured to transmit the second communication from the network equipment.

10. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset wherein the second communication identifies only one particular person as the first subset of the two or more parties, the one particular person being one of the two or more parties with whom the first communication is associated.

11. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset being responsive to whether or not any one of the two or more parties has been designated as a default user of the first mobile device configured to be shared by the two or more parties.

12. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset being responsive to whether or not any one of the two or more parties has been designated as a default user of the first mobile device configured to be shared by the two or more parties and being responsive to an indication whether or not any one of the two or more parties that has not been designated as a default user of the first mobile device configured to be shared by the two or more parties is online.

13. The communication system of any of the above SYSTEM CLAUSES further comprising:

transistor-based circuitry configured to decide either to include a third party identifier in the second communication if the first communication indicates a third party or to exclude the third party identifier from the second communication if the first communication does not indicate the third party, the third party being one of the two or more parties.

14. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset wherein the first communication is unidirectional.

15. The communication system of any of the above SYSTEM CLAUSES 1-13 further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset wherein the first communication is bidirectional.

16. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset wherein the second communication includes an account-specific header that identifies the first subset of the two or more parties to whom a second component of the first communication is directed.

17. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset wherein the second communication identifies the first subset of the two or more parties from whom the first component of the first communication is received.

18. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset being responsive to a determination whether or not the first communication lacks a party indication tag.

19. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to post a charge for a component of the second communication to a first account specifically associated with one or more members of the first subset.

20. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to request that a remote entity provide a user subset identification tag that corresponds with a virtual device identifier, the user subset identification tag identifying the first subset of the two or more parties.

21. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to transmit a device-executable code segment to an entity identified by a caller identification field as an automatic and conditional response to the first communication, the entity being the first subset of the two or more parties.

22. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to request a retrieval of a particular tag by invoking a remote lookup operation, the particular tag being a component of the second communication that identifies the first mobile device.

23. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to cause the first mobile device configured to be shared by the two or more parties to undergo a wireless linkage handover to or from a wireless local area network (WLAN) hotspot.

24. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to implement a virtual device identifier recognition module in firmware of a particular device, the particular device being or not being the first mobile device configured to be shared by the two or more parties.

25. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to map a response protocol comprising an operational parameter to a specific recipient party identifier and to a context of a specific communication having an identified initiator, the specific communication being the first communication.

26. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry constructed and arranged to configure a particular routing tag as a telephone number associated with a land line, the particular routing tag being associated with the first party but not with the second party.

27. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry constructed and arranged to configure a wireless transmission to include an interpersonal text message obtained as a first component of the second communication.

28. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry constructed and arranged to configure a wireless transmission to include a channel establishment request as a component of the second communication.

29. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to associate a handset with a network routing tag aboard the first mobile device configured to be shared by the two or more parties, the first mobile device being the handset.

30. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to obtain a digitally expressed determination whether or not an integer is evenly divisible by X as a component of obtaining an indication whether or not an entity identifier is apparently independent, X>1, the integer being a component of the entity identifier, the digitally expressed determination comprising an intrinsic property of the entity identifier, the entity identifier referring to the first party or to the second party or to the first mobile device configured to be shared by the two or more parties.

31. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to initiate an investigation protocol effective to determine whether or not a physical destination corresponding to a digital identifier can be found, the physical destination comprising the first mobile device configured to be shared by the two or more parties.

32. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to identify the first party with a first virtual mobile number that corresponds to a single real mobile number that uniquely identifies a portable device; and transistor-based circuitry configured to identify the second party with a second virtual mobile number that corresponds to the single real mobile number that uniquely identifies the portable device, the portable device being the first mobile device configured to be shared by the two or more parties.

33. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry configured to map a response protocol comprising an operational parameter to a specific recipient party identifier and to a specific anonymous communication context, the specific recipient party identifier identifying a member of the first subset of the two or more parties.

34. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least transistor-based circuitry constructed and arranged to configure a component of one or more processors with a specific voltage configuration that manifests an executable protocol aboard the first mobile device configured to be shared by the two or more parties.

35. The communication system of any of the above SYSTEM CLAUSES further comprising:

the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least
    transistor-based circuitry configured to execute a real-time response to user input at a particular device that comprises terminating a temporary virtual guest privilege before a guest period previously assigned to the particular device expires automatically, the particular device being the first mobile device configured to be shared by the two or more parties.

36. The communication system of any of the above SYSTEM CLAUSES further comprising:
    the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least
    transistor-based circuitry configured to obtain a virtual guest initiation control parameter proactively establishing a first guest period starting after a programmatic delay of more than one second at the first mobile device.

37. The communication system of any of the above SYSTEM CLAUSES further comprising:
    the transistor-based circuitry configured to assemble the second communication that includes the first component of the first communication and identifies the first subset of the two or more parties with whom the first communication is associated and identifies the first mobile device at the network equipment as an automatic response to the indication of the active account being associated with the first subset including at least
    transistor-based circuitry configured to decide whether or not to execute a response protocol mapped to a first recipient party identifier and to a phone-call context;
    transistor-based circuitry configured to decide whether or not to execute a second response protocol mapped to the first recipient party identifier and to a human-readable-text-transmission context;
    transistor-based circuitry configured to decide whether or not to execute a response protocol mapped to a second recipient party identifier and to the phone-call context; and
    transistor-based circuitry configured to decide whether or not to execute a response protocol mapped to the second recipient party identifier and to the human-readable-text-transmission context, at least one of the first recipient party identifier or the second recipient party identifier identifying a member of the first subset of the two or more parties.

All of the patents and other publications referred to herein are incorporated by reference into the present detailed description generally—including those identified in the one or more Information Disclosure Statements enclosed herein and especially those described in relation to particular new applications of existing techniques—to the extent not inconsistent herewith (in each respective latest edition, where applicable). Moreover all aspects of the present application are incorporated by reference into the foregoing detailed description (including the content of the summary, claims, and drawings, e.g.). While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A communication system comprising:
network equipment, the network equipment including at least:
    at least one computing device; and
    one or more instructions configured for execution in the at least one computing device for performing operations including at least:
        obtaining at least one communication information component of a first communication configured for transmission to at least one mobile device configured to be shared by two or more parties, at least one account-specific data structure including at least identification of the two or more parties as corresponding two or more human beings and identification of at least one protocol, an identification of a first subset of the two or more parties with whom the at least one communication information component is associated, and a first network routing tag;
        obtaining sensor data sensed in a detection range of the at least one mobile device;
        determining by automatic sensor data recognition whether at least one of the two or more parties corresponding to two or more human beings is present within the detection range of the at least one mobile device;
        deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device;
        assembling a second communication that includes the at least one communication information component of the first communication, identification of the first subset of the two or more parties with whom the first communication is associated, and the second network routing tag identifying the at least one mobile device; and
        transmitting the second communication to the at least one mobile device.

2. A communication system comprising:
network equipment including one or more electronic devices, the one or more electronic devices including at least:
    circuitry configured for obtaining at least one communication information component of a first communication configured for transmission to at least one mobile device configured to be shared by two or more parties, at least one account-specific data structure including at least identification of the two or more parties as corresponding two or more human beings and identification of at least one protocol, an identification of a first subset of the two or more parties with whom the at least one communication information component is associated, and a first network routing tag;

circuitry configured for obtaining sensor data sensed in a detection range of the at least one mobile device;

circuitry configured for determining by automatic sensor data recognition whether at least one of the two or more parties corresponding to two or more human beings is present within the detection range of the at least one mobile device;

circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device;

circuitry configured for assembling a second communication that includes the at least one communication information component of the first communication, identification of the first subset of the two or more parties with whom the first communication is associated, and the second network routing tag identifying the at least one mobile device; and circuitry configured for transmitting the second communication to the at least one mobile device.

3. The communication system of claim 2 wherein the circuitry configured for assembling a second communication that includes the at least one communication information component of the first communication, identification of the first subset of the two or more parties with whom the first communication is associated, and the second network routing tag identifying the at least one mobile device includes:

circuitry configured for deciding either to include a party identifier in the second communication if the first communication indicates a party or to exclude the party identifier from the second communication if the first communication does not indicate the party, the party being one of the two or more parties configured to share the at least one mobile device by the at least one account-specific data structure that identifies the two or more parties as corresponding two or more human beings by one or more intrinsic alphanumeric attributes.

4. The communication system of claim 2, wherein the circuitry configured for assembling a second communication that includes the at least one communication information component of the first communication, identification of the first subset of the two or more parties with whom the first communication is associated, and the second network routing tag identifying the at least one mobile device includes:

circuitry configured for assembling a second communication that includes an account-specific header that identifies the first subset of the two or more parties to whom the at least one communication information component of the first communication is directed.

5. The communication system of claim 2 further comprising:

at least one of:

circuitry configured for requesting a retrieval of a particular tag by invoking a remote lookup operation, the particular tag being a communication information component of the second communication that identifies the mobile device;

circuitry configured for causing the mobile device configured to be shared by the two or more parties to undergo a wireless linkage handover to or from a wireless local area network (WLAN) hotspot;

circuitry configured for implementing virtual device identifier recognition in firmware of a particular device, the particular device being the mobile device configured to be shared by the two or more parties;

circuitry configured for configuring a particular routing tag as a telephone number associated with a land line, the particular routing tag being associated with a first party but not with a second party of the two or more parties configured to share the mobile device by the at least one account-specific data structure that identifies the two or more parties as corresponding two or more human beings by one or more intrinsic alphanumeric attributes;

circuitry configured for configuring a wireless transmission to include a channel establishment request as a communication information component of the second communication;

circuitry configured for initiating an investigation protocol effective to determine whether a physical destination corresponding to a digital identifier can be found, the physical destination including the mobile device configured to be shared by the two or more parties; or circuitry configured for mapping a response protocol including at least an operational parameter to a specific recipient party identifier and to a specific anonymous communication context, the specific recipient party identifier identifying a member of the first subset of the two or more parties configured to share the mobile device by the at least one account-specific data structure that identifies the two or more parties as corresponding two or more human beings by one or more intrinsic alphanumeric attributes.

6. The communication system of claim 2 wherein the circuitry configured for assembling a second communication that includes the at least one communication information component of the first communication, identification of the first subset of the two or more parties with whom the first communication is associated, and the second network routing tag identifying the at least one mobile device includes:

circuitry configured for obtaining an identification of a member of the first subset of the two or more parties with whom the at least one communication information component is associated from at least one directory.

7. The communication system of claim 2 wherein the circuitry configured for obtaining sensor data sensed in a detection range of the at least one mobile device includes:

circuitry configured for obtaining at least one of image data or audio data sensed via at least one of a camera or a microphone in a detection range of the at least one mobile device.

8. The communication system of claim 2 wherein the circuitry configured for assembling a second communication that includes the at least one communication information component of the first communication, identification of the first subset of the two or more parties with whom the first communication is associated, and the second network routing tag identifying the at least one mobile device includes:

circuitry configured for assembling a second communication that identifies only one particular person as the first subset of the two or more parties, the one particular person being one of the two or more parties with whom the first communication is associated.

9. The communication system of claim 2 circuitry configured for assembling a second communication that includes the at least one communication information component of the first communication, identification of the first subset of the two or more parties with whom the first communication is associated, and the second network routing tag identifying the at least one mobile device includes: at least one of:
- circuitry configured for determining whether any one of the two or more parties has been designated as a default user of the mobile device configured to be shared by the two or more parties by the at least one account-specific data structure that identifies the two or more parties as corresponding two or more human beings by one or more intrinsic alphanumeric attributes;
- circuitry configured for determining whether any one of the two or more parties has been designated as a default user of the mobile device configured to be shared by the two or more parties and whether any one of the two or more parties that has not been designated as a default user of the mobile device configured to be shared by the two or more parties is online; or
- circuitry configured for deciding either to include a party identifier in the second communication if the first communication indicates a party or to exclude the party identifier from the second communication if the first communication does not indicate the party, the party being one of the two or more parties configured to share the mobile device by at least one account-specific data structure that identifies the two or more parties as corresponding two or more human beings by one or more intrinsic alphanumeric attributes.

10. The communication system of claim 2 wherein the circuitry configured for obtaining sensor data sensed in a detection range of the at least one mobile device includes:
- circuitry configured for obtaining at least one of image data or audio data sensed via at least one of a camera or a microphone in a detection range of the at least one mobile device, the at least one of image data or audio data being indicative of at least one of presence or absence of members of the two or more humans corresponding to the two or more parties.

11. The communication system of claim 2 wherein the circuitry configured for obtaining sensor data sensed in a detection range of the at least one mobile device includes:
- circuitry configured for obtaining at least one of an acceleration value, a temperature, one or more SPS coordinates, a barometric pressure, a humidity level, a compass direction, an altitude, a gyroscopic value, a magnetic reading, a pressure value, an oscillation value, an ambient light reading, inertial readings, touch detections, finger placements, or flex detections sensed via at least one of an accelerometer, a thermometer, a satellite positioning system (SPS) sensor, a barometer, a humidity sensor, a compass, an altimeter, a gyroscope, a magnetometer, a pressure sensor, an oscillation detector, a light sensor, an inertial measurement unit (IMU), a tactile sensor, a touch sensor, a flexibility sensor, or a microelectromechanical system (MEMS).

12. The communication system of claim 2 wherein the circuitry configured for assembling a second communication that includes the at least one communication information component of the first communication, identification of the first subset of the two or more parties with whom the first communication is associated, and the second network routing tag identifying the at least one mobile device includes at least one of:
- circuitry configured for assembling a second communication that includes an account-specific header that identifies the first subset of the two or more parties to whom a second communication information component of the first communication is directed;
- circuitry configured for assembling a second communication that identifies the first subset of the two or more parties from whom the at least one communication information component of the first communication is received;
- circuitry configured for determining whether the first communication lacks a party indication tag; or
- circuitry configured for requesting that a remote entity provide a user subset identification tag that corresponds with a virtual device identifier, the user subset identification tag identifying the first subset of the two or more parties configured to share the mobile device by at least one account-specific data structure that identifies the two or more parties as corresponding two or more human beings by one or more intrinsic alphanumeric attributes.

13. The communication system of claim 2 wherein the circuitry configured for determining by automatic sensor data recognition whether at least one of the two or more parties corresponding to two or more human beings is present within the detection range of the at least one mobile device includes:
- circuitry configured for determining by automatic facial recognition applied to one or more images whether at least one of the two or more parties corresponding to two or more human beings is present within the detection range of the at least one mobile device.

14. The communication system of claim 2 circuitry configured for determining by automatic sensor data recognition whether at least one of the two or more parties corresponding to two or more human beings is present within the detection range of the at least one mobile device includes:
- circuitry configured for determining by automatic voice recognition applied to audio data whether at least one of the two or more parties corresponding to two or more human beings is present within the detection range of the at least one mobile device.

15. The communication system of claim 2 circuitry configured for determining by automatic sensor data recognition whether at least one of the two or more parties corresponding to two or more human beings is present within the detection range of the at least one mobile device includes:
- circuitry configured for determining by at least one of automatic facial recognition applied to one or more images or automatic voice recognition applied to audio data whether at least one of the two or more parties corresponding to two or more human beings is at least one of present or absent within the detection range of the at least one mobile device.

16. The communication system of claim 2 circuitry configured for assembling a second communication that includes the at least one communication information component of the first communication, identification of the first subset of the two or more parties with whom the first communication is associated, and the second network routing tag identifying the at least one mobile device includes:
at least one of:
circuitry configured for causing the at least one mobile device configured to be shared by the two or more parties to undergo a wireless linkage handover to or from a wireless local area network (WLAN) hotspot; or
circuitry configured for configuring a wireless transmission to include a channel establishment request as a communication information component of the second communication.

17. The communication system of claim 2 wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:
circuitry configured for configuring a particular routing tag as a telephone number associated with a land line, the particular routing tag being associated with a first party but not with a second party of the two or more parties configured to share the mobile device by the at least one account-specific data structure that identifies the two or more parties as corresponding two or more human beings by one or more intrinsic alphanumeric attributes.

18. The communication system of claim 2 circuitry configured for assembling a second communication that includes the at least one communication information component of the first communication, identification of the first subset of the two or more parties with whom the first communication is associated, and the second network routing tag identifying the at least one mobile device includes:
circuitry configured for configuring a wireless transmission to include a channel establishment request as a communication information component of the second communication.

19. The communication system of claim 2 wherein the network equipment includes:
at least one of a mobile switching center, a base transceiver station, a wireless access point, a wireless router, a wireless LAN router, a mobile hotspot, a handheld device, or a server.

20. The communication method of claim 2 wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:
circuitry configured for deriving a second network routing tag identifying the at least one mobile device that selectively routes the at least one communication information component as a function of the first network routing tag and the at least one protocol in the at least one account-specific data structure, the at least one protocol specifying a channel establishment request obtained as a component of the first communication.

21. The communication system of claim 2, wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:
circuitry configured for deriving a second network routing tag identifying the at least one mobile device that selectively routes the at least one communication information component as a function of the first network routing tag and the at least one protocol in the at least one account-specific data structure, the at least one protocol discriminating presentation of content to avoid presentation to at least one of the two or more parties.

22. The communication system of claim 2, wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:
circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings has an active account associated with communications through at least one network.

23. The communication system of claim 2, wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:
circuitry configured for deriving a second network routing tag identifying the at least one mobile device that selectively routes the at least one communication information component as a function of the first network routing tag and the at least one protocol in the at least one account-specific data structure, wherein the at least one protocol causes one or more charges associated with communications through at least one network to be associated with an account.

24. The communication system of claim 2, wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:

circuitry configured for deriving a second network routing tag identifying the at least one mobile device that selectively routes the at least one communication information component as a function of the first network routing tag and the at least one protocol in the at least one account-specific data structure, the at least one protocol specifying a network routing tag configured as a telephone number associated with a landline.

25. The communication system of claim 2, wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:

circuitry configured for deriving a second network routing tag identifying the at least one mobile device that selectively routes the at least one communication information component as a function of the first network routing tag and the at least one protocol in the at least one account-specific data structure, the at least one protocol specifying at least one record that associates at least one of one or more phone numbers or one or more internet protocol addresses with at least one permanent identifier of a handset.

26. The communication system of claim 2, wherein the circuitry configured for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device includes:

circuitry configured for deriving a second network routing tag identifying the at least one mobile device that selectively routes the at least one communication information component as a function of the first network routing tag and the at least one protocol in the at least one account-specific data structure, the at least one protocol specifying a content including at least one of a caller ID field, user text, or at least one digital expression intended for one subset of the two or more humans corresponding to the two or more parties but not for a remainder of the two or more humans.

27. A communication system comprising:
network equipment including one or more electronic devices, the network equipment including at least:
means for obtaining at least one communication information component of a first communication configured for transmission to at least one mobile device configured to be shared by two or more parties, at least one account-specific data structure including at least identification of the two or more parties as corresponding two or more human beings and identification of at least one protocol, an identification of a first subset of the two or more parties with whom the at least one communication information component is associated, and a first network routing tag;
means for obtaining sensor data sensed in a detection range of the at least one mobile device;
means for determining by automatic sensor data recognition whether at least one of the two or more parties corresponding to two or more human beings is present within the detection range of the at least one mobile device;
means for deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device;
means for assembling a second communication that includes the at least one communication information component of the first communication, identification of the first subset of the two or more parties with whom the first communication is associated, and the second network routing tag identifying the at least one mobile device; and
means for transmitting the second communication to the at least one mobile device.

28. A communication method operable in network equipment including one or more electronic devices comprising:
obtaining at least one communication information component of a first communication configured for transmission to at least one mobile device configured to be shared by two or more parties, at least one account-specific data structure including at least identification of the two or more parties as corresponding two or more human beings and identification of at least one protocol, an identification of a first subset of the two or more parties with whom the at least one communication information component is associated, and a first network routing tag;
obtaining sensor data sensed in a detection range of the at least one mobile device;
determining by automatic sensor data recognition whether at least one of the two or more parties corresponding to two or more human beings is present within the detection range of the at least one mobile device;
deriving a second network routing tag identifying the at least one mobile device that selectively routes the at least one communication information component as a function of the first network routing tag and the at least one protocol in the at least one account-specific data structure, the at least one protocol specifying at least one response dependent upon whether at least one of the two or more parties corresponding to two or more human beings is present within the detection range of the at least one mobile device;
assembling a second communication that includes the at least one communication information component of the first communication, identification of the first subset of the two or more parties with whom the first communication is associated, and the second network routing tag identifying the at least one mobile device; and
transmitting the second communication from the network equipment to the mobile device.

* * * * *